United States Patent [19]
Van Loo

[11] Patent Number: 5,864,677
[45] Date of Patent: Jan. 26, 1999

[54] SYSTEM FOR PRESERVING SEQUENTIAL ORDERING AND SUPPORTING NONIDEMPOTENT COMMANDS IN A RING NETWORK WITH BUSY NODES

[75] Inventor: William C. Van Loo, Palo Alto, Calif.

[73] Assignee: Sun Microsystems, Inc.

[21] Appl. No.: 673,850

[22] Filed: Jul. 1, 1996

[51] Int. Cl.$^6$ .............................. G06F 13/38; H04L 29/06
[52] U.S. Cl. ................................ 395/200.62; 395/200.65; 370/403
[58] Field of Search ..................... 395/800.23, 200.32, 395/200.38, 200.61, 200.57, 872, 873, 200.65; 370/389, 403, 453, 450, 392, 233, 406, 458

[56] References Cited

U.S. PATENT DOCUMENTS

| | | | |
|---|---|---|---|
| 4,922,408 | 5/1990 | Davis et al. | 395/DIG. 1 |
| 5,351,043 | 9/1994 | Hullett et al. | 340/825.5 |
| 5,495,481 | 2/1996 | Duckwall | 370/85.2 |

*Primary Examiner*—Daniel H. Pan
*Attorney, Agent, or Firm*—Conley, Rose & Tayon, PC; B. Noel Kivlin

[57] ABSTRACT

A system for resolving packet errors and busy acknowledgments for packets in a ring network, to maintain continued packet distribution on the network with support for strongly ordered, nonidempotent commands. Each consumer node on the network maintains a record of the sequence of packets that have passed through that node, and the state of each of the packets at the time it passed through, including a record of the last known good packet and its sequence number. When a producer node detects an error condition in an acknowledgment for a packet, resends all packets beginning with the last known good packet. Each consumer node is able to process or reject the resent packets, including packets that may already have been processed, which it is aware of due to the packet and state records for all packets. Strong ordering is thus supported, since the sending order of packets can be maintained for processing due to the resends, and nonidempotent commands are supported due to the consumer nodes' ability to determine whether they have already processed a given packet, and to send an acknowledge-done reply if that is the case. A retry queueing system is used which allows the system to effectively interleave busy retry loops with an error retry loop, thus accommodating both error retries and busy retries while preserving strong sequential ordering, if desired, of the sent packets.

31 Claims, 59 Drawing Sheets

Resend logic

Mux logic

Receive Block Diagram

Ack gen logic

Seq update

SYSTEM FOR PRESERVING SEQUENTIAL ORDERING AND SUPPORTING NONIDEMPOTENT COMMANDS IN A RING NETWORK WITH BUSY NODES

BACKGROUND OF THE INVENTION

The present invention is directed to a system for support of packet transmission in processor-based networks using serial interconnects. In particular, the system of the invention provides dynamic ordering support for packets in response to errors in such networks, in particular in ringlet topologies, combined with busy conditions at nodes on the network.

Serial interconnects in computer systems are subject to a number of different types of service interruptions. For example, when a node on a network encounters a CRC (cyclical redundancy check) error in a packet, that packet cannot be accepted. The node that sent the packet learns, generally indirectly (such as by a timeout or through the use of idle packets) of the error, and eventually must resend the packet.

Resending the packet may not be a simple matter, especially if the network implements an ordering scheme, such as relaxed memory ordering (RMO), strong sequential ordering (SSO), or orderings of other or intermediate stringency. In a packet-switched network with such an ordering scheme, packets preceding and following a packet giving rise to a CRC error may need to be resent by the producer node to the target node.

When busy acknowledgments are received by a producer node from a consumer node, a way must be found to retry sending the packets when the consumer node was busy, and at the same time accommodate retrying of packets sent when the consumer node or another consumer node gave rise to an error. In particular, a system is needed that can accomplish these types of retries while preserving SSO and supporting nonidempotent commands.

SUMMARY OF THE INVENTION

A system is presented which provides for resending of packets on a ringlet network that have resulted in CRC errors and at the same time accommodating busy conditions on the network, by maintaining a sequence and acknowledge state at each receive node of all known good packets. When packets need to be resent, the local nodes know whether they have processed the resent packets before, and know which the last known good packet was, and in this way are able to avoid reprocessing already executed commands, including nonidempotent commands. The producer node that has detected an error, e.g. a CRC error, causes the resend loop to commence, and backs up the sending of packets to the last packet where a valid acknowledgment was received, and then resends all packets since that last valid-ack packet. If all nodes return valid acks from that packet, then the system has properly been restored, and proceeds with additional packets. If not, then the producer node backs up again to that last valid-ack packet, and begins again, and repeats until its received valid acks are in synch with its sent packets. This strictly preserves the ordering of the packets.

When a busy retry loop is needed to retry packets sent for which busy acknowledgments are received, by the use of a retry queue the system is able to effectively interleave the error retry loop with the busy retry loop, and ensure that previously executed commands are not reexecuted, thereby supporting SSO and nonidempotent commands.

This application relates to the treatment of such error conditions in a ringlet network and at the same time accommodating busy retries due to busy nodes on the network. A basis for the error retry mechanism is described both herein and in applicant's copending patent application, Ser. No. 08/674,033, filed Jul. 1, 1996, entitled System for Dynamic Ordering Support in a Ringlet Serial Interconnect by van Loo et al. A more complex system which also deals with overloaded or failed nodes on a ringlet network is described in applicant's copending patent application Ser. No. 08/673,849, filed Jul. 1, 1996, entitled System for Maintaining Strongly Sequentially Ordered Packet Flow in a Ring Network System with Busy and Failed Nodes by van Loo et al. These two patent applications are incorporated herein by reference.

DESCRIPTION OF THE PREFERRED EMBODIMENTS

Figure 1:
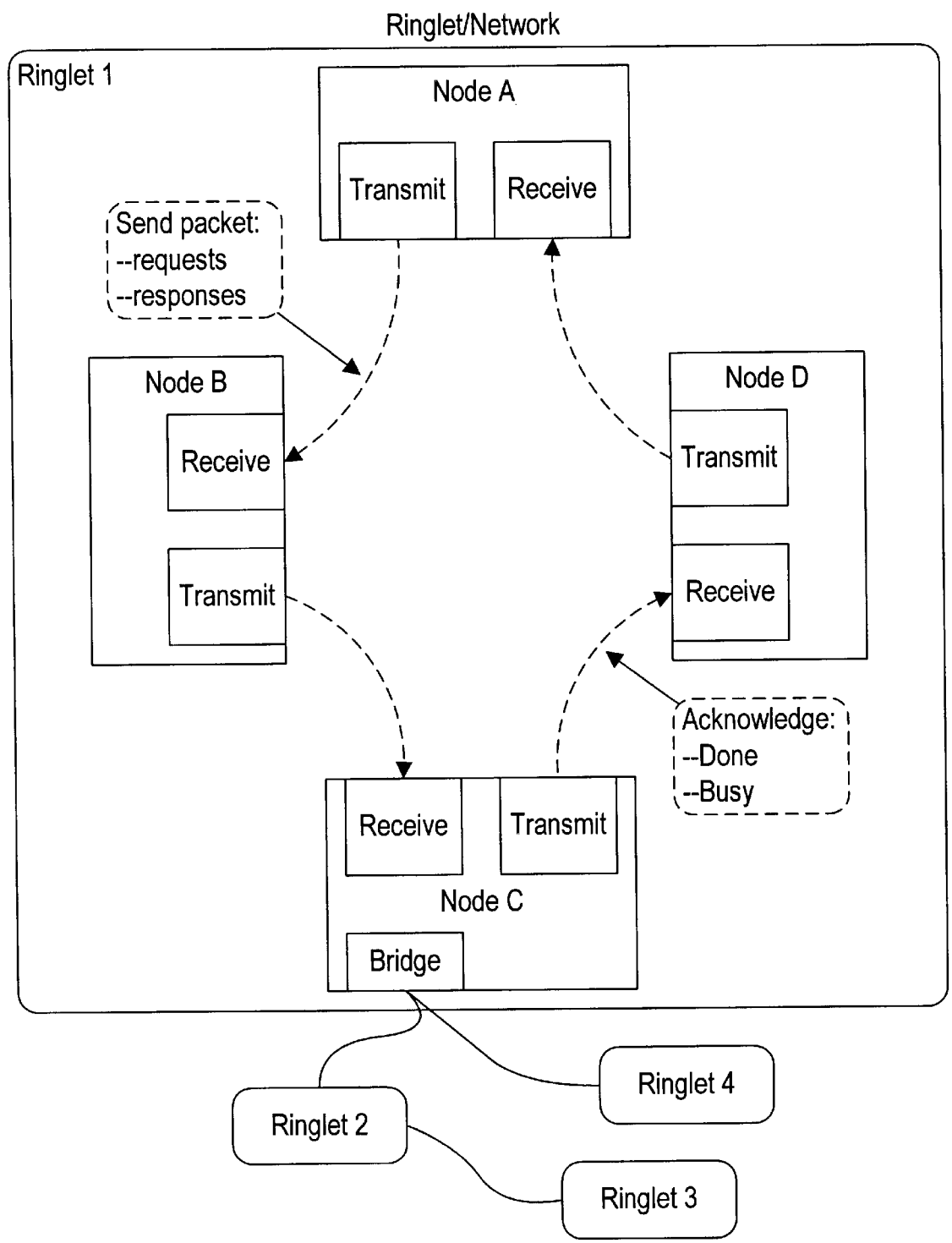
FIG. 1 is a block diagram showing ringlets on a larger network.

FIG. 1 shows a standard ringlet 1 with four nodes A–D, each with transmit and receive capability. Requests and responses are sent out by a producer node, e.g. node A, while acknowledges (e.g. ack_done and ack_busy) are sent by a consumer node, e.g. node C. Node C may also communicate with other ringlets 2, 3 and 4, in a conventional fashion. The present invention is directed in particular to solutions for packets that are subject to errors in a ring network such as ringlet 1, which can cause unpredictable packet delivery and acceptance, since, although a producer knows what it has sent, it does not know (except by indirect means), whether a packet for which no acknowledgment has been received was in fact processed by the intended node.

Figure 2:
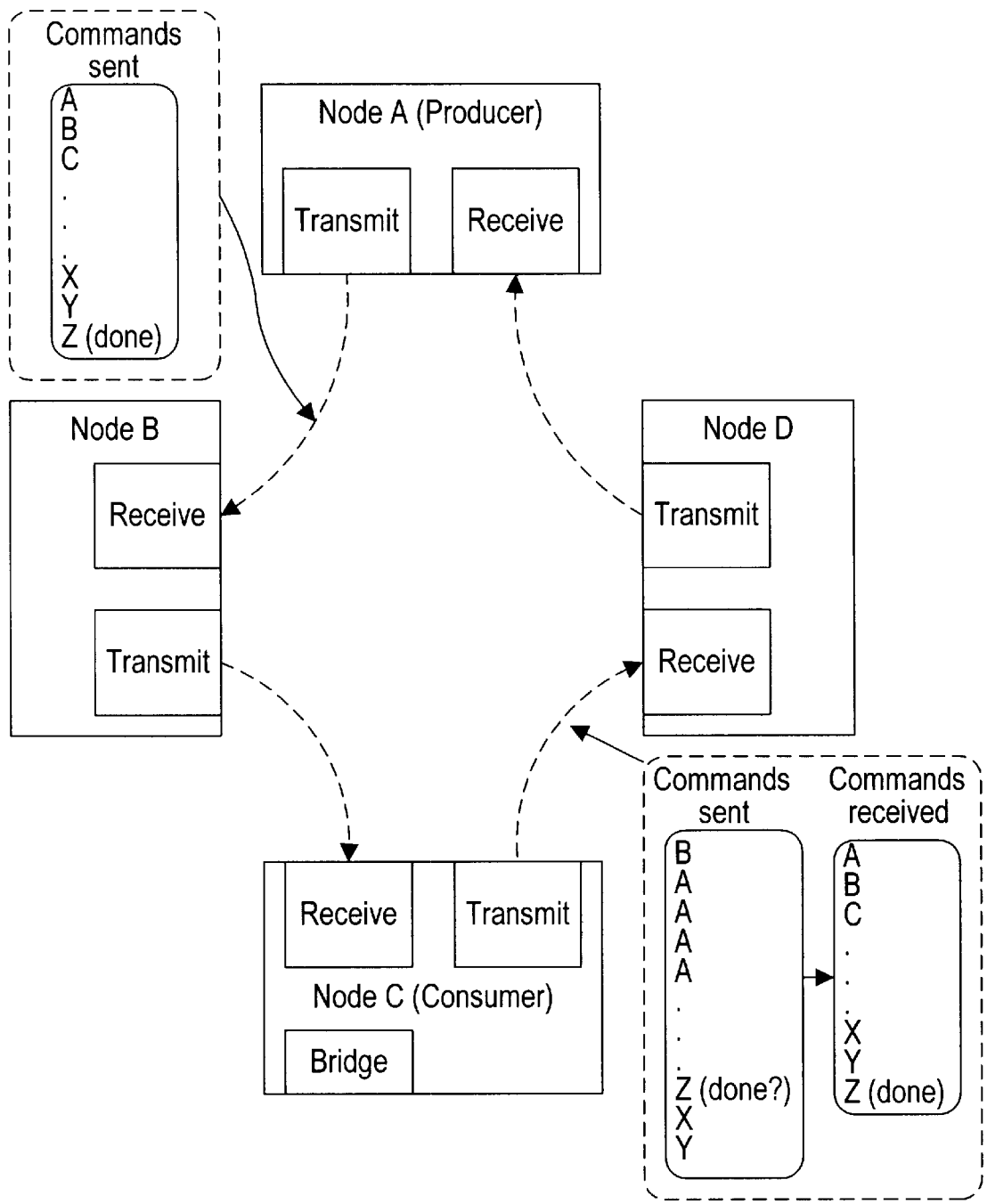
FIG. 2 is a block diagram showing a single ringlet, illustrating commands sent and received on the ringlet.

When ordering is required, the challenge is greater. FIG. 2 shows commands sent in a particular order A, B, C . . . by node A, and because of ringlet and transmission vagaries, reception in a different order, e.g. B, A, A, A, . . . . A well-behaved system should be able to reorder the sent packets and execute them properly, in the originally sent sequence.

Figure 3:
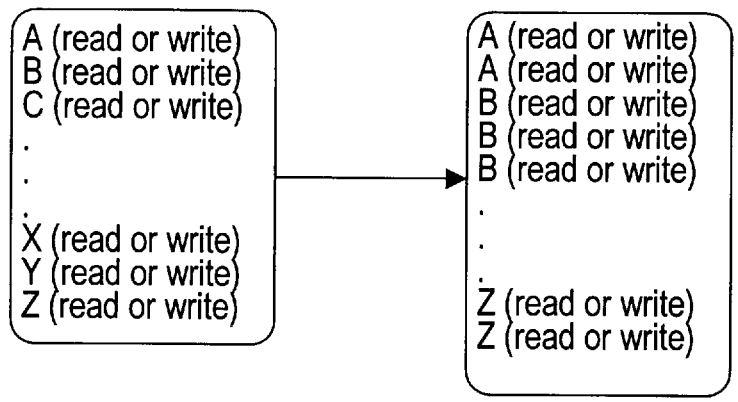
FIGS. 3–4 illustrate commands sent and received in the cases of strong sequential ordering (SSO) and SSO with nonidempotent requests or commands, respectively.
Figure 4:
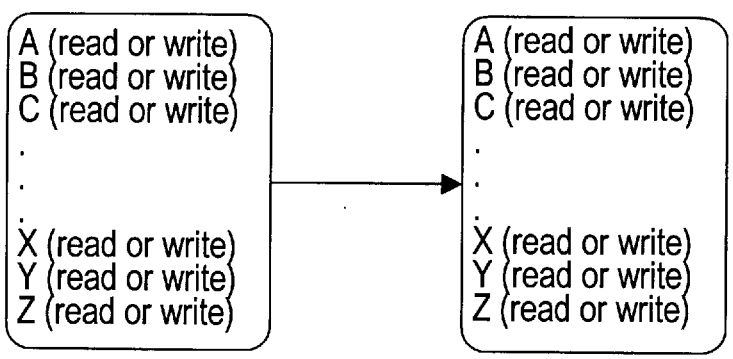

FIG. 3 illustrates strong sequential ordering (SSO): no packet is received out of the order in which it was sent—although it may appear twice, it does not appear out of order. FIG. 4 illustrates the use of both SSO and nonidempotent commands; not only is the sequence preserved, but because of the nature of nonidempotent commands, no command in a conventional system may be executed twice by the destination node. Note in FIG. 4 that {producerId, pLabel} are common to send_pkt and acknowledge; also, {producerId, pLabel} are visible to each node, absent errors.

Figure 5:
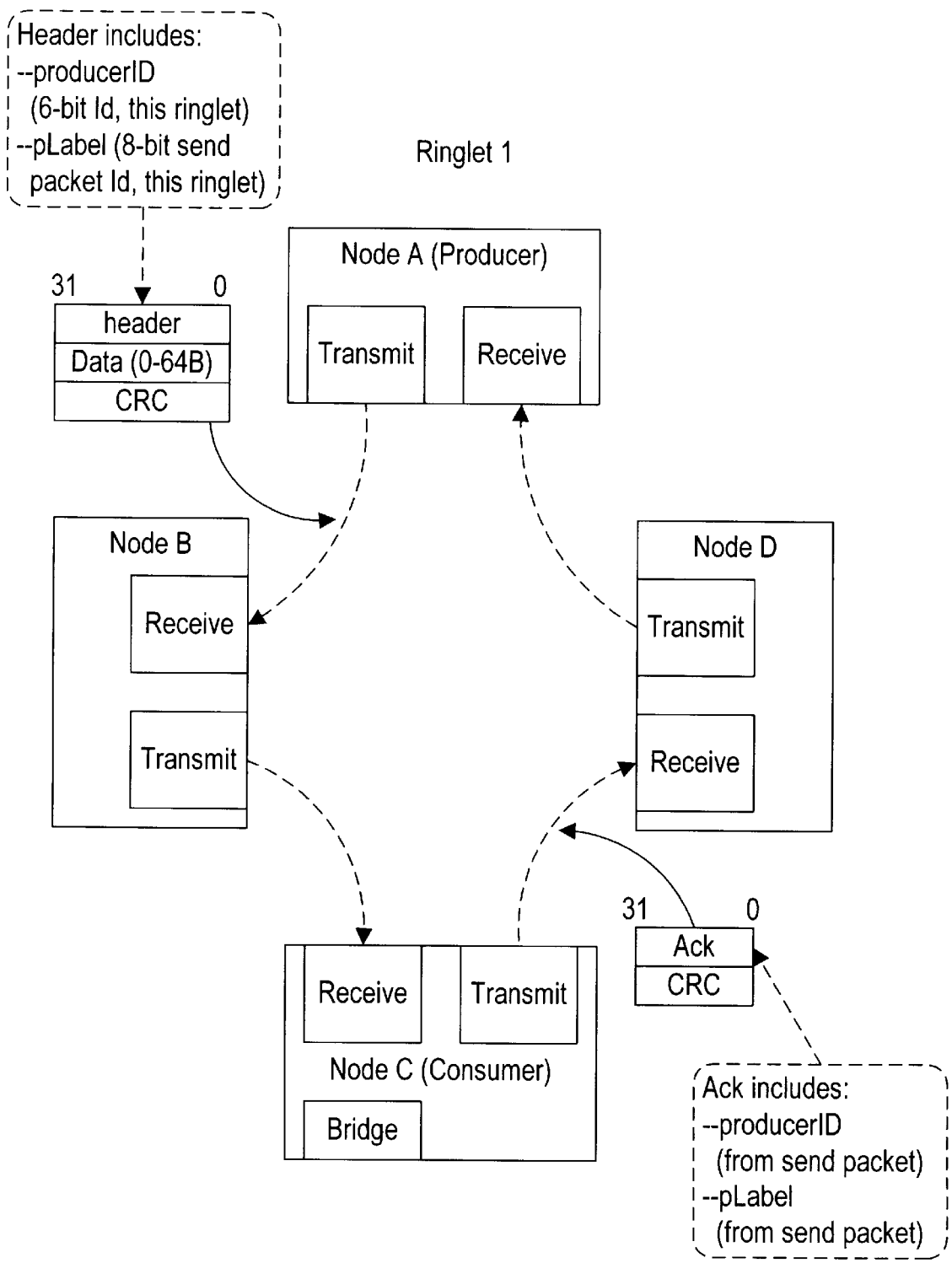
FIG. 5 shows the ringlet of FIG. 2, showing the data structure of send packets and acknowledgments.

FIG. 5 shows date structure suitable for applicant's solution to the above challenges; the packets include fields called producerID and pLabel, whose details are discussed below. These two fields are included in the acknowledge packets sent back from the consumer to the producer.

Figure 6:
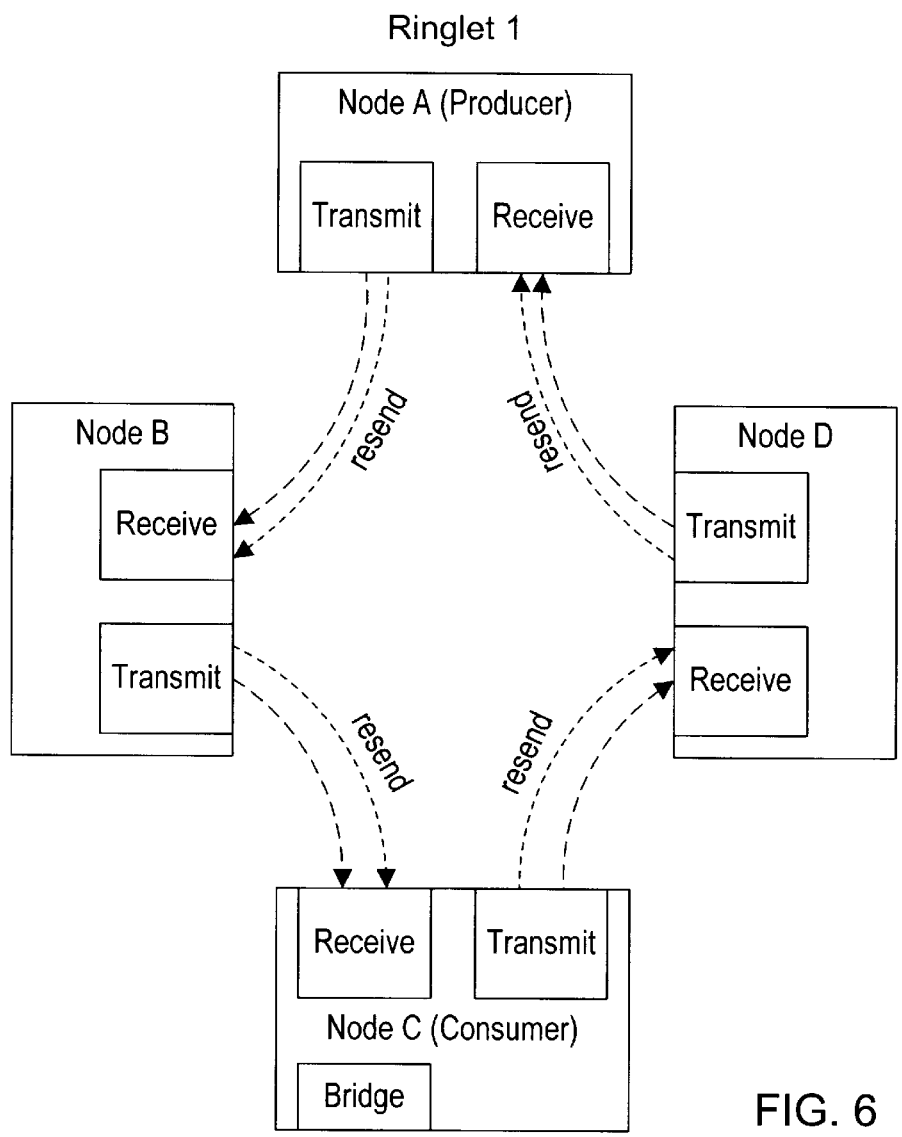
FIGS. 6 and 6A show the ringlet of FIG. 2, illustrating the resending of packets.
Figure 6A:
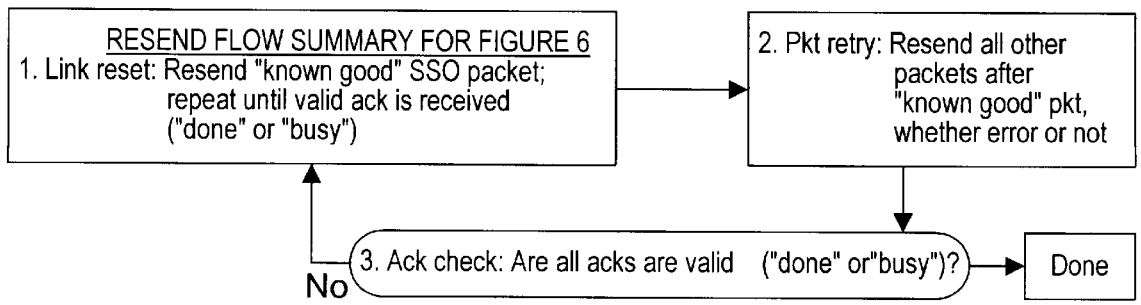
Figure 7:
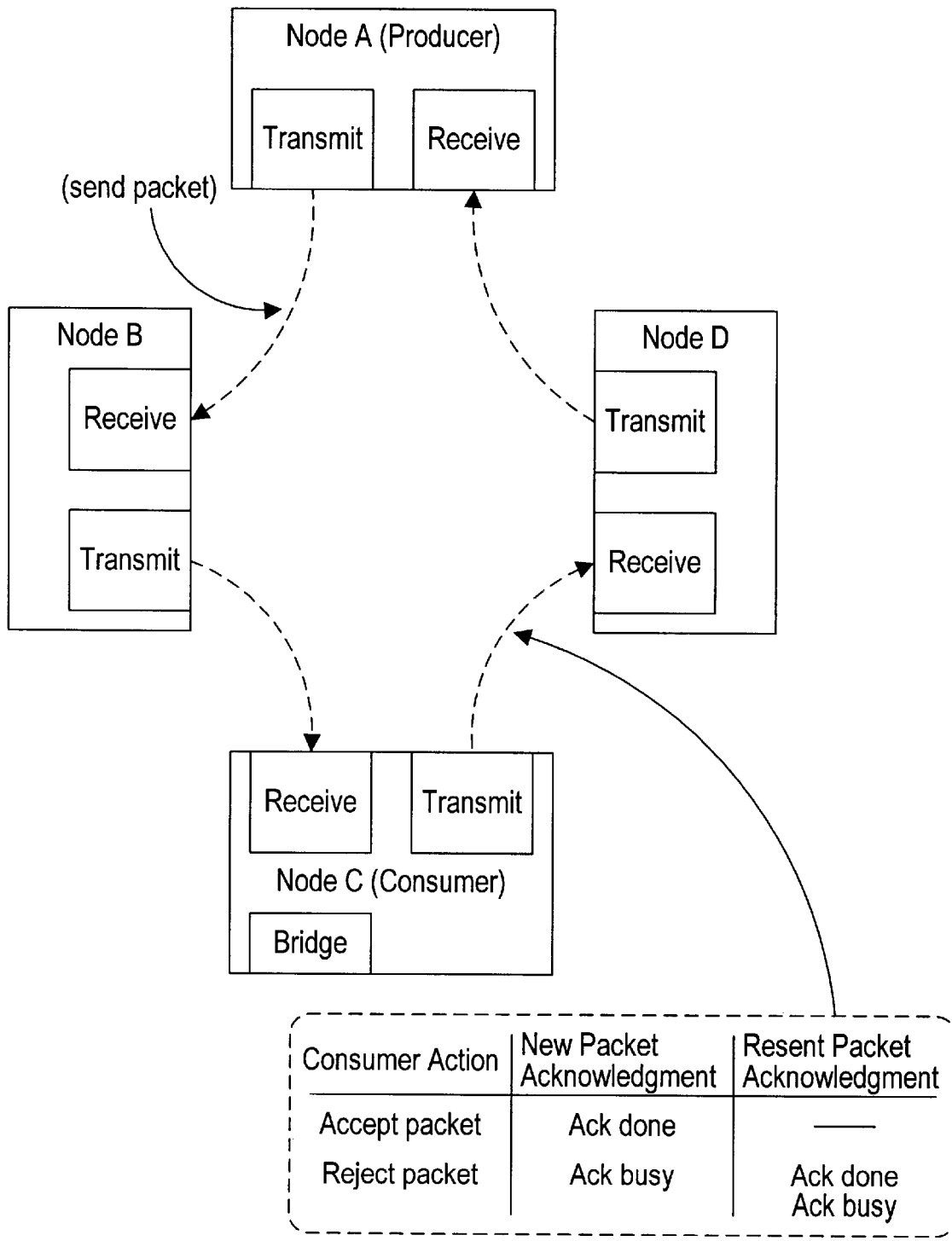
FIG. 7 shows the ringlet of FIG. 2, illustrating the actions of a consumer node.

The present invention resends packets, both known good (already accepted/done) packets and others, in a pattern as shown in FIG. 6. FIG. 6A summarizes at a high level the basic approach of the system of the invention: a known good SSO packet is resent, repeatedly if necessary, until a valid acknowledgment (which may be "done" or "busy") is received at the producer node. Then the producer node resends all other packets after the known good packet, even those that have been properly processed, i.e. for which ack_dones have been received. (See FIG. 7.) As the acks come back from the resent packets, the producer node checks to see that all are valid acks—i.e. "done" or "busy". If they are not all valid acks, then the resending process is repeated, until all acks are in fact valid. This ensures that all erroneous packets have been properly processed, and the system may then proceed with succeeding packets. Complicated challenges are presented in this approach to preserve SSO and support nonidempotent commands, and the solutions are presented by the logic shown in FIGS. 8A–38, whose operation is illustrated in the state diagrams of FIGS. 39 et seq.

The present invention is enabled by the fact that the consumer node continually maintains the state for packet actions (accept and reject states) and for acks (done and busy); this goes for all packets and acks that each node sees. Thus, each consumer node is aware of the disposition for every packet traveling the ringlet at the time that each packet passed through that node. This information is important in the resend process. Moreover, each consumer node maintains a record of the sequence of packets that have gone through, and a sequence number of the last known good packet (for which an ack_done or ack_busy was issued). This provides a point to which the system can back up, if needed, when e.g. a CRC error is encountered. This will be more clearly seen in the discussion below of the example of FIGS. 39 et seq.

Figure 8:
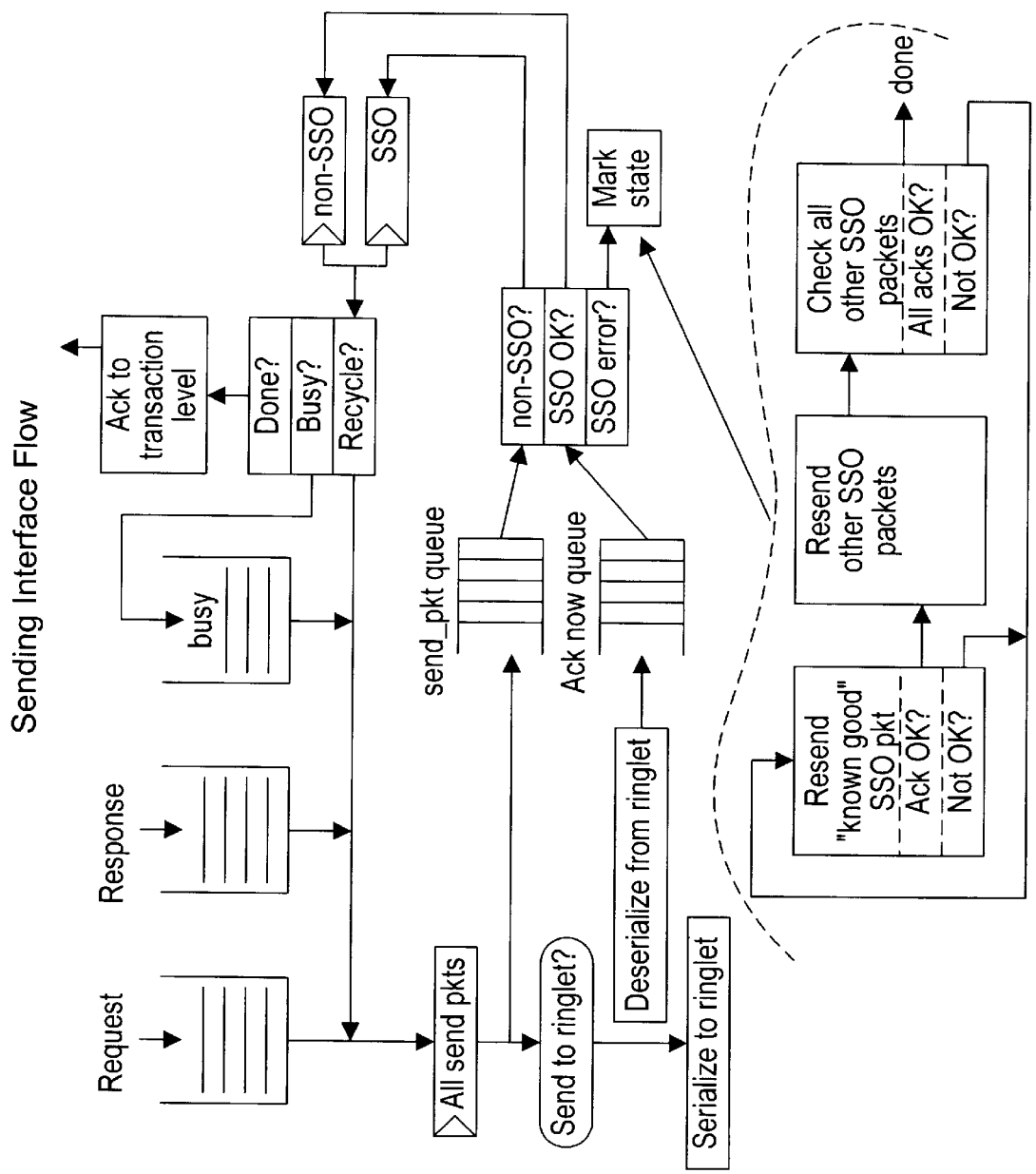
FIG. 8 is block diagram illustrating the operation of the invention from the point of view of a send interface.
Figure 8A:
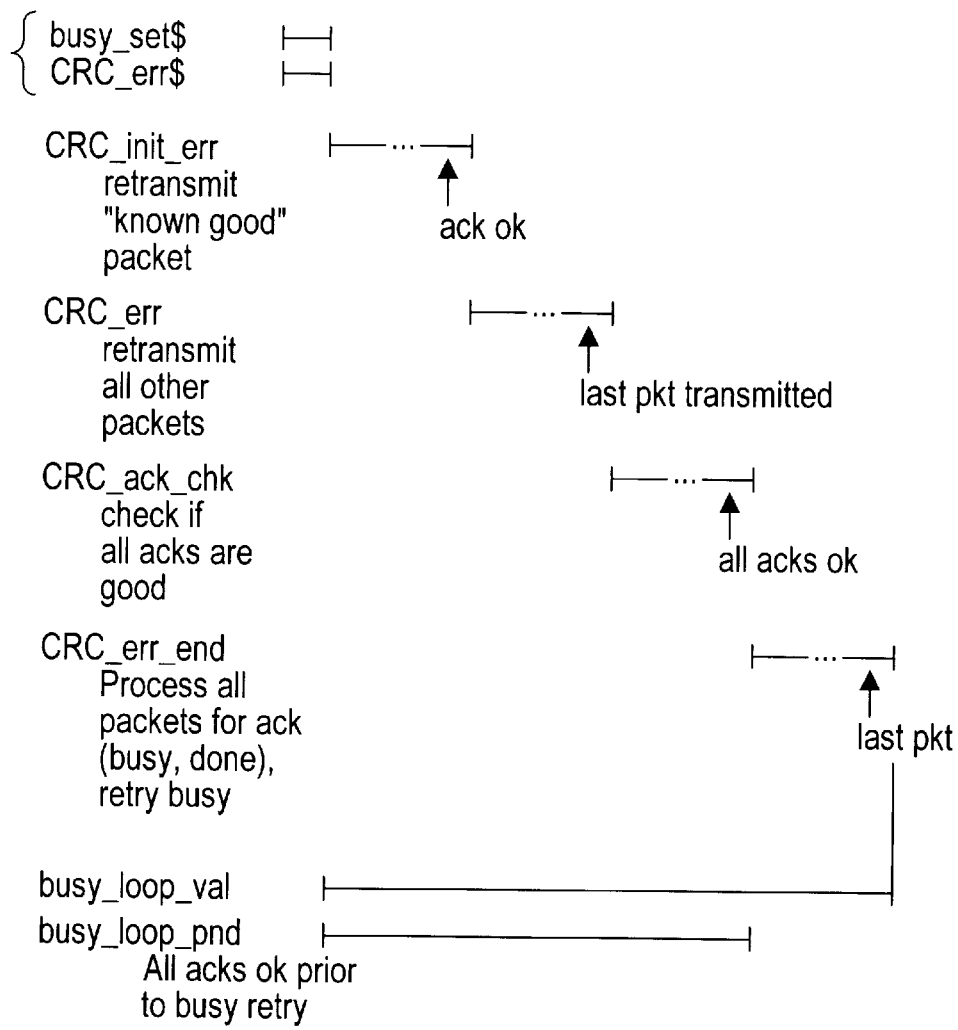
FIG. 8A is a timing diagram illustrating a busy loop operation of the invention, with respect to a send port.

FIG. 8 is a block diagram showing a suitable hardware environment for the present invention, and serves also to show the possible flow of packets in the producer node. It can be understood in detail in light of the flow/state diagrams of FIGS. 39 et seq. and the logic diagrams of FIGS. 8A–38.

Figure 39:
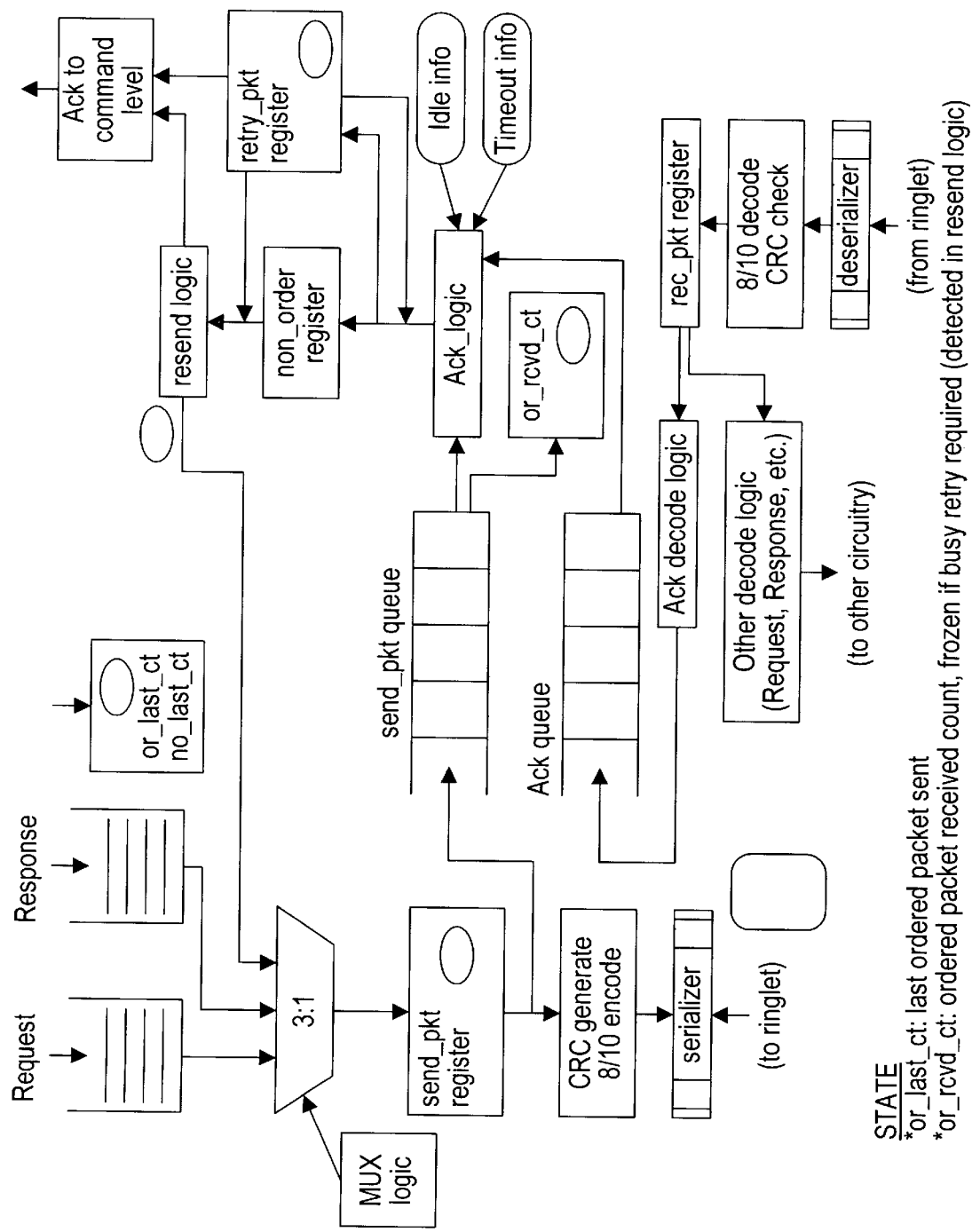
FIG. 39 is a block diagram indicating both the structure and the flow of packets in a preferred embodiment of the invention.
Figure 40:
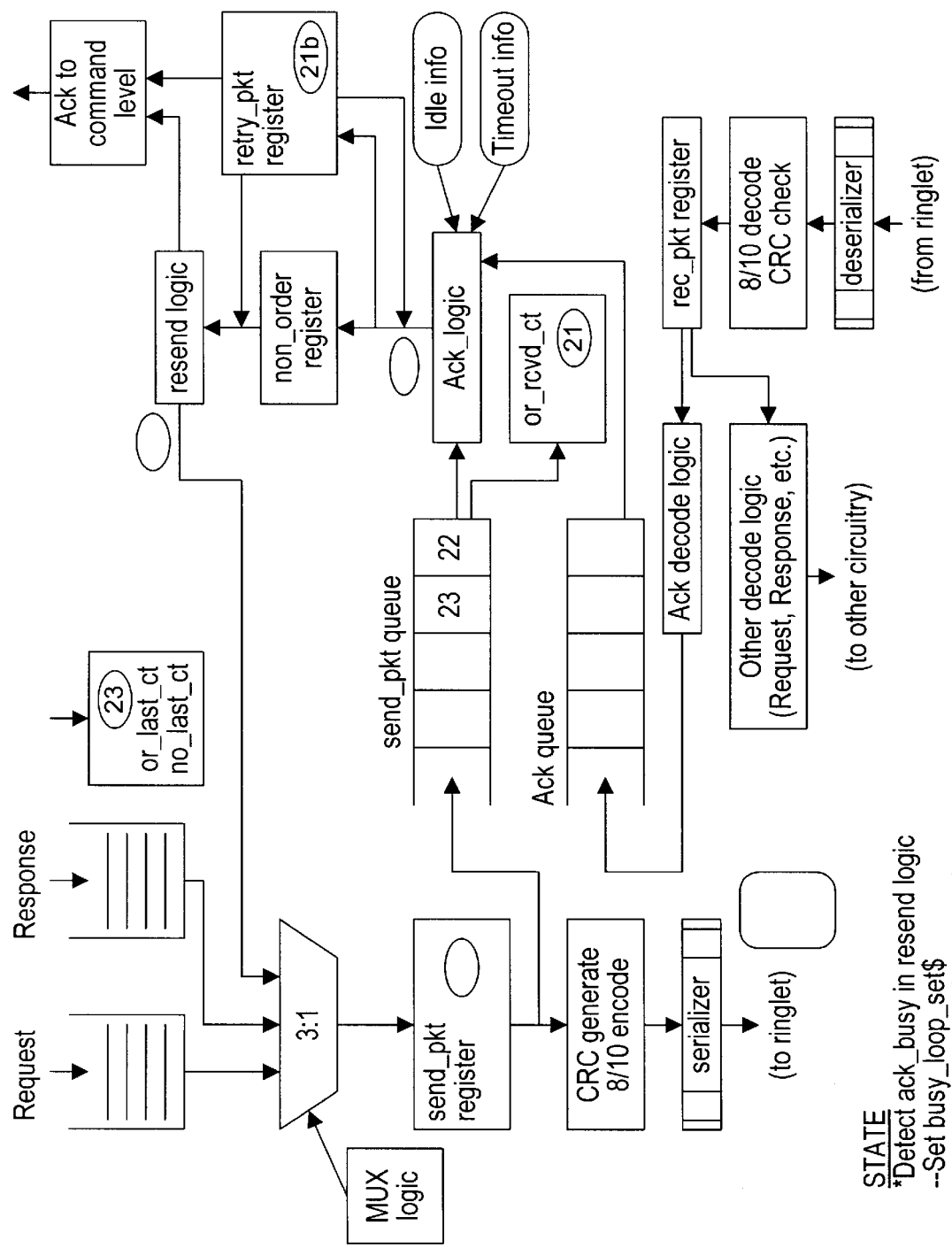
FIGS. 40–59 illustrate successive states of the block diagram of FIG. 39 according to the operation of the system of the invention.
Figure 41:
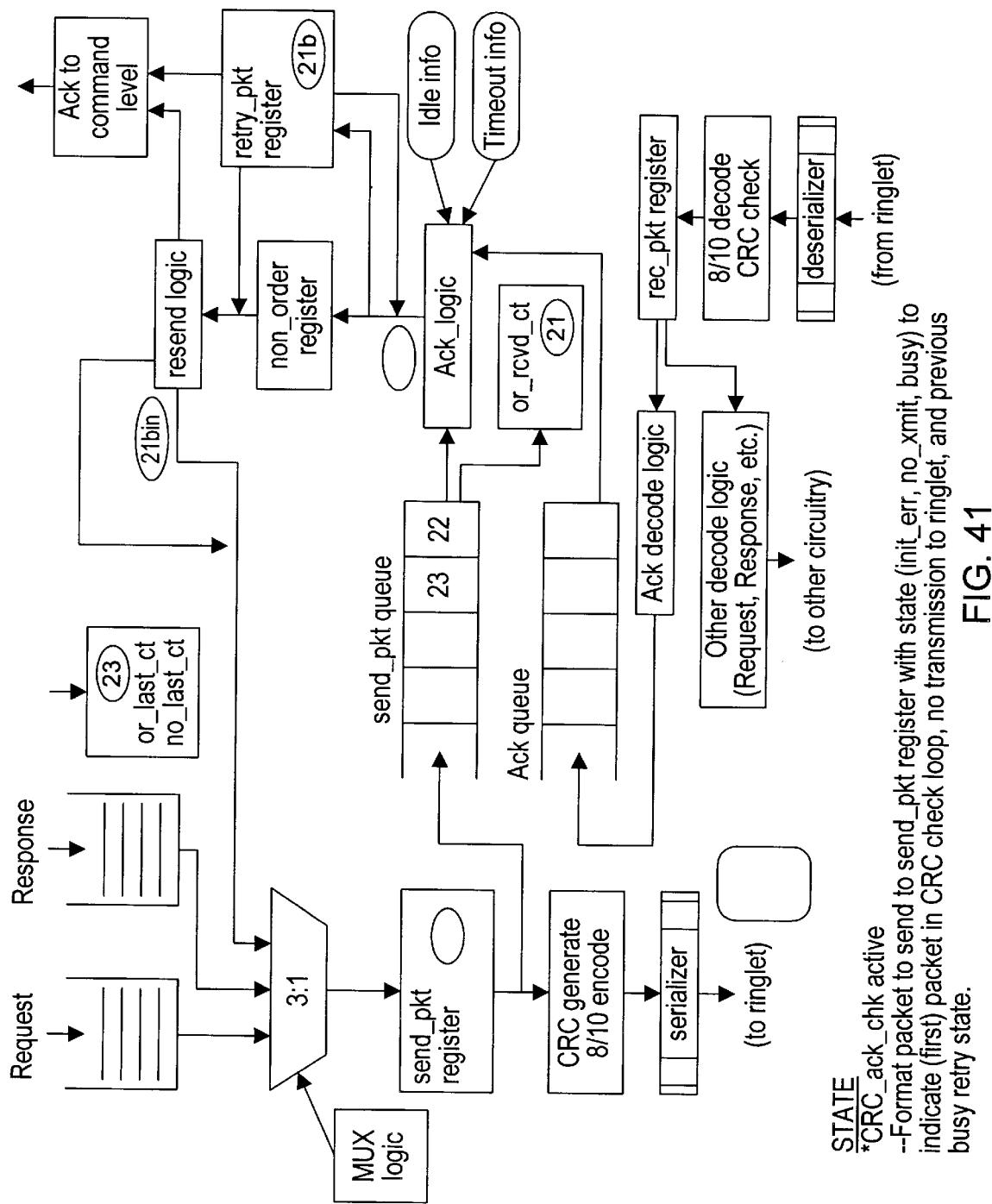
Figure 42:
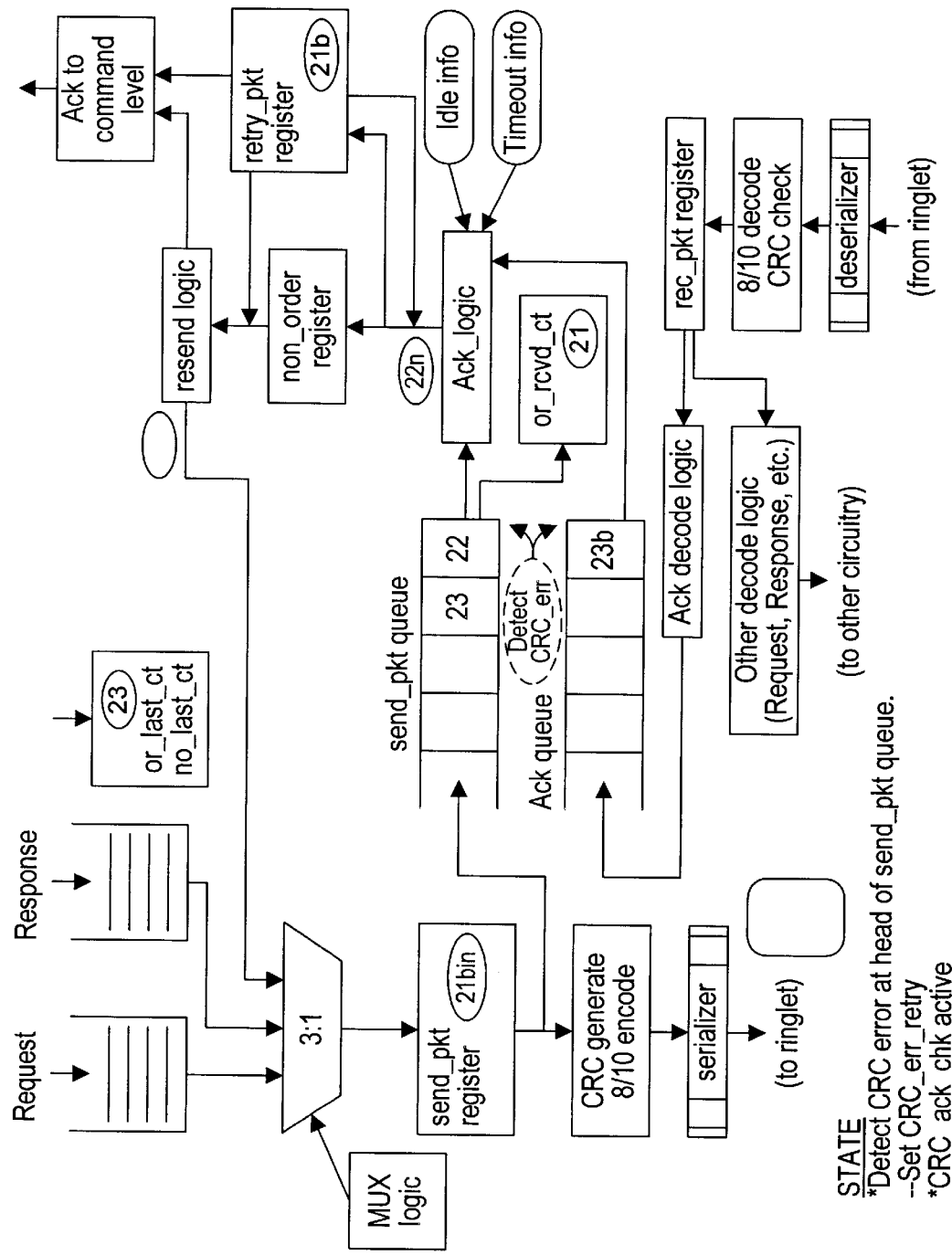
Figure 43:
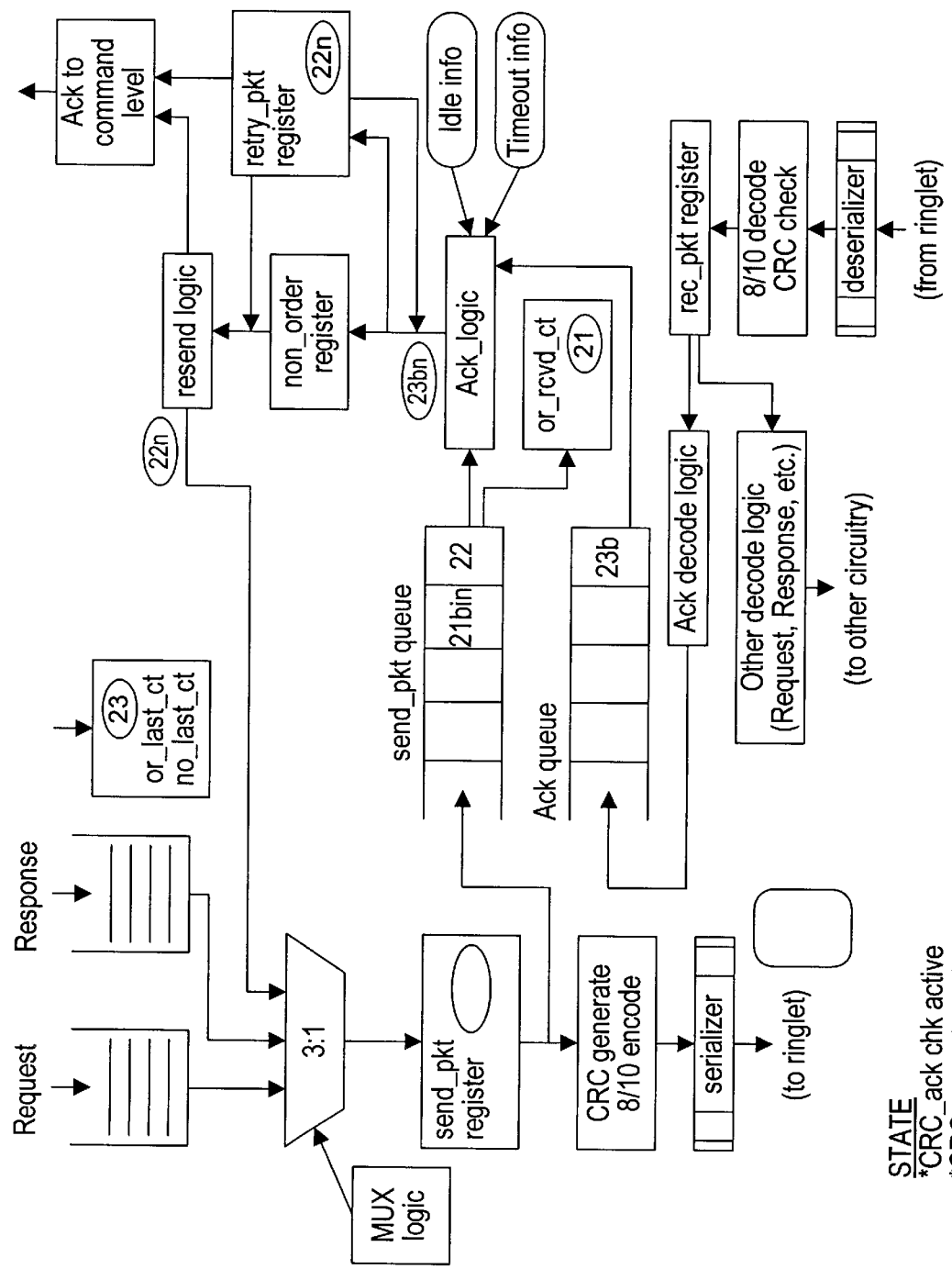
Figure 44:
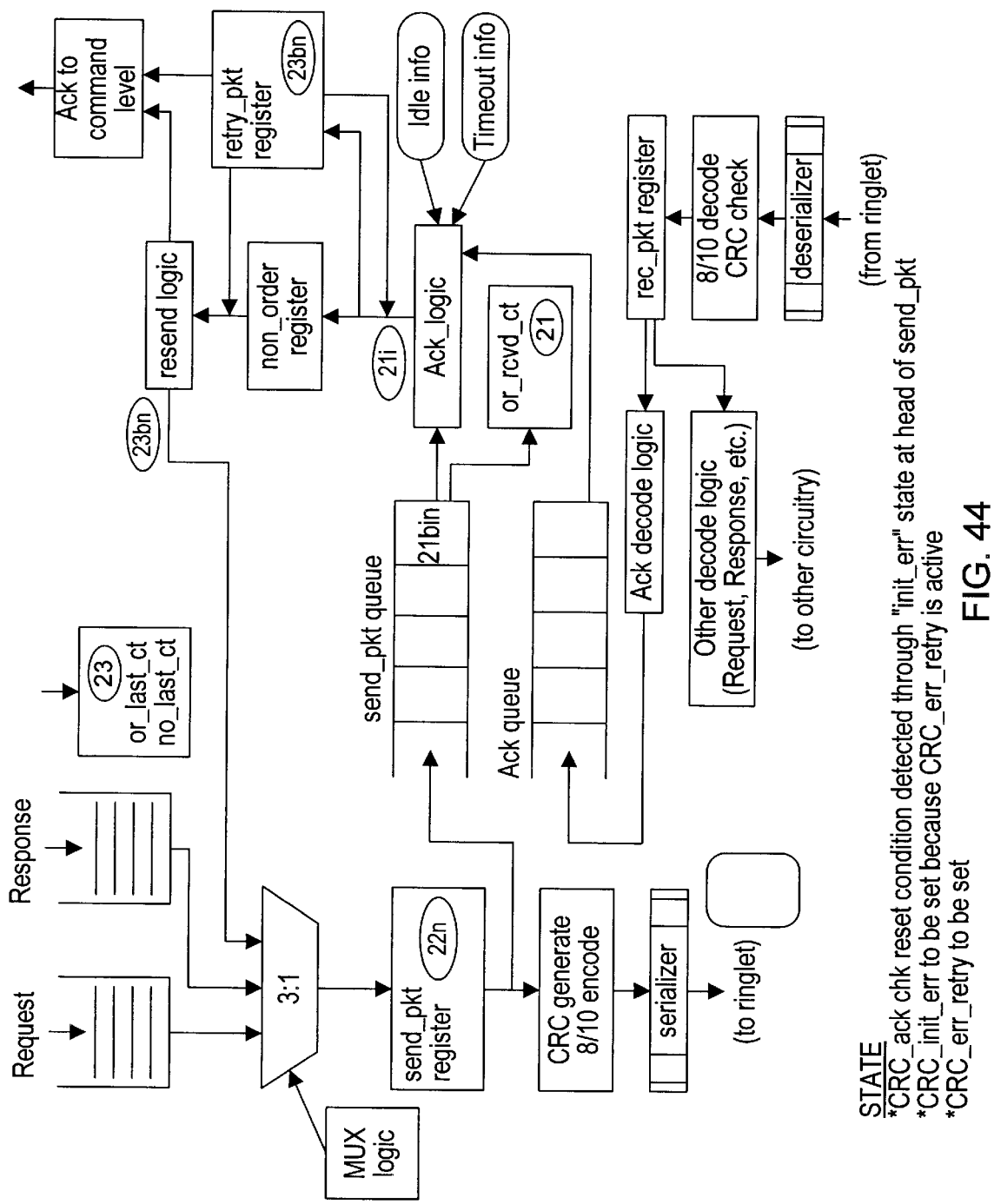
Figure 45:
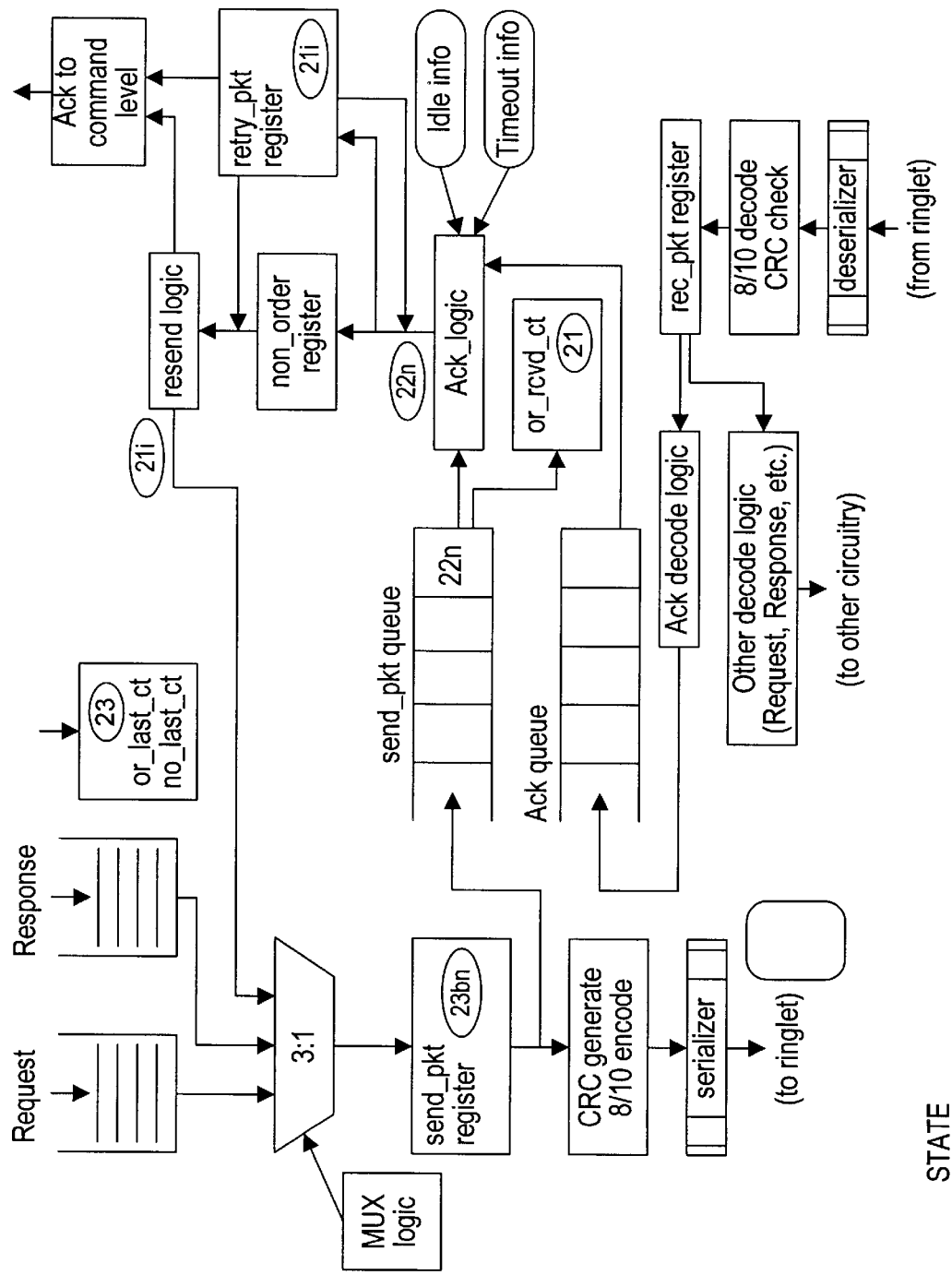
Figure 46:
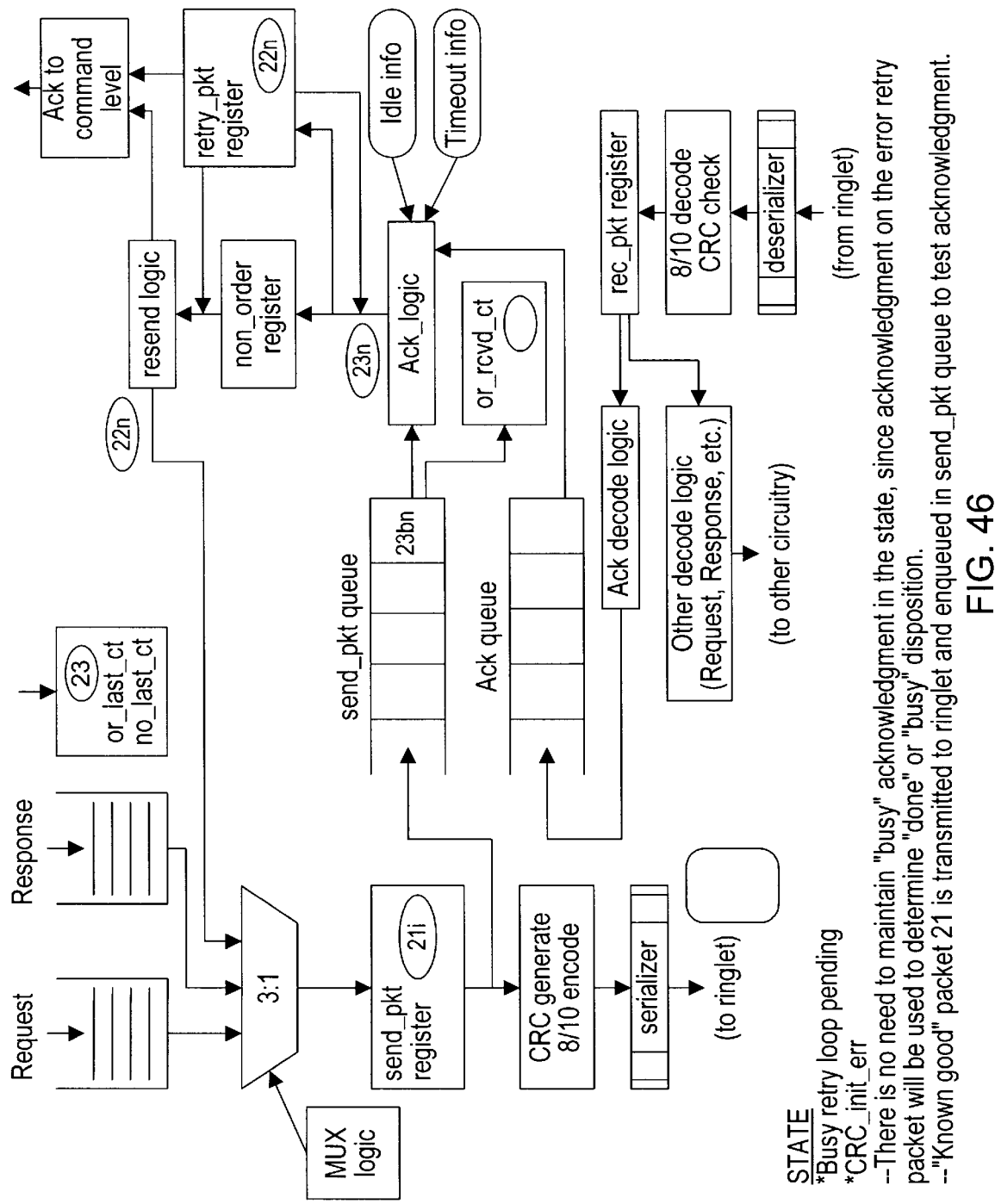
Figure 47:
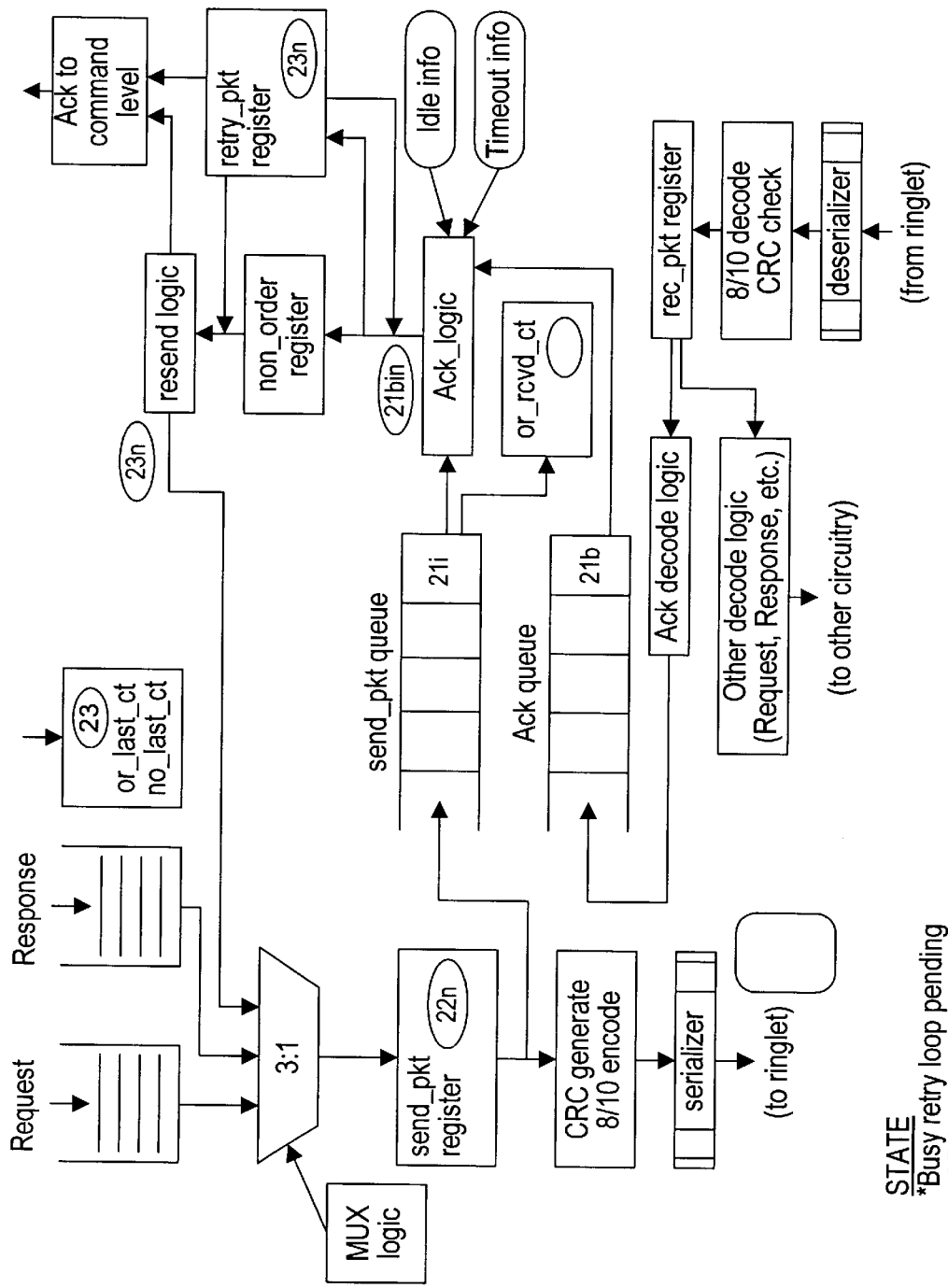
Figure 48:
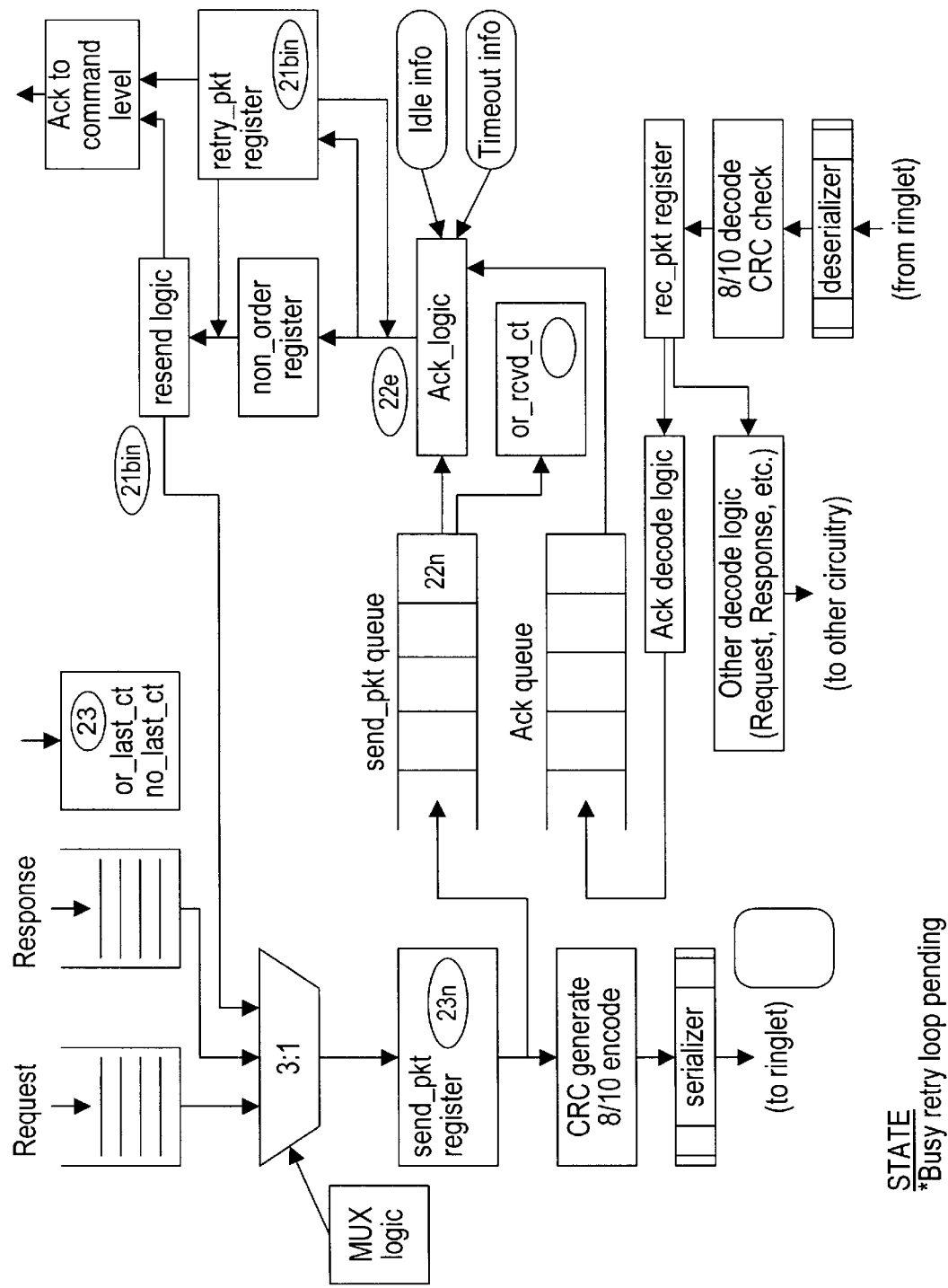
Figure 49:
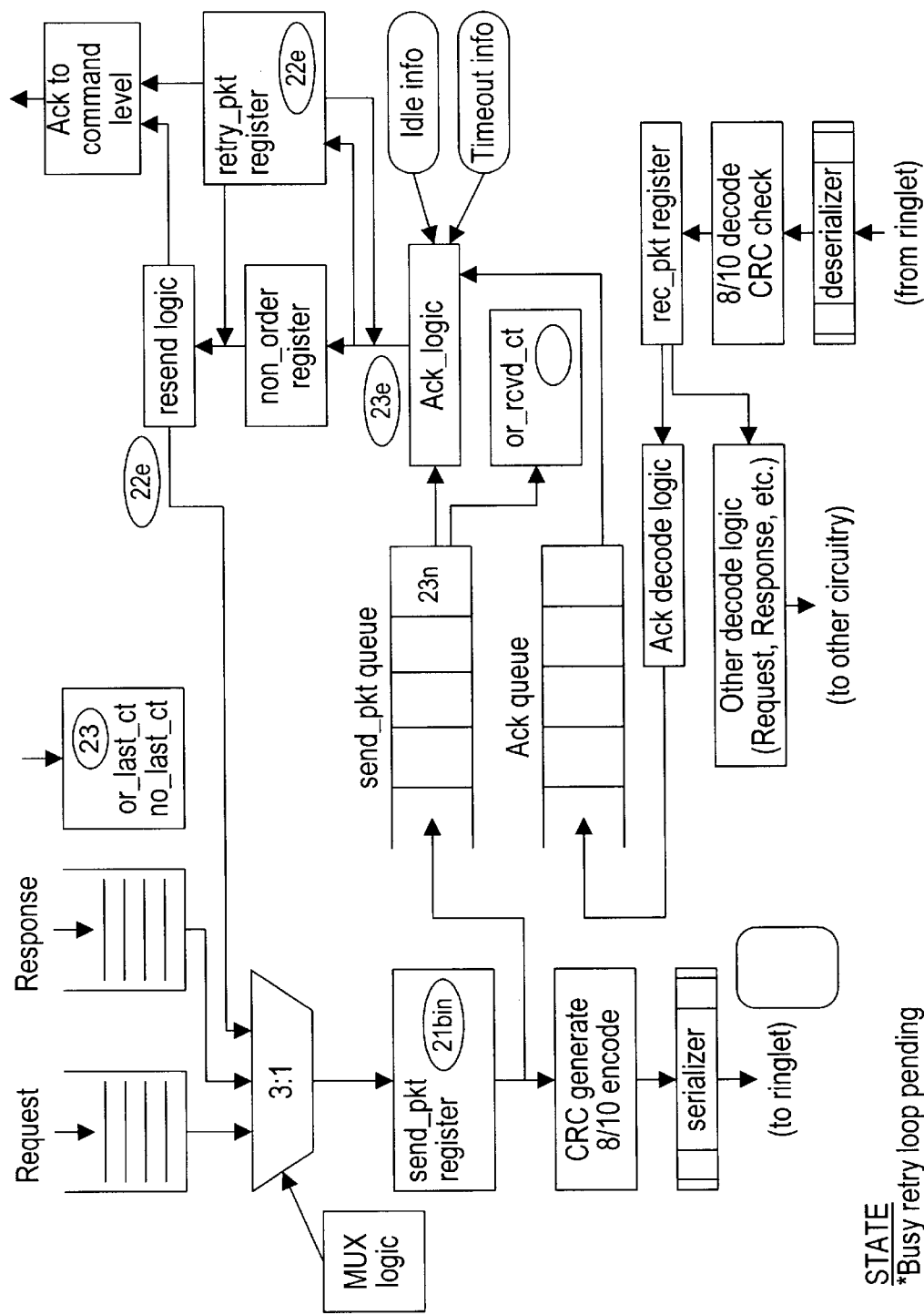
Figure 50:
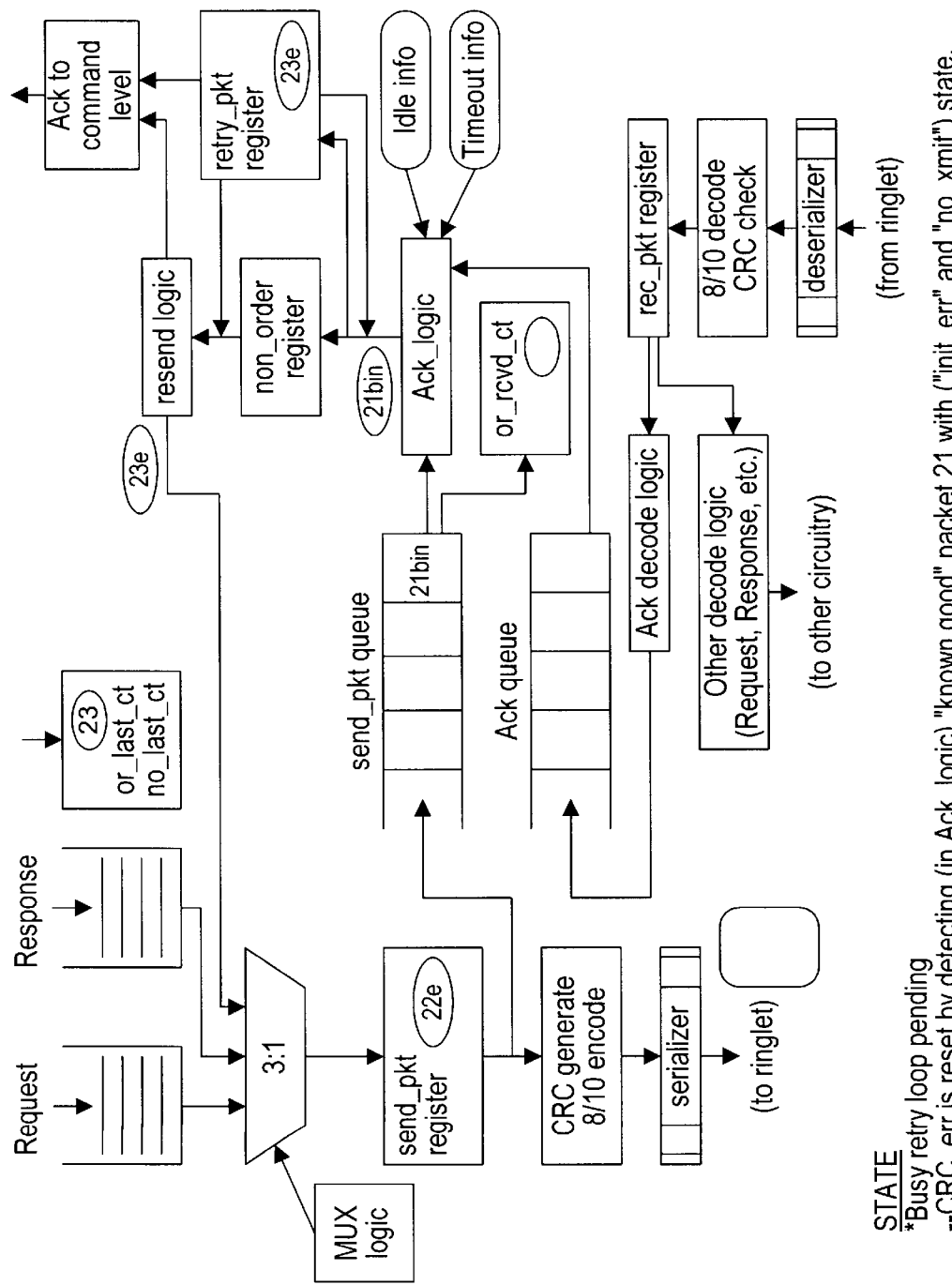
Figure 51:
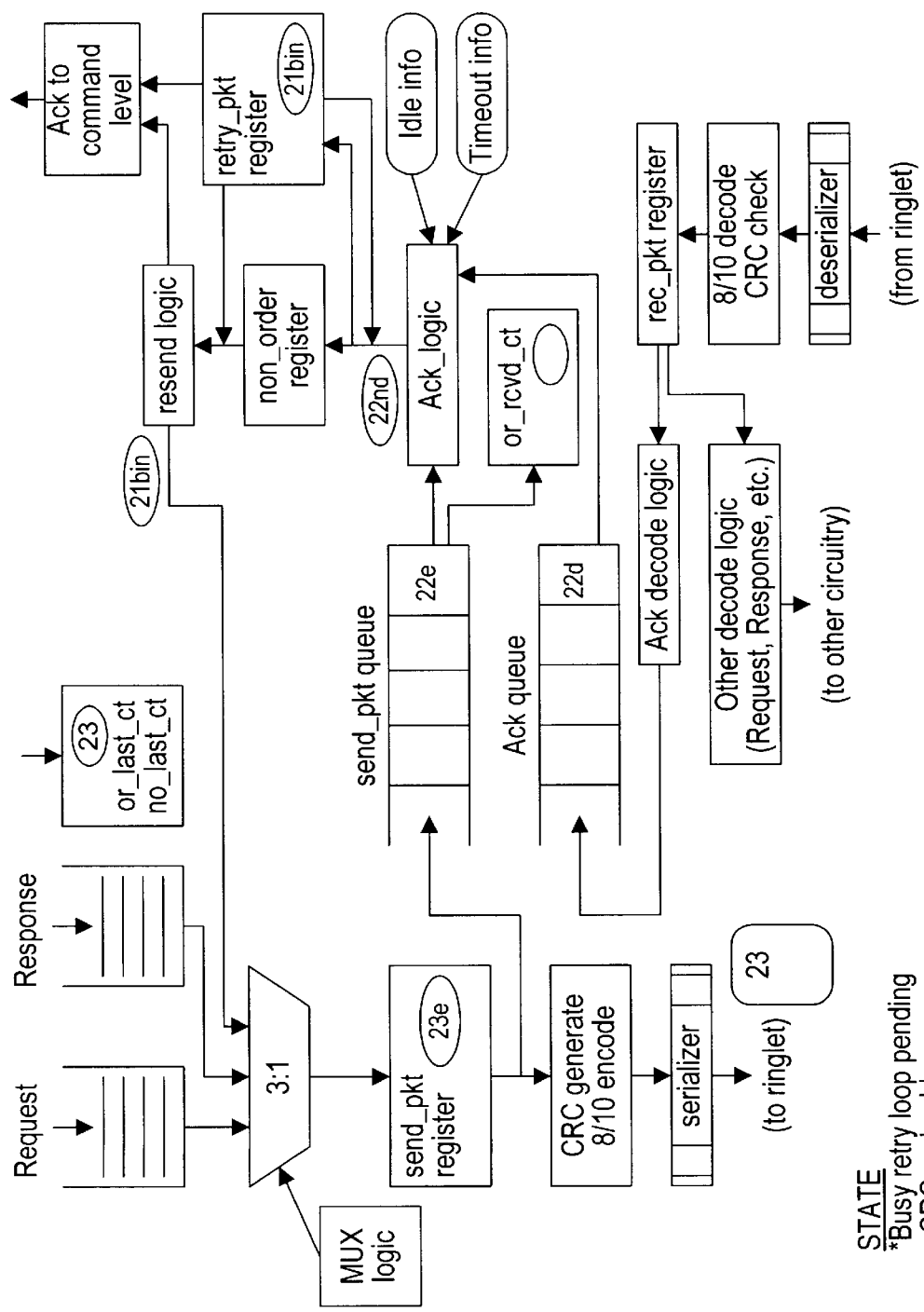
Figure 52:
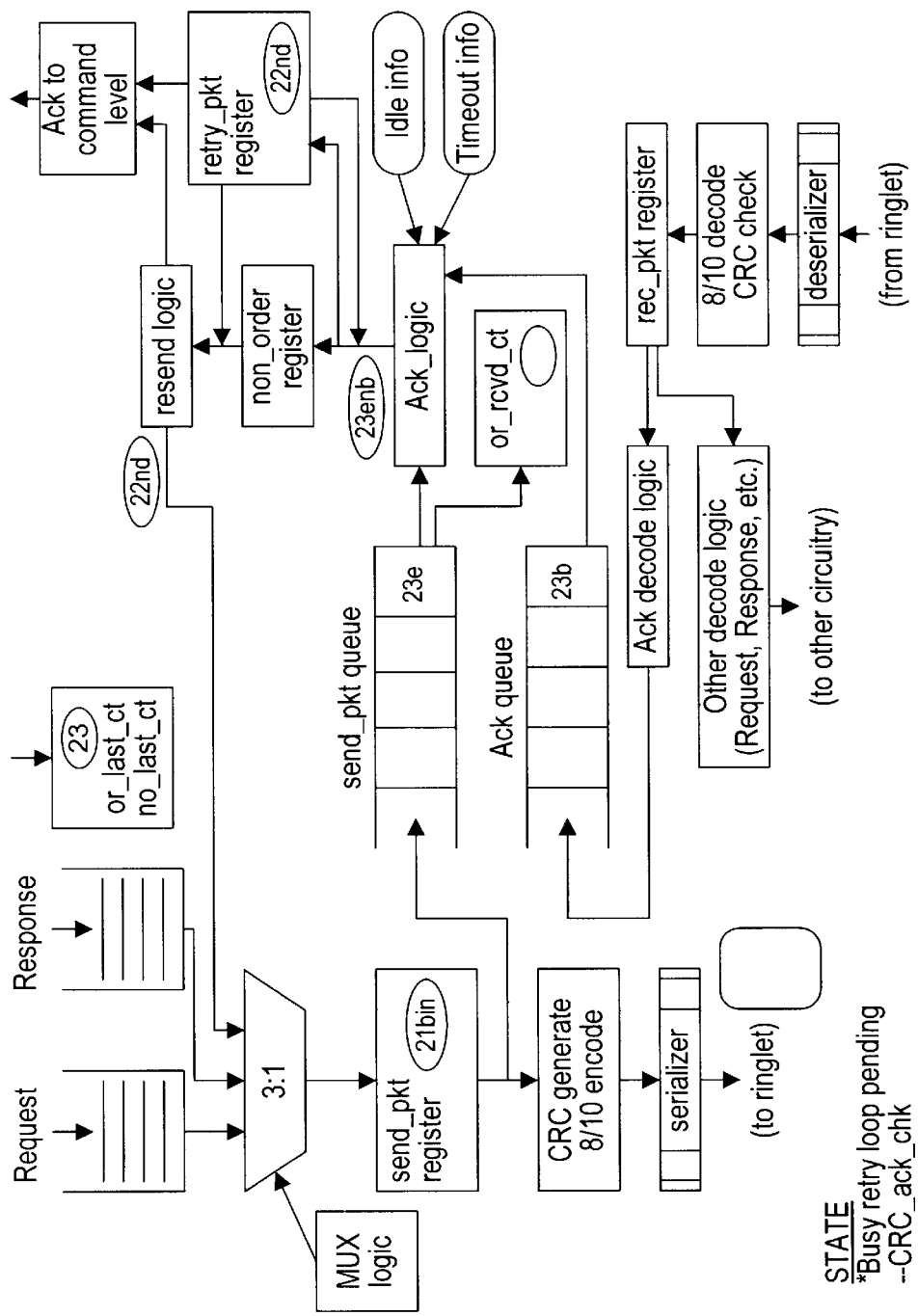
Figure 53:
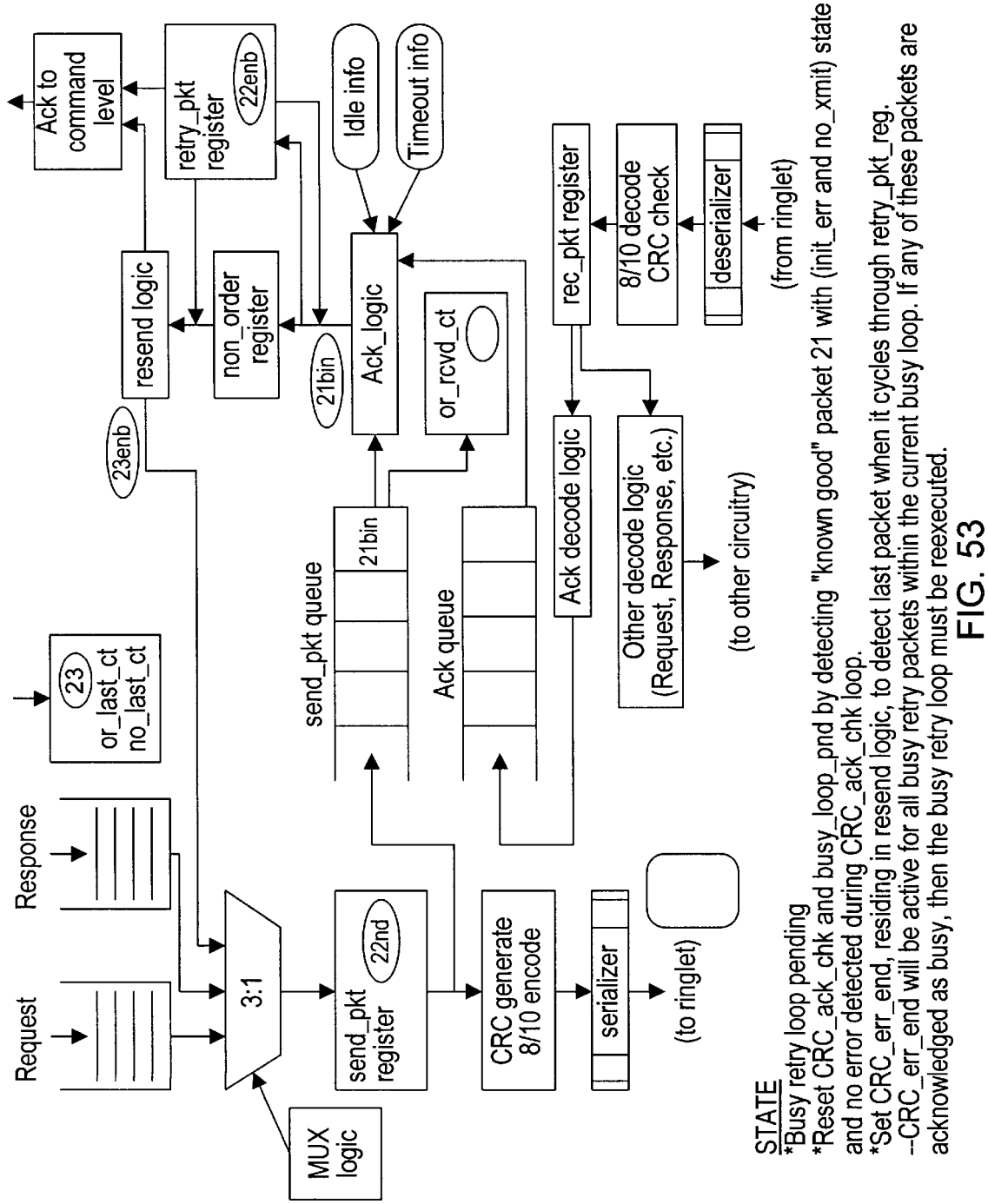
Figure 54:
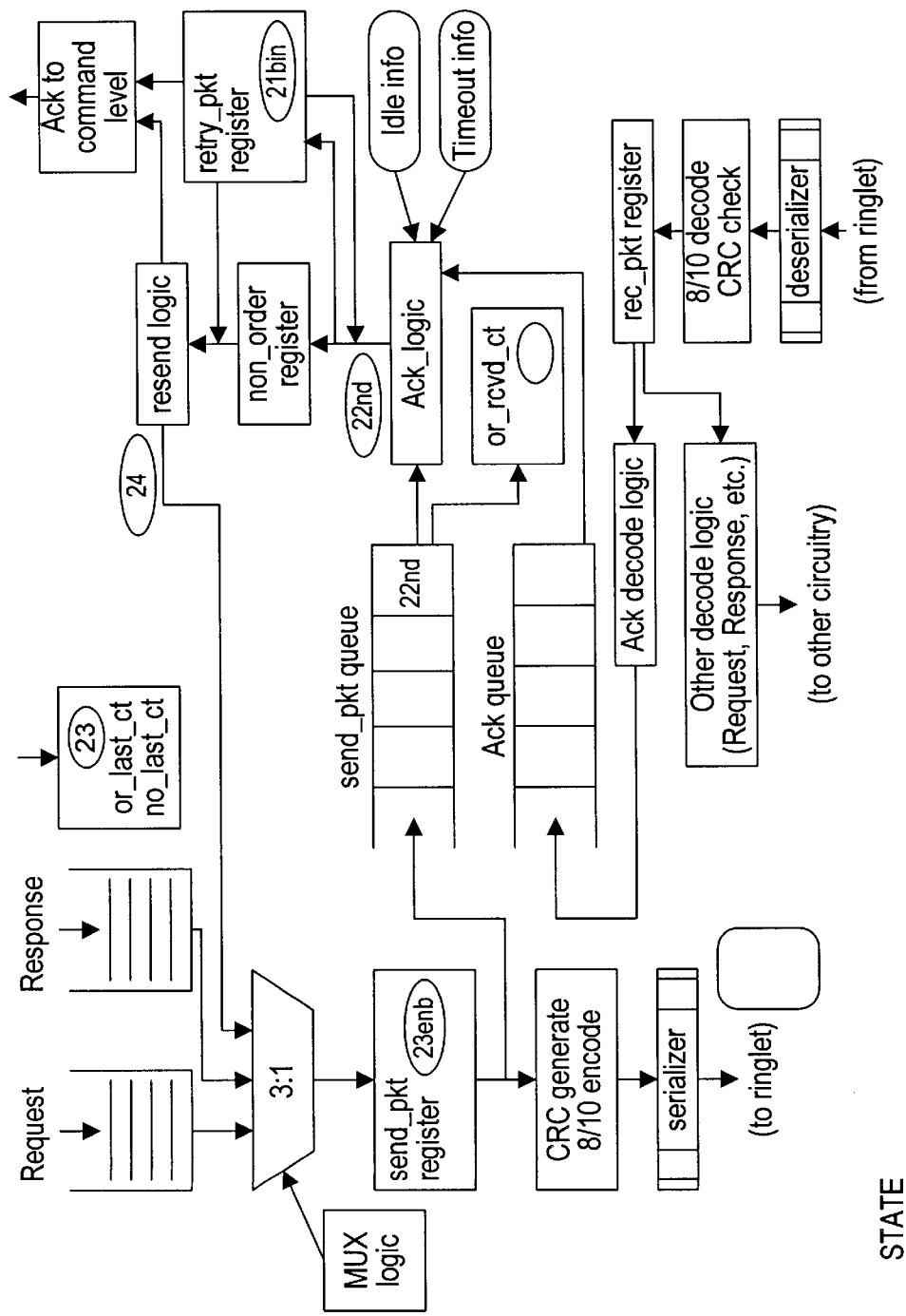
Figure 55:
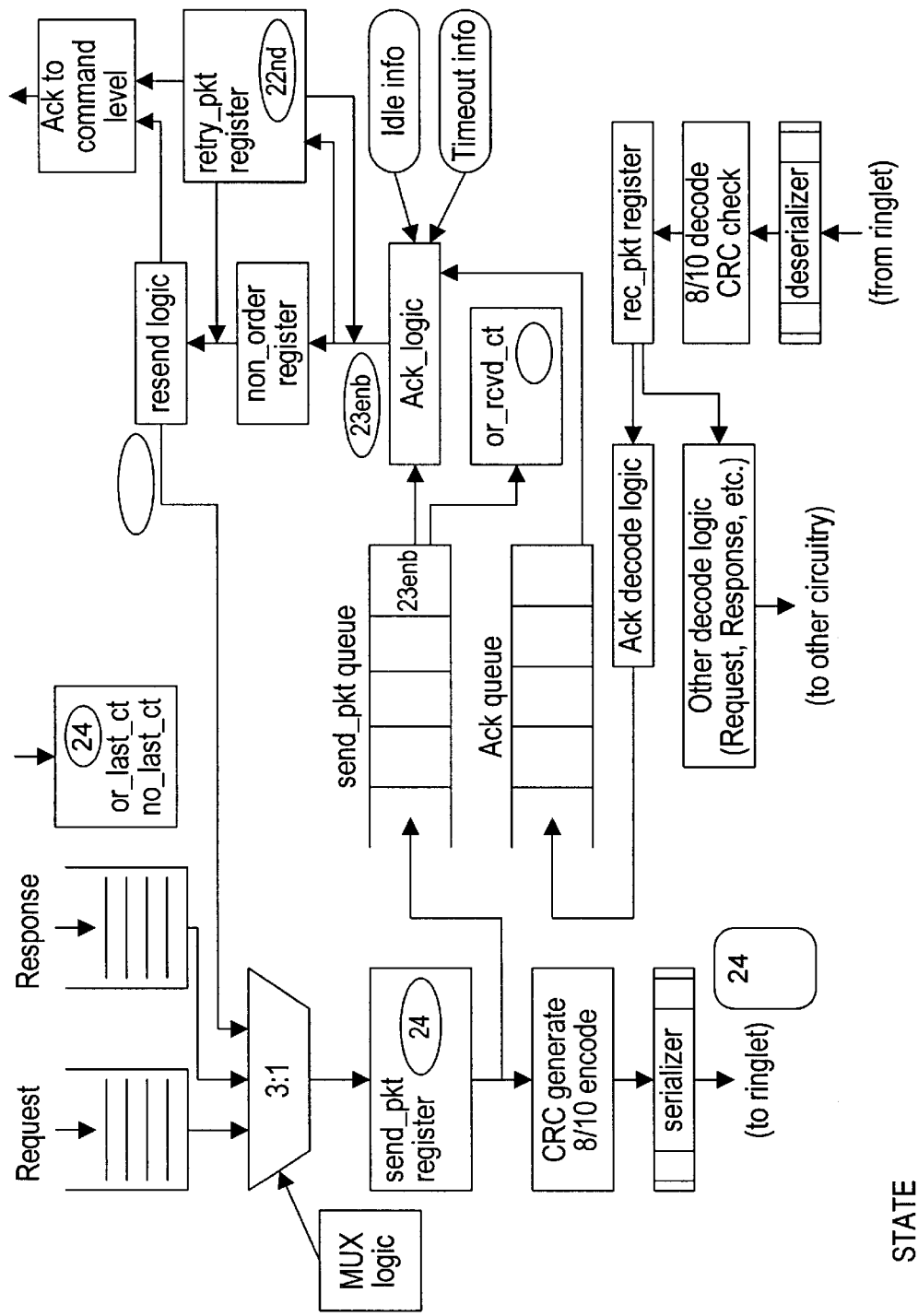
Figure 56:
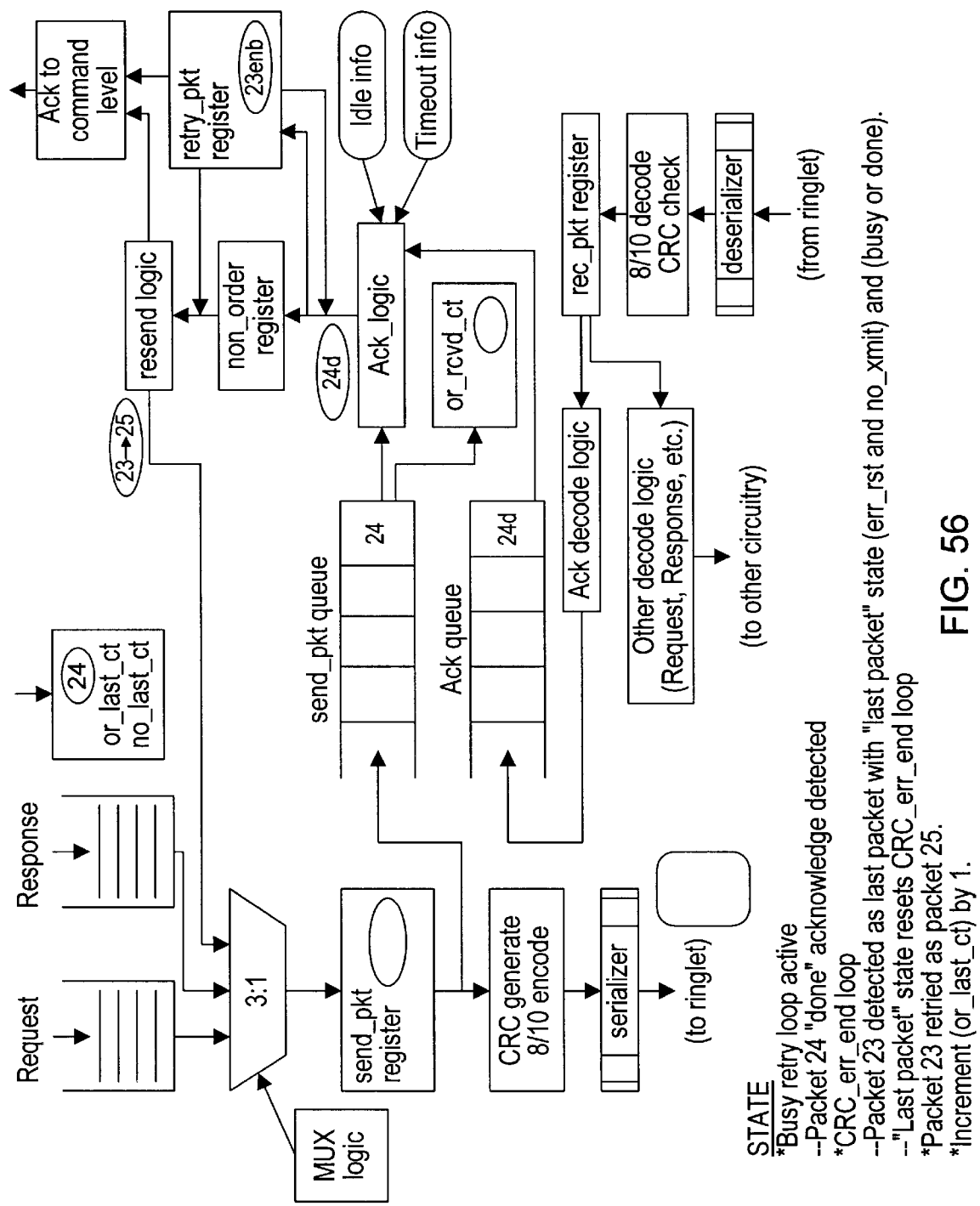
Figure 57:
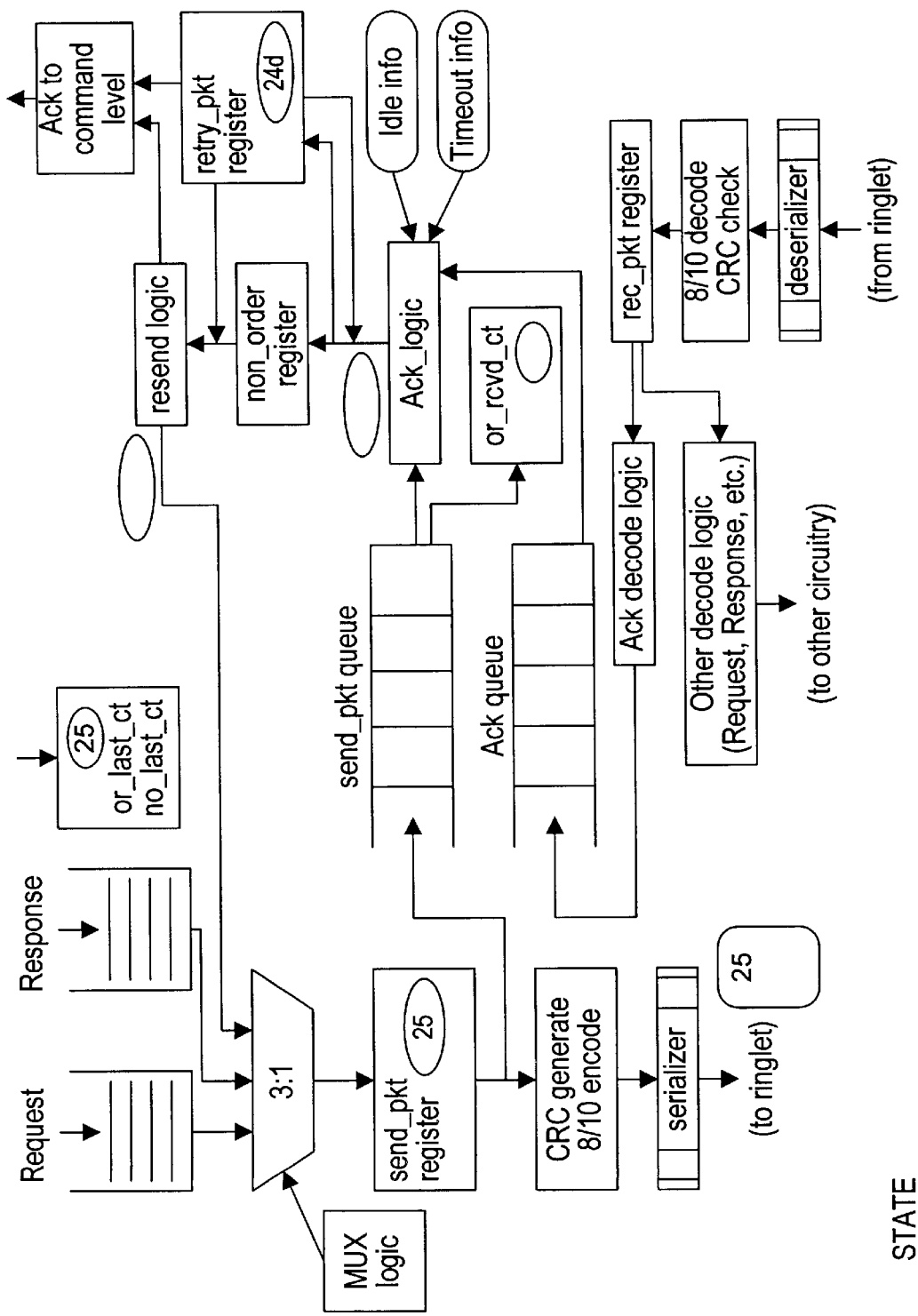
Figure 58:
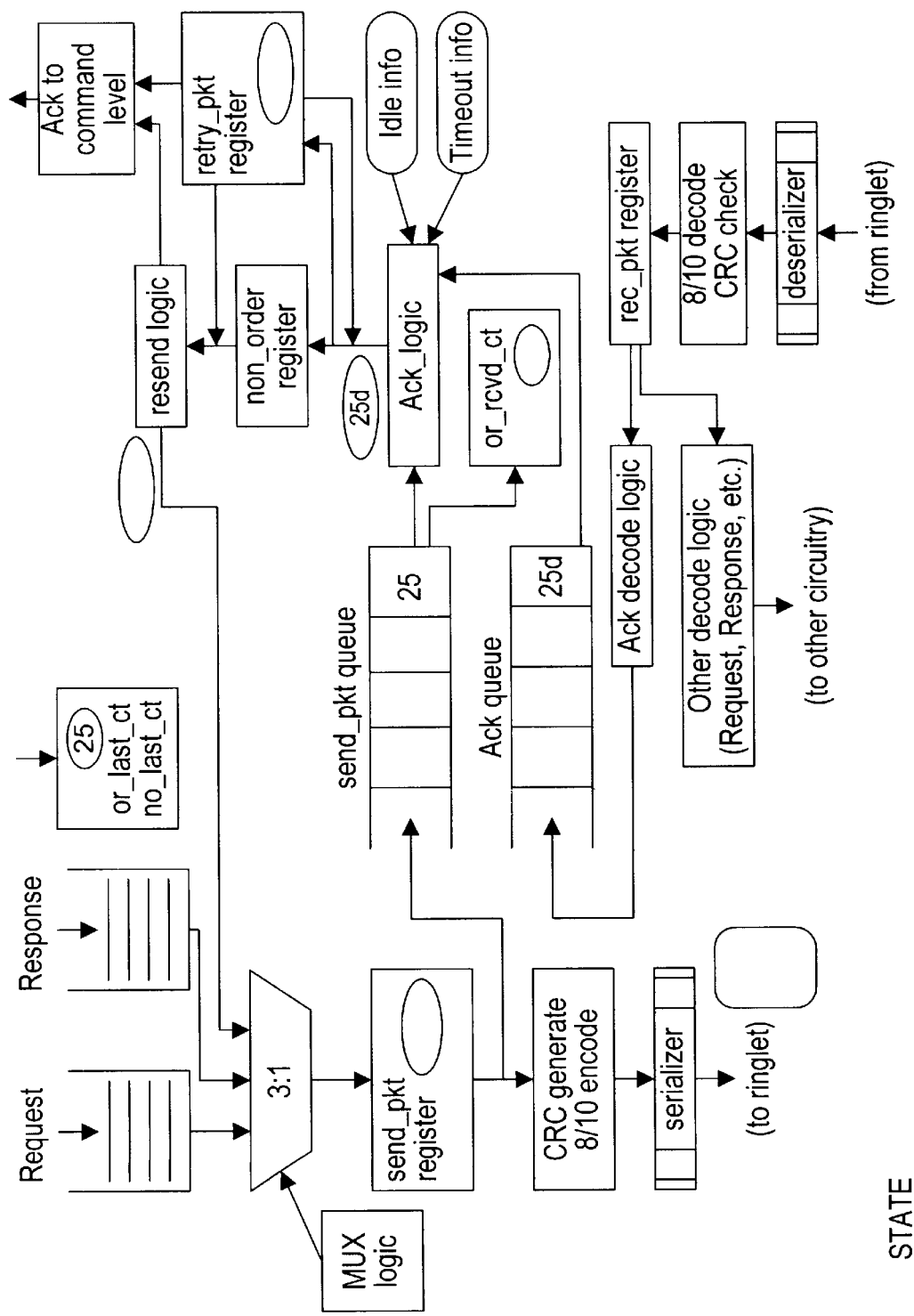
Figure 59:
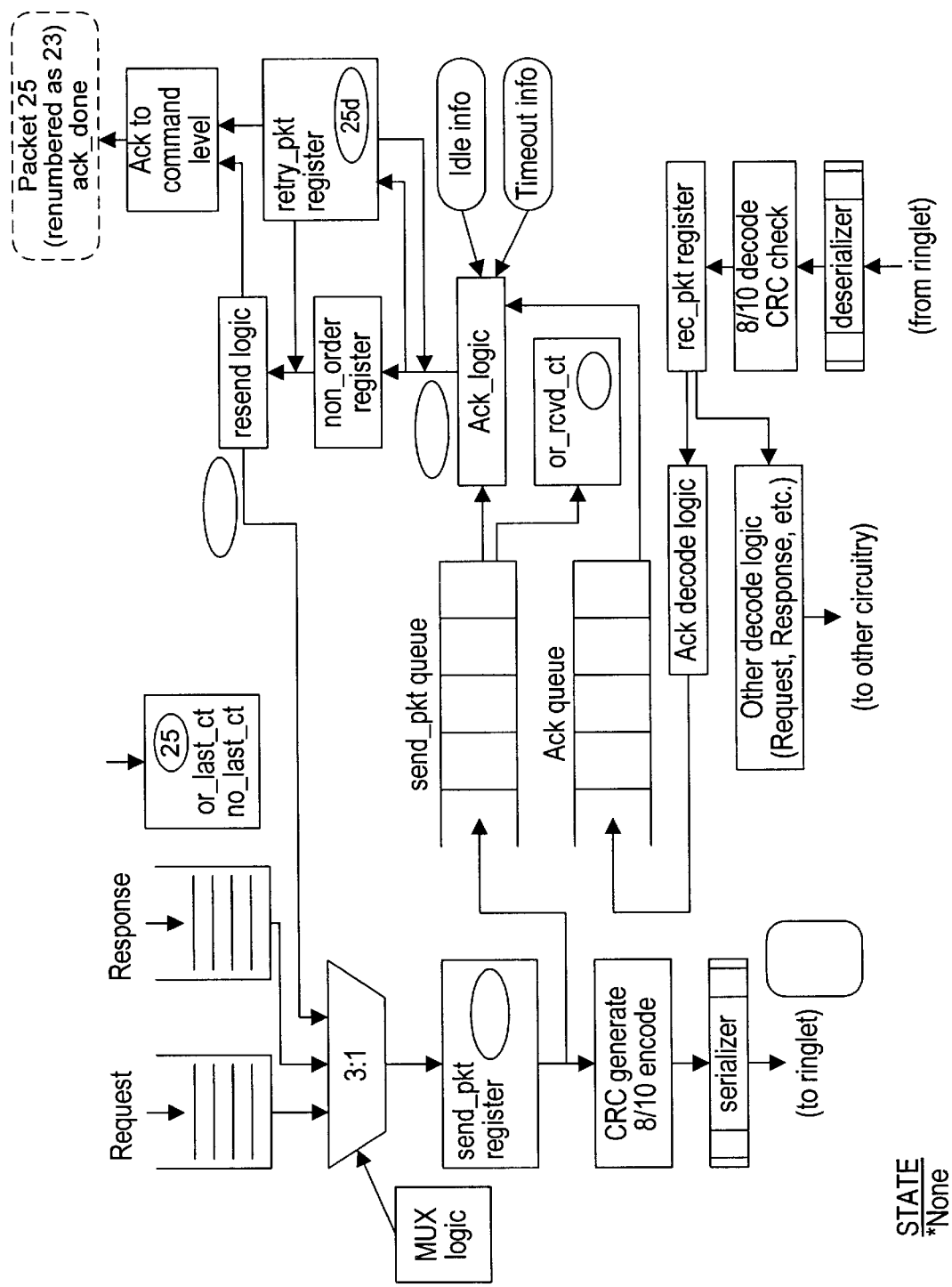

In FIG. 39, the fundamental blocks of the system are shown. In the absence of the SSO ordering extensions, this system would include all blocks with the following deletions and changes:

Delete retry_pkt register, 7–190.

Delete retry_pkt queue, 7–30.

Delete or_last_ct counter inside 7–100; retain no_last_ct.

Modify 4:1 mux to be 3:1 mux, 7–40.

Delete or_rcvd_ct counter, 7–250.

Other blocks remain fundamental to the operation of a send node with no SSO support.

The basic operation of the system is as follows, with reference to both FIG. 8 and the more detailed block diagram of FIG. 39. Packets are inserted from the transaction layer into the link layer through the request and response FIFO queues. Packets are selected through the multiplexer (MUX) for (possible) transmission to the ringlet through the send_pkt register, the CRC generator and 8/10 encoder, and the serializer, to the ringlet, as illustrated.

Acknowledges for request and response send packets from this node, as well as incoming request and response packets originating from other nodes but directed to this node, are received in the deserializer. After an 8/10 decoding and CRC check, incoming receive and acknowledge packets are registered in the rec_pkt register. Idle symbols are stripped before the rec_pkt register. CRC errors or 8/10 encoding errors invalidate any incoming receive and acknowledge packets. Acknowledges with CRC errors are not visible beyond the rec_pkt register, and received send packets from other nodes are processed so that they are not visible to the transaction layer. (See the receive buffer description.) The ack decode logic, detects acks addressed to this node for the send packets it had transmitted through its serializer.

Acks are queued in the ack queue, and matched with send packets in the send_pkt queue, in the ack_logic block. In the absence of SSO support, all packets would flow through the non_order register; with SSO, all SSO packet flow through the retry_pkt register, and non-SSO packets continue through the non-order register.

The resend logic basically examines ack status to determine whether a packet is completed (ack_done) or requires retry because of a busy receiver (ack_busy). Ack_done packets return status to the transaction layer through the "Act to command level" block. Non-SSO busy retry packets may be selected to retry through the MUX logic and the 4:1 (or 3:1, depending upon the selected embodiment of the invention) MUX. SSO busy retry packets are enqueued into the retry_pkt FIFO queue. They are selected from this queue through the MUX logic, and the MUX, by the SSO busy retry logic, which is distributed throughout the system and described in the flow-charts for send logic, FIGS. 9–25.

The send logic of FIGS. 9–25 operates basically in the following manner. Its details of operations will become clearer below in connection with the example flow in relation to the state/flow diagrams of FIGS. 39 et seq. Each of the logic units (e.g. ack_logic) in the following description refers to those elements in FIG. 39.

Figure 9:
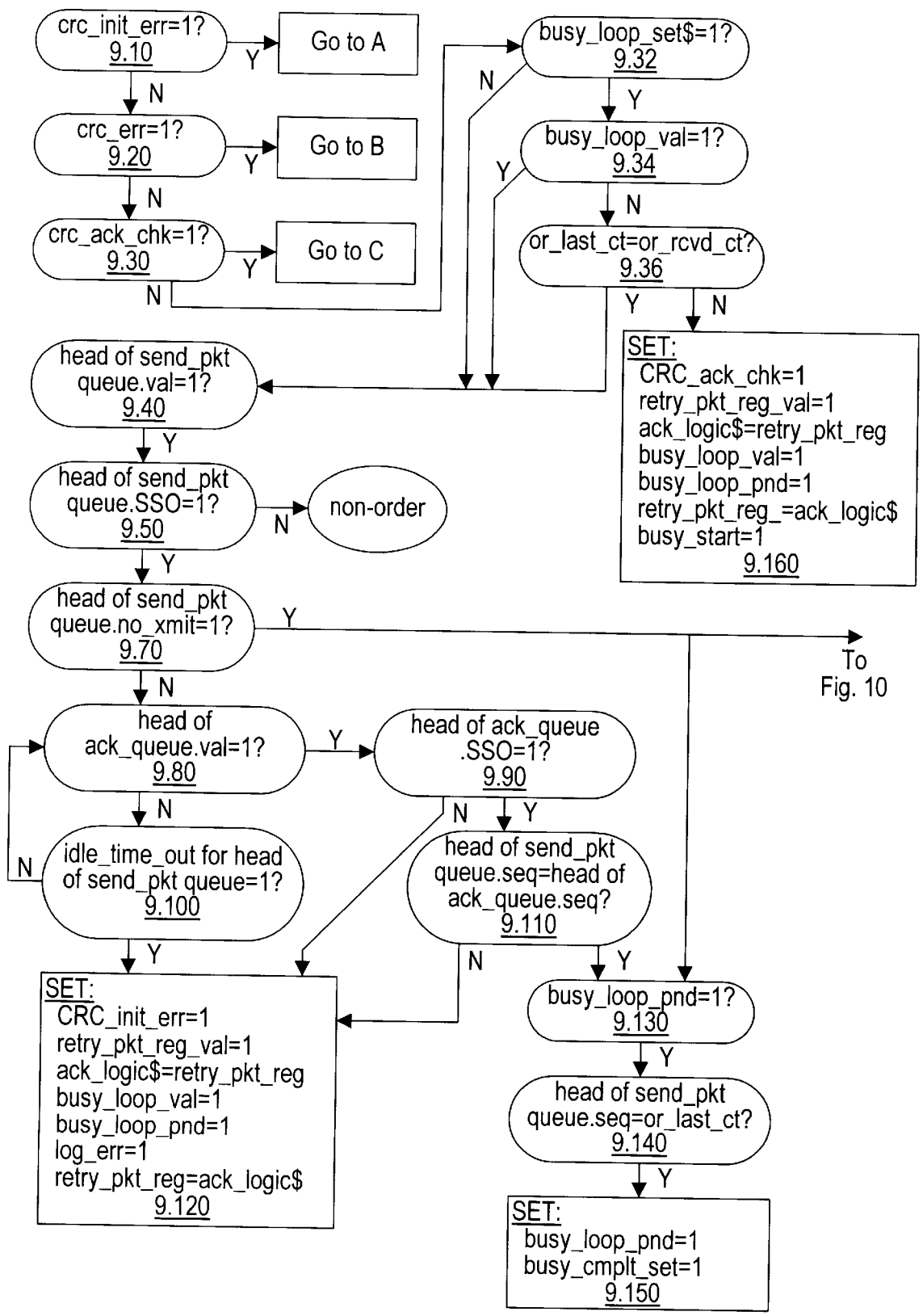
FIGS. 9–25 are logic diagrams illustrating logic subsystems of the system of the invention, and their operation, in which (in the informal drawings) hexagons are decision boxes and rectangles are steps at which variable values are set.

FIG. 9: ack logic for testing packets against acknowledgments for error conditions, and starting busy retry in the absence of errors.

Figure 10:
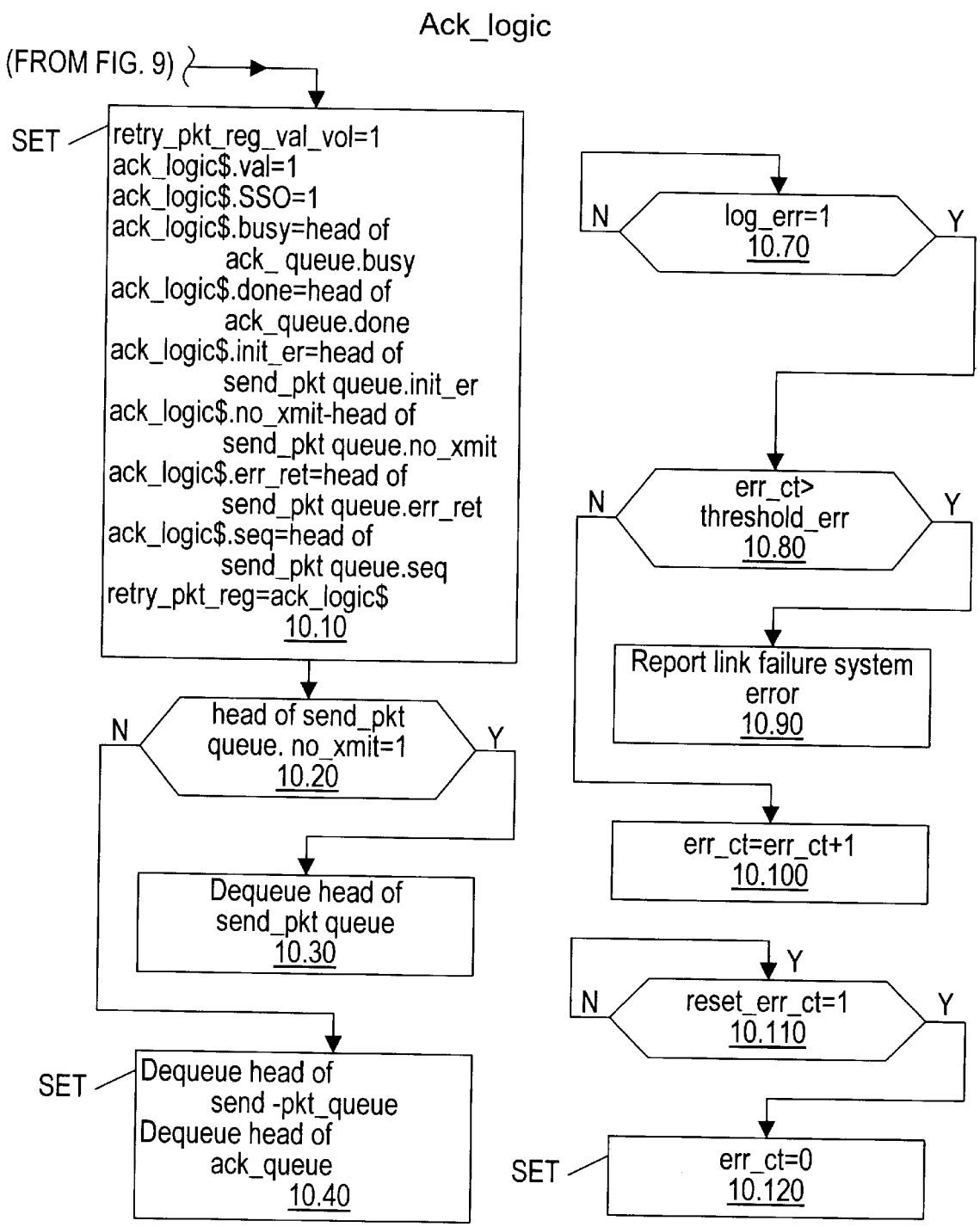

FIG. 10: ack logic for setting ack logic output for normal packet processing, in the absence of errors.

Figure 11:
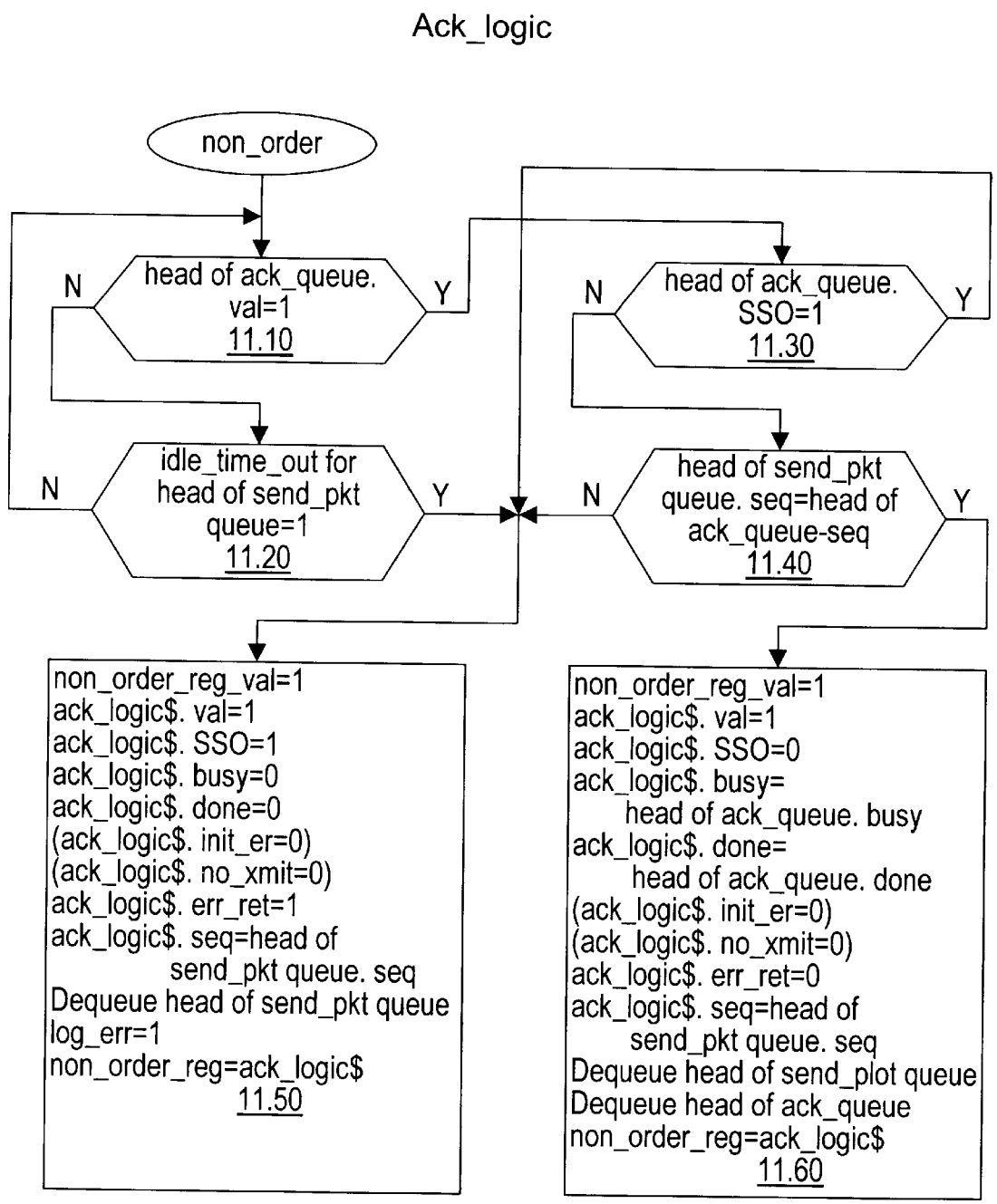

FIG. 11: handling in the ack logic for non-SSO packets to be loaded into the non_order register.

Figure 12:
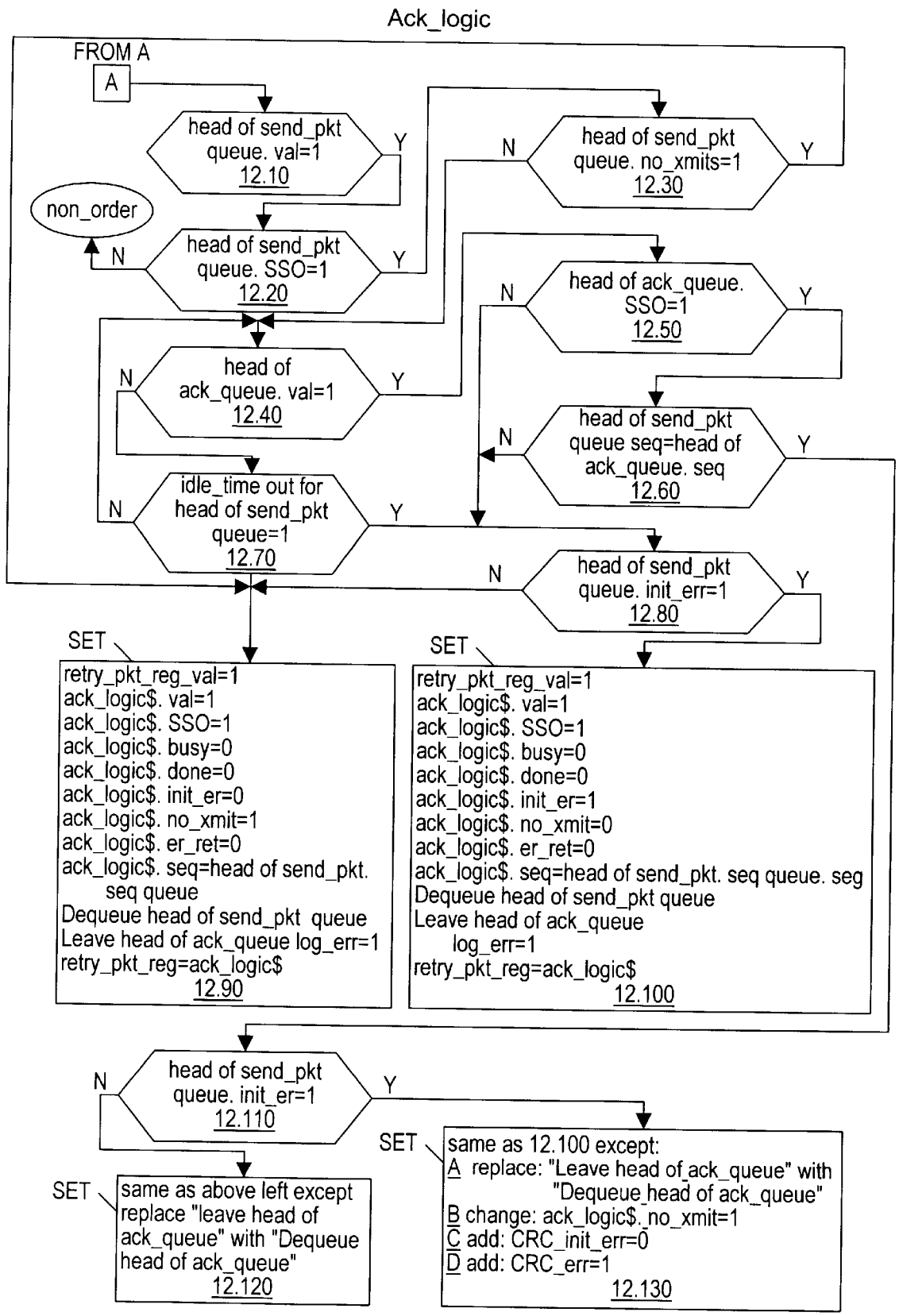

FIG. 12: ack logic handling of the CRC_init_err error retry loop, which resends the last "known good" SSO packet until it receives a valid (done or busy) acknowledgment for this packet.

Figure 13:
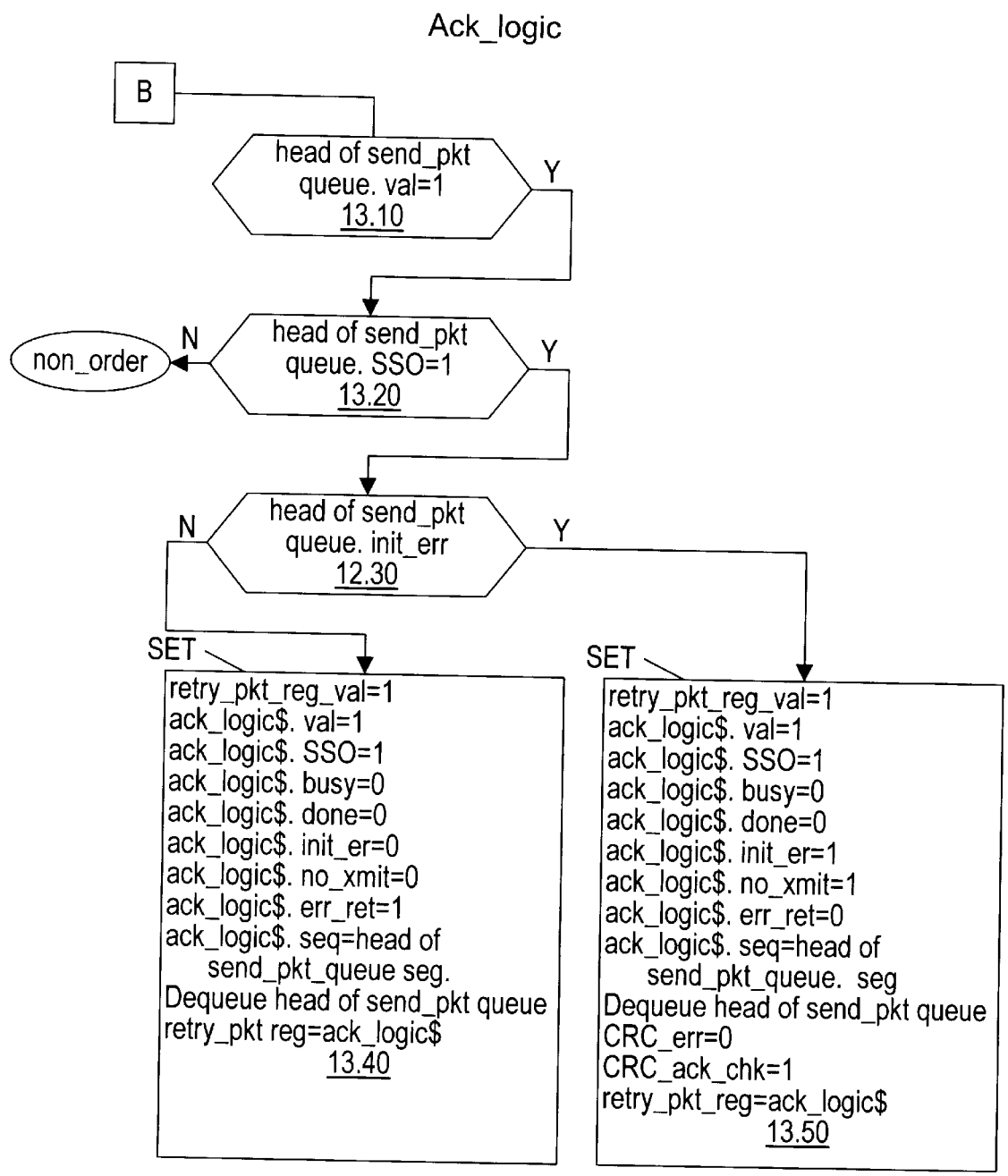

FIG. 13: ack logic handling the CRC_err error retry loop, which resends all packets following the "known good" packet back through the ringlet.

Figure 14:
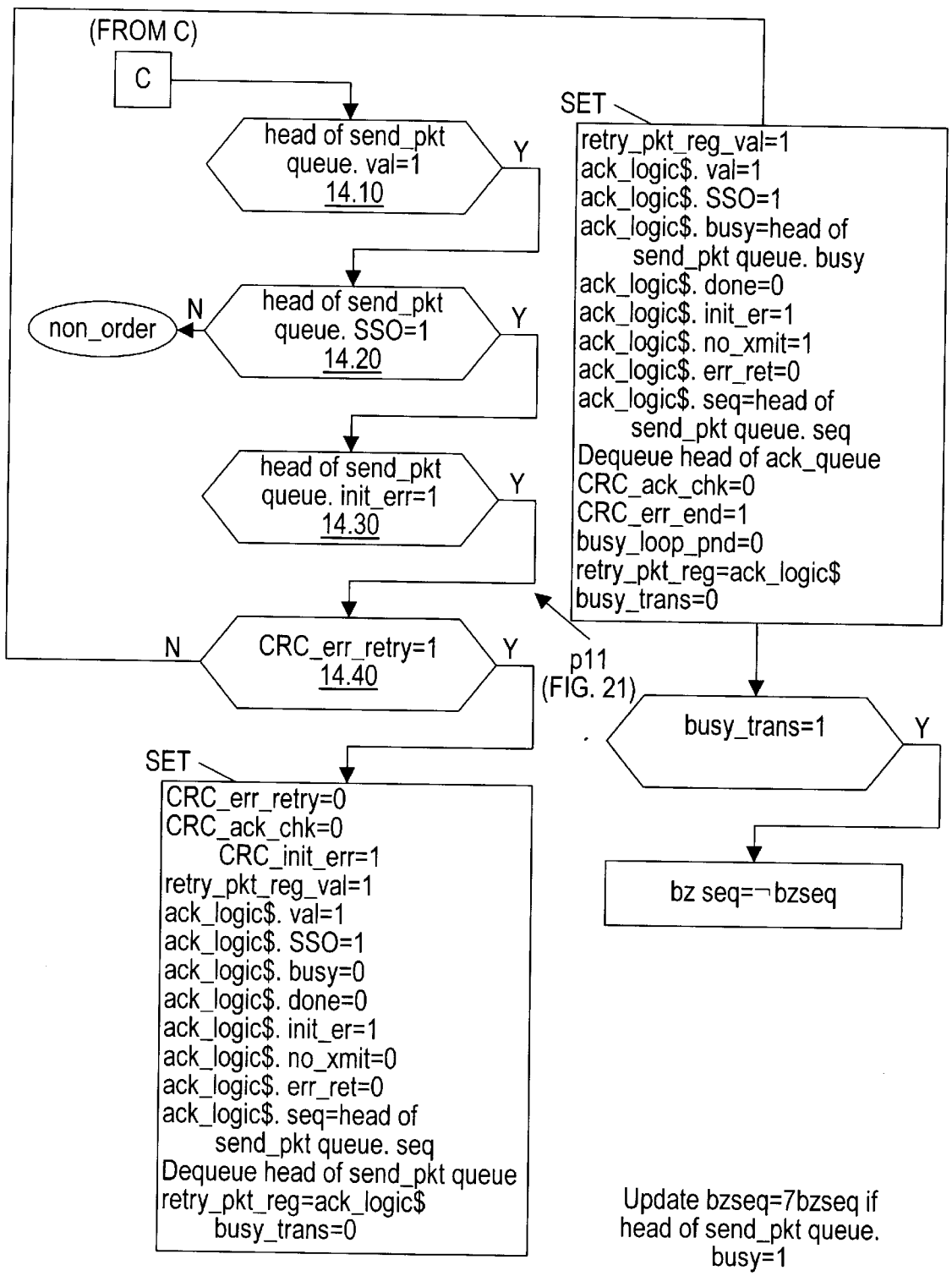
Figure 30:
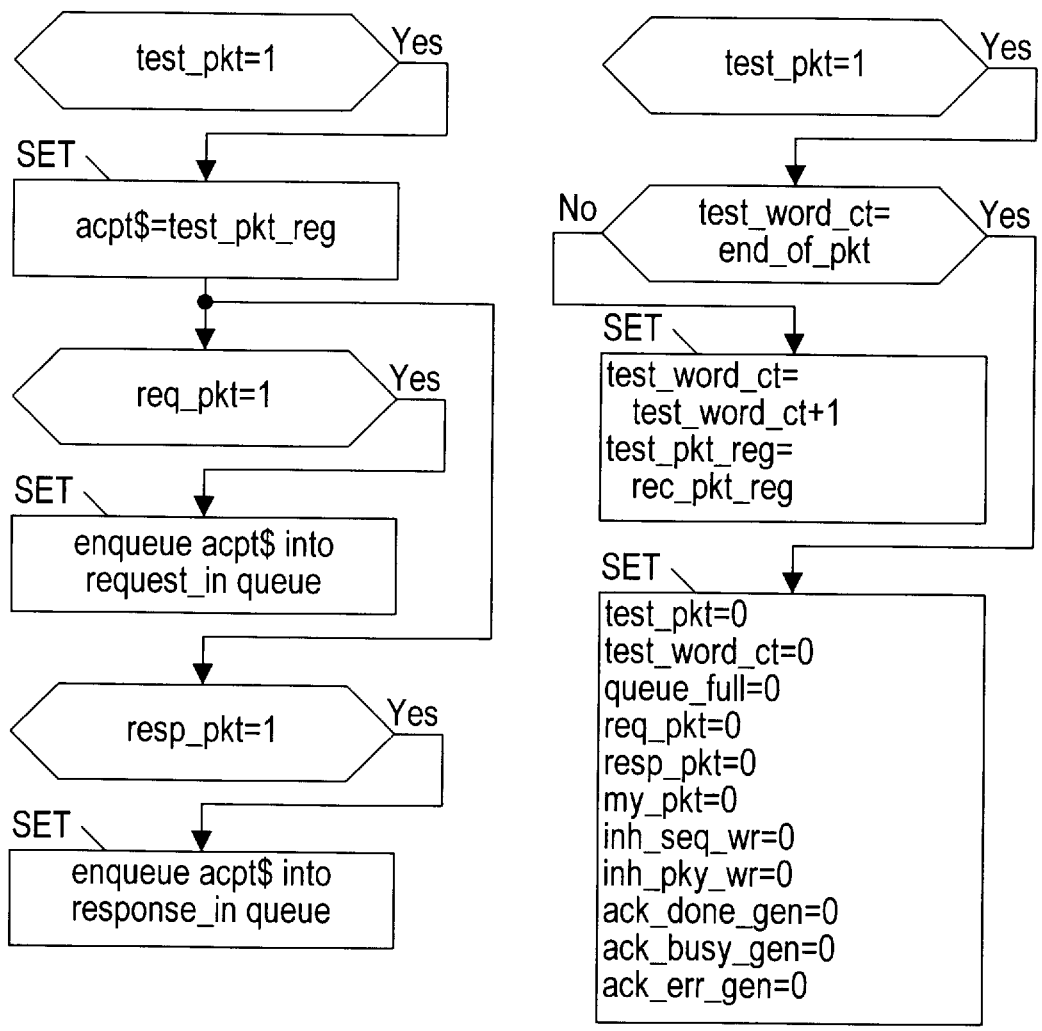

FIG. 14: ack logic handling the CRC_ack_chk error retry loop, which tests whether all of the packets retried in the CRC_err loop completed without error or had an error. If any error is found, the loop is retried, beginning with CRC_init_err (FIG. 30). If no error is detected, CRC_err_end is set.

Figure 15:
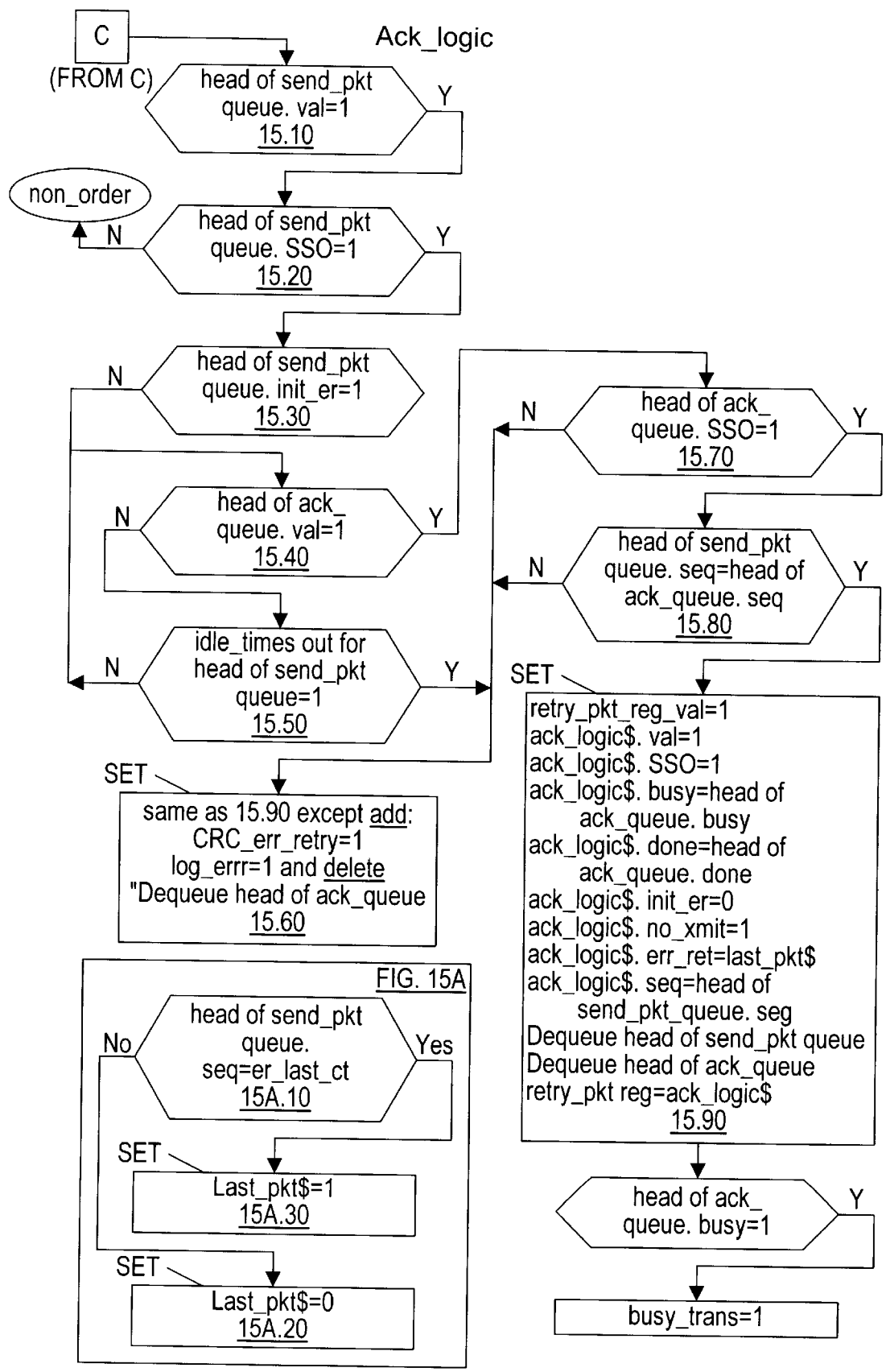

FIG. 15: ack logic handling the CRC_ack_chk error retry loop, which tests the acknowledgment of each packet sent during the CRC_err loop (FIG. 31) for valid acknowledgment (ack_busy or ack_done) and sets an error bit if any error is detected.

Figure 16:
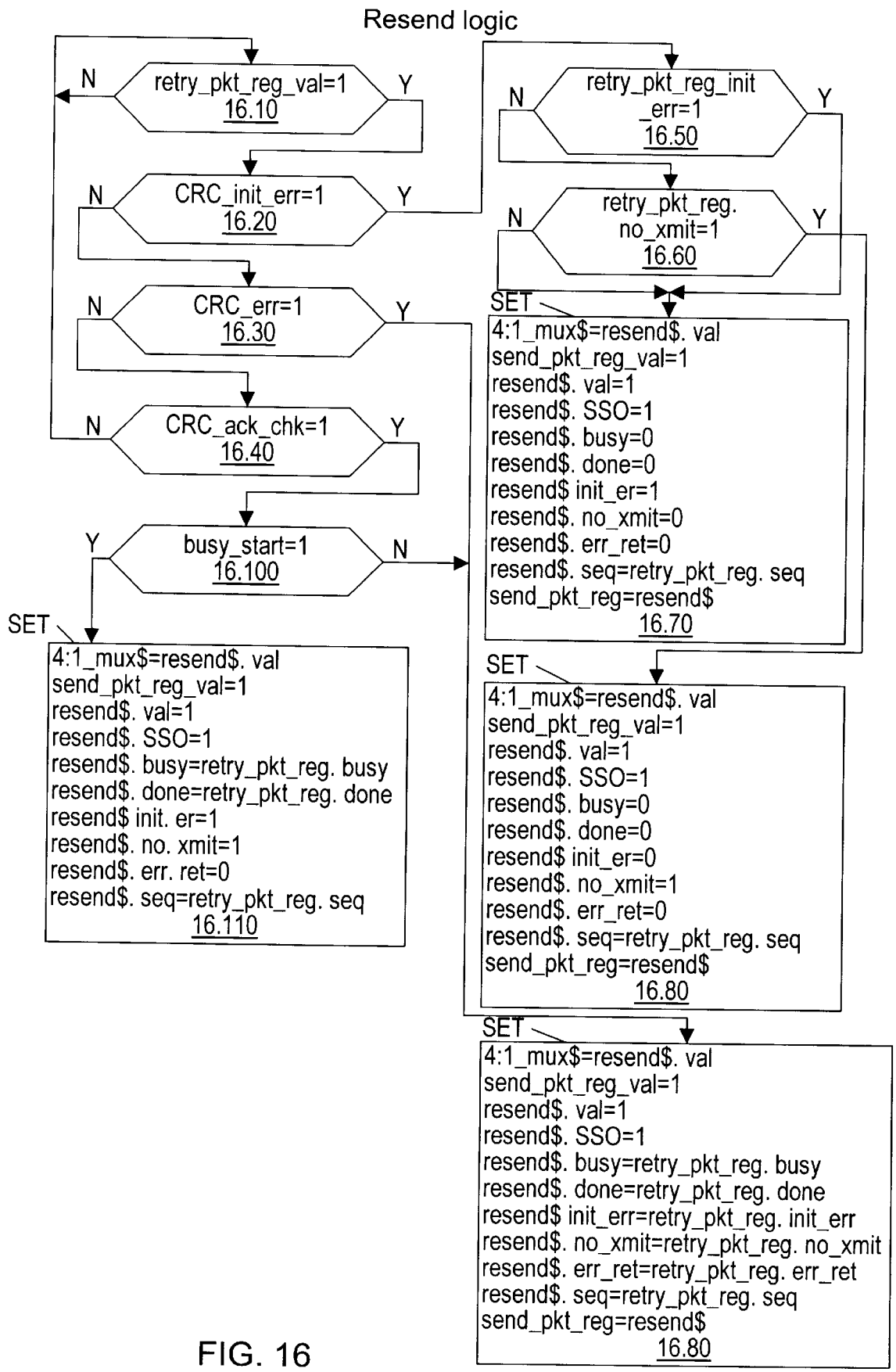

FIG. 16: resend logic handling the formatting of packet state information and setting the MUX while executing the CRC_init_err, CRC_err, and CRC_ack_chk loops.

Figure 17:
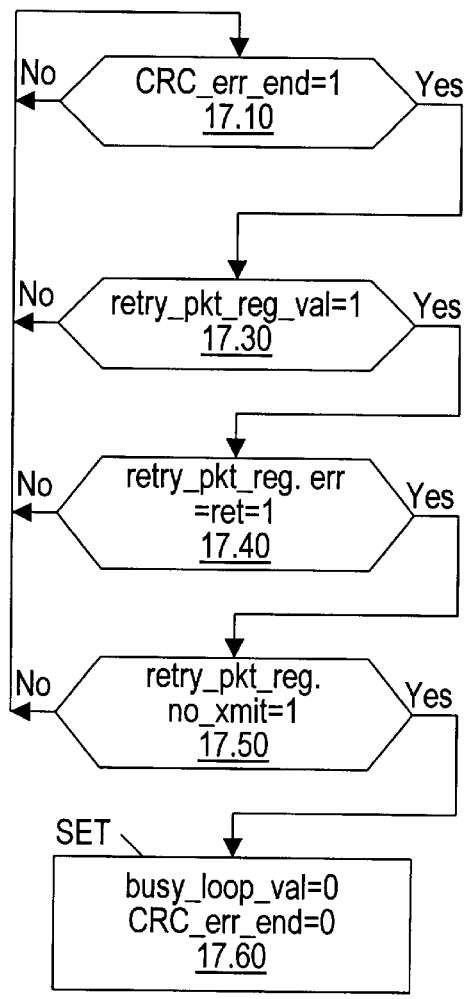
Figure 17A:
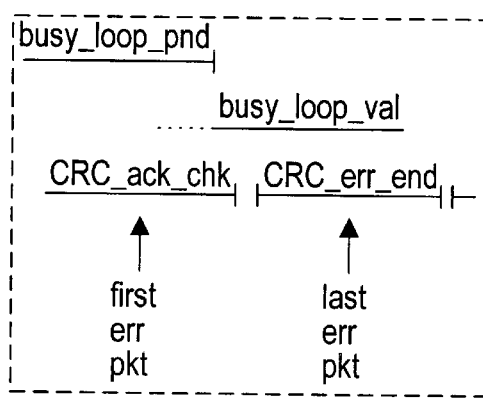

FIG. 17: resend logic to detect conditions to complete the CRC_err_end control and set the busy_loop_cmplt control for detecting the completion of the busy retry loop, by testing for retry_pkt queue empty.

Figure 18:
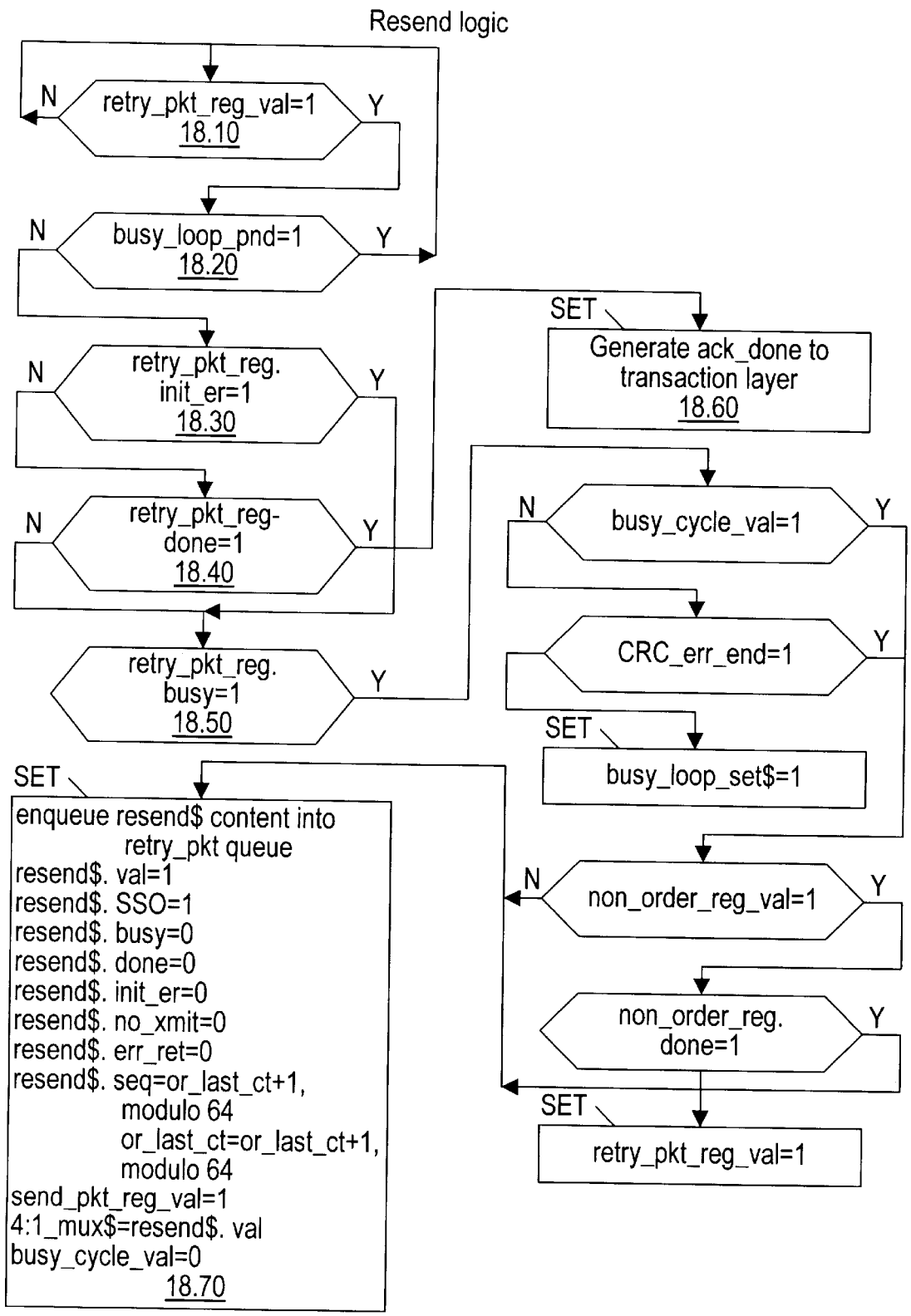

FIG. 18: resend logic to detect SSO packets as done (ack_done) or requiring busy retry (ack_busy). Busy retry packets are enqueued into the retry_pkt queue; done packets are signalled to the transaction layer.

Figure 19:
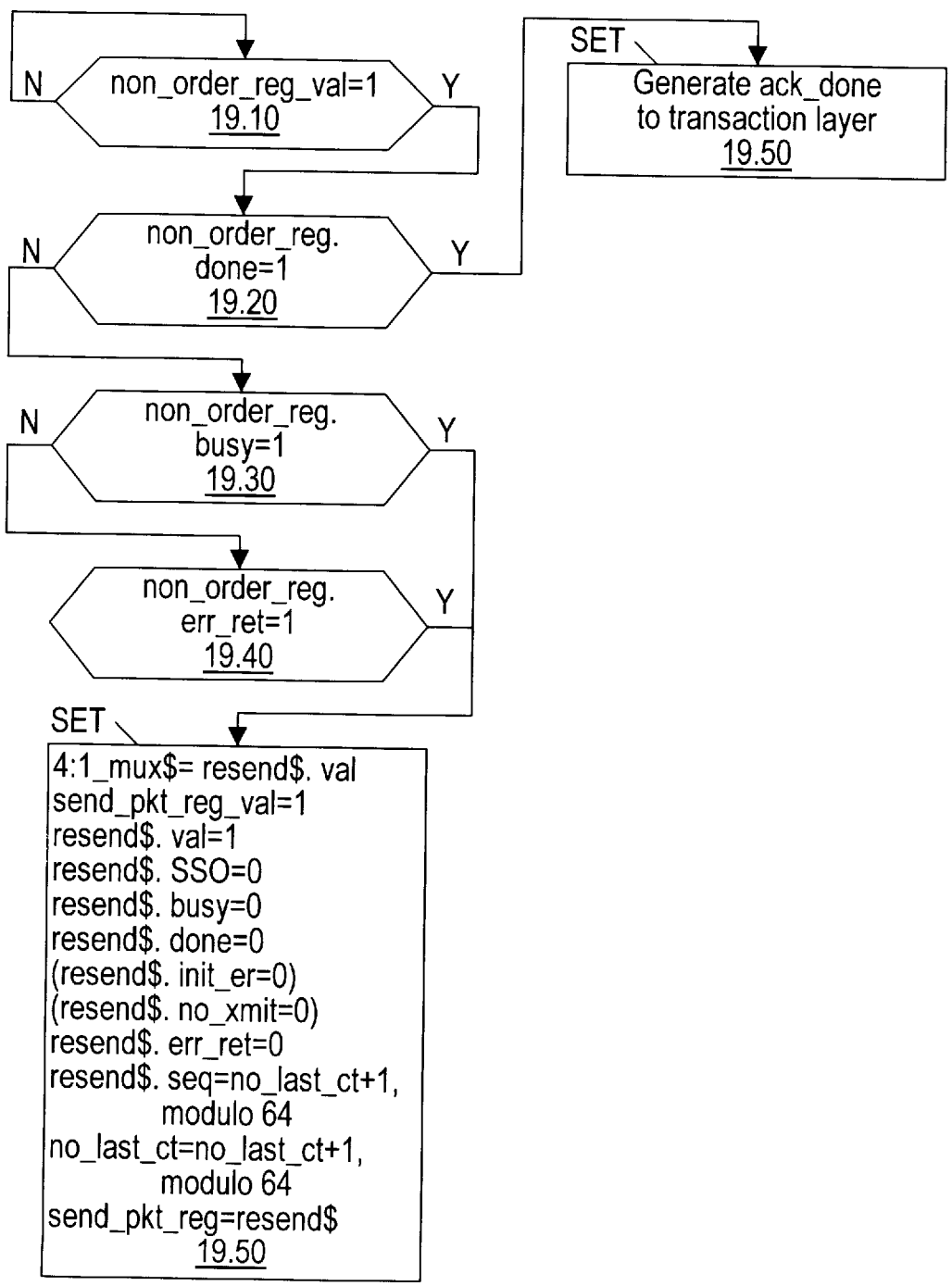

FIG. 19: resend logic to detect non-SSO packets as done (ack_done) or requiring busy retry (ack_busy). Busy retry packets are sent through the MUX for retry; done packets are signalled to the transaction layer.

Figure 20:
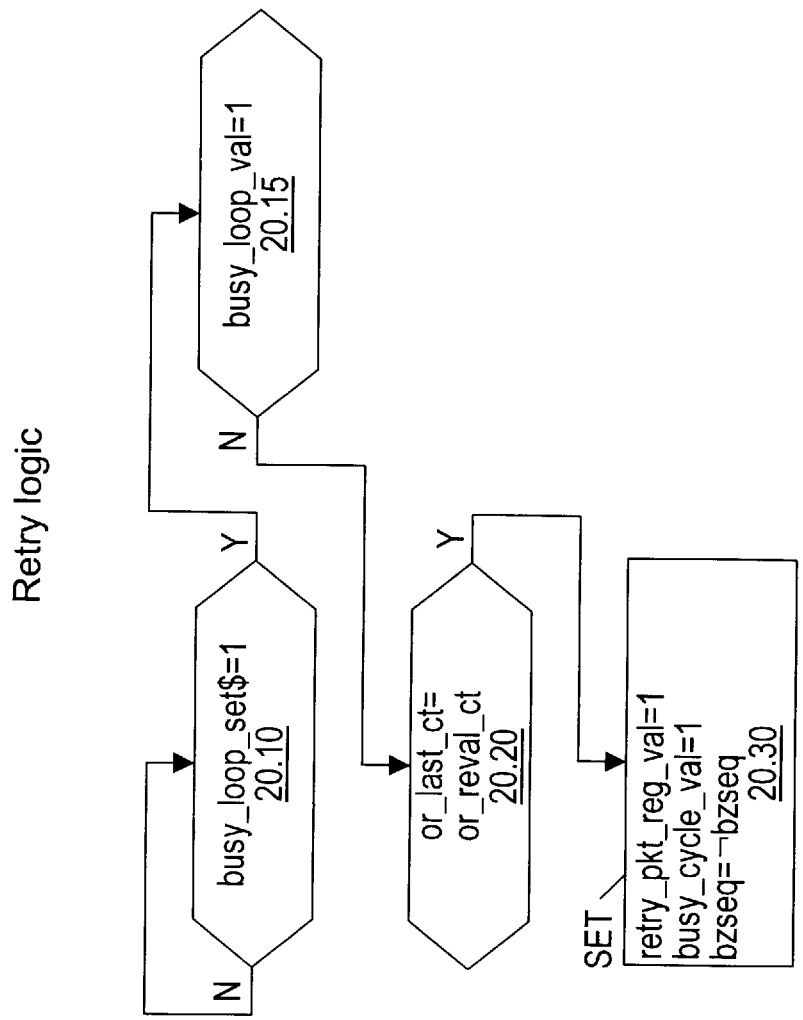

FIG. 20: retry send logic to set the busy loop when no SSO packets are outstanding in the ringlet, and to control the busy retry loop by setting the MUX to select packets from the retry_pkt queue through the retry send block.

Figure 21:
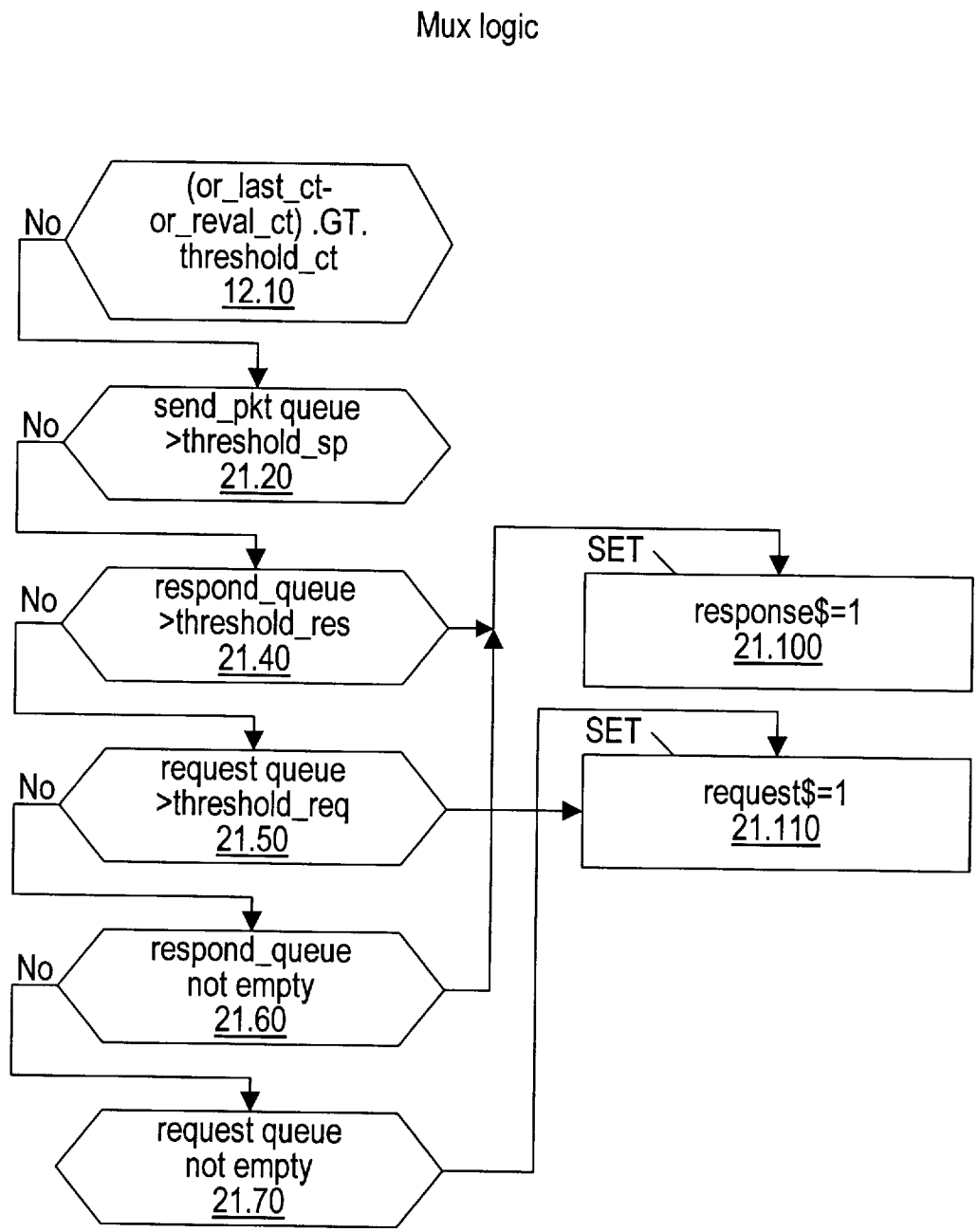

FIG. 21: MUX logic to detect conditions for starting the busy retry loop, selecting a response packet from the response queue, or selecting a request packet from the request queue.

Figure 22:
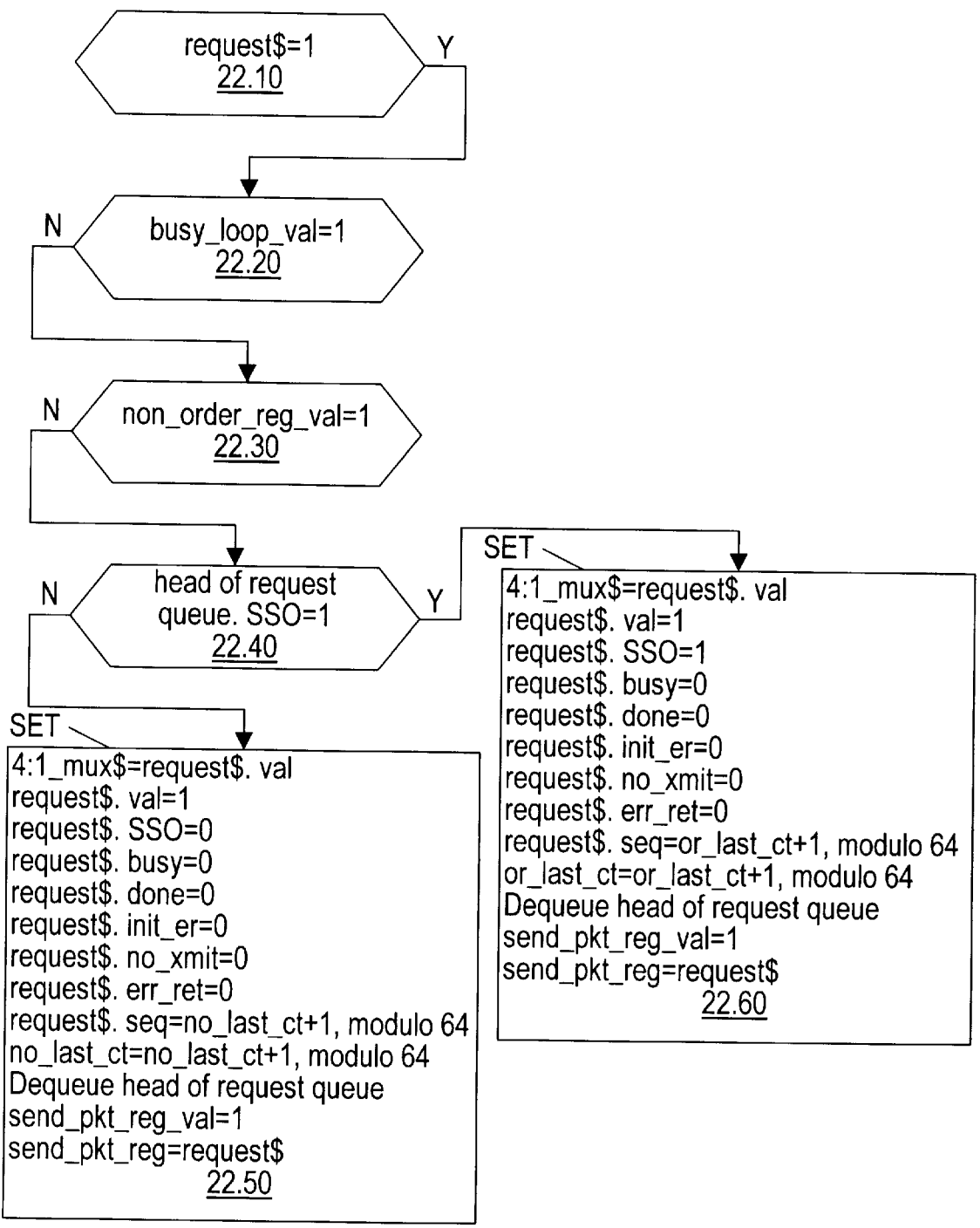

FIG. 22: MUX logic to control the MUX to select a request from the request queue.

Figure 23:
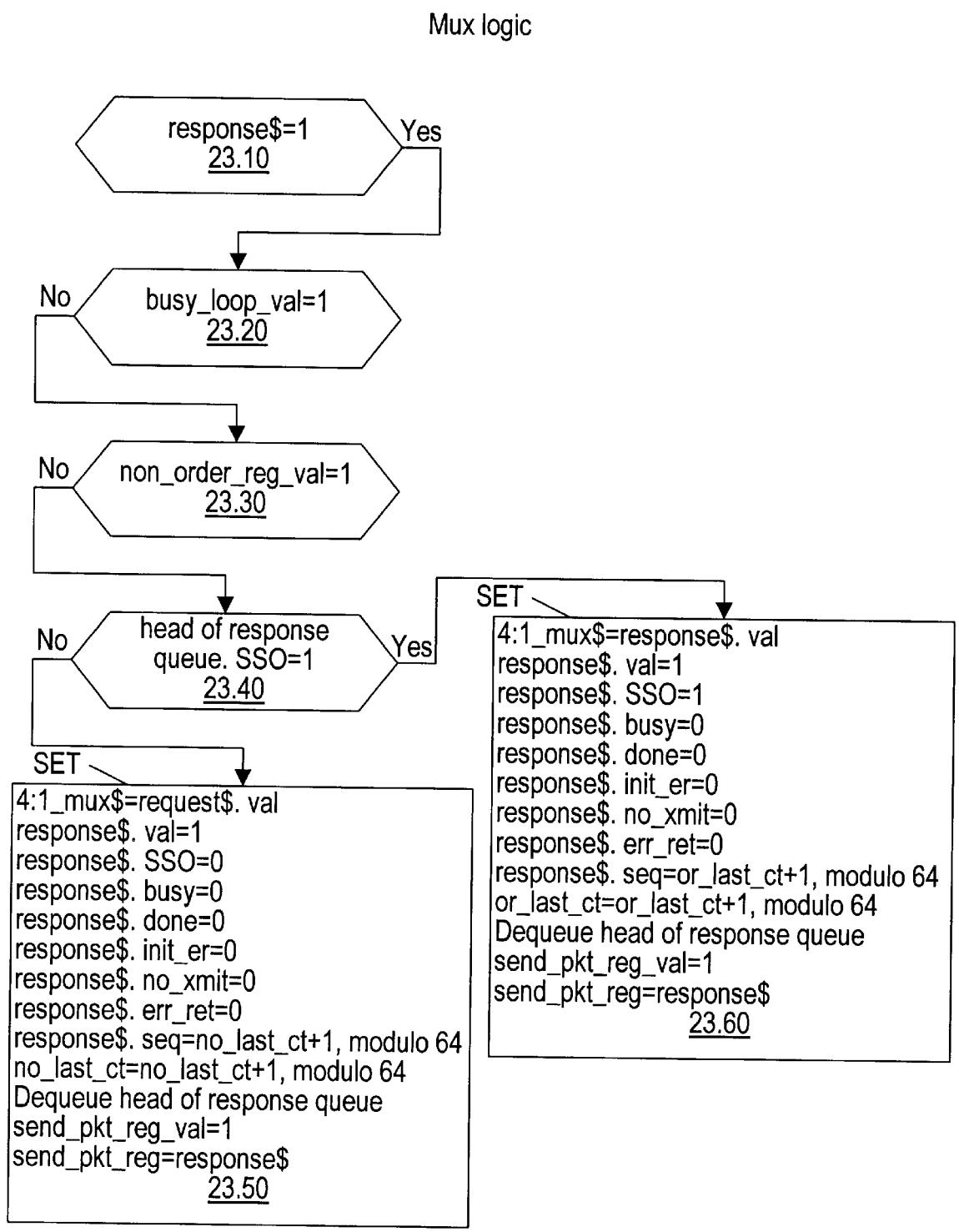

FIG. 23: MUX logic to control the MUX to select a response from the response queue.

Figure 24:
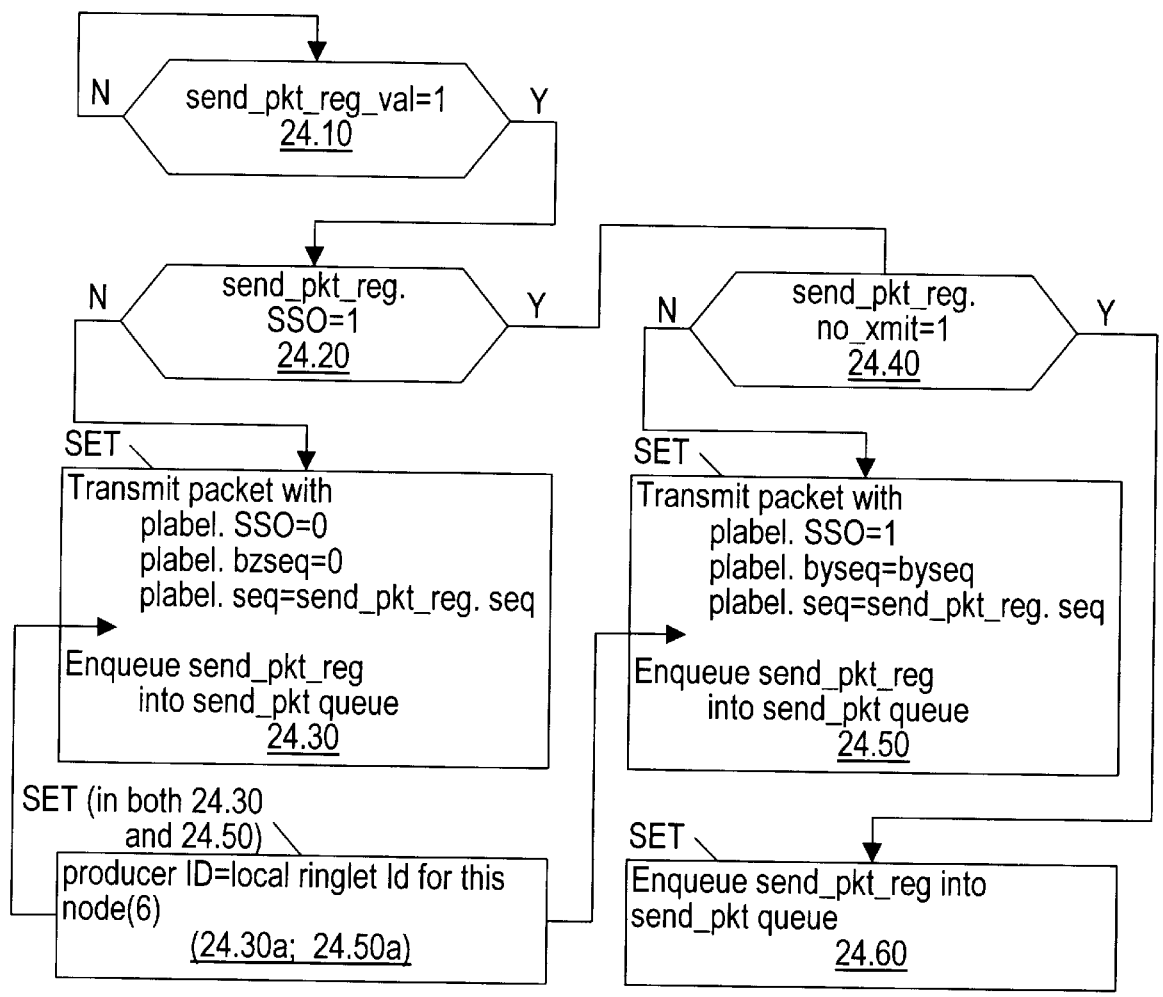

FIG. 24: CRC generate logic to format controls and gate the transmission of packets to the serializer.

Figure 25:
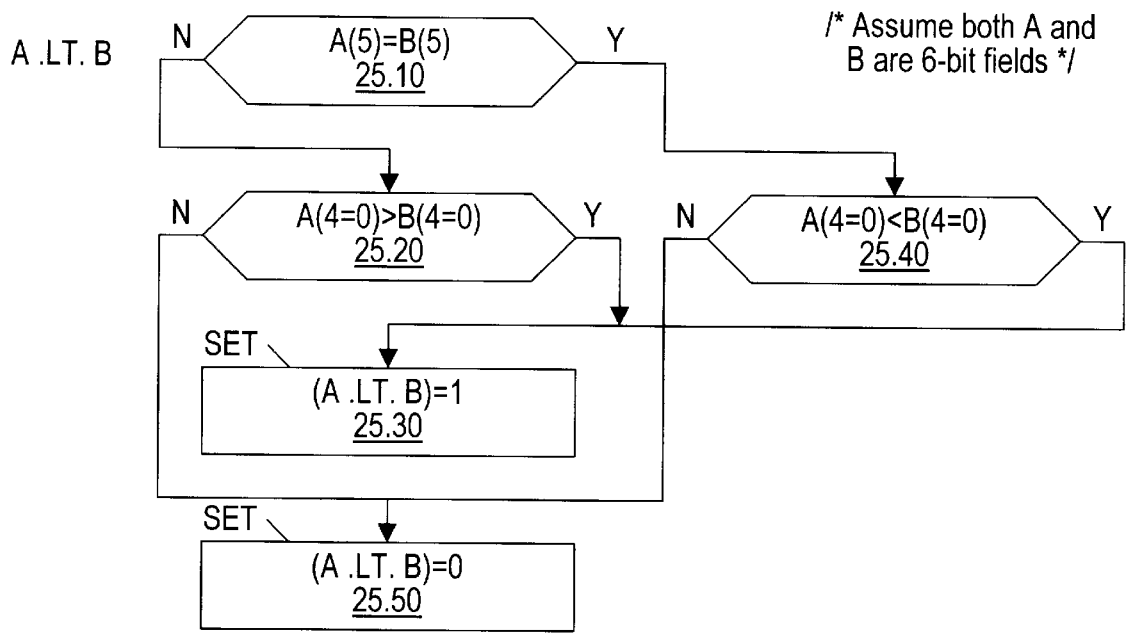
Figure 25:
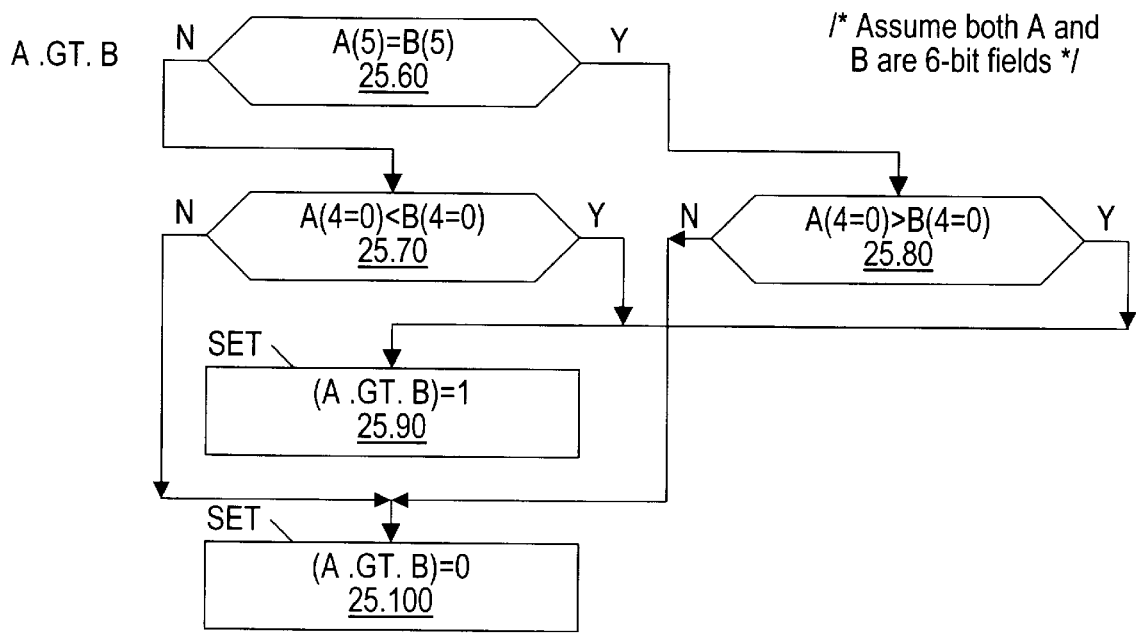

FIG. 25: special purpose modulo 64 comparison logic to perform greater than (labeled .GT.) and less than (labeled .LT.) comparisons.

Figure 26:
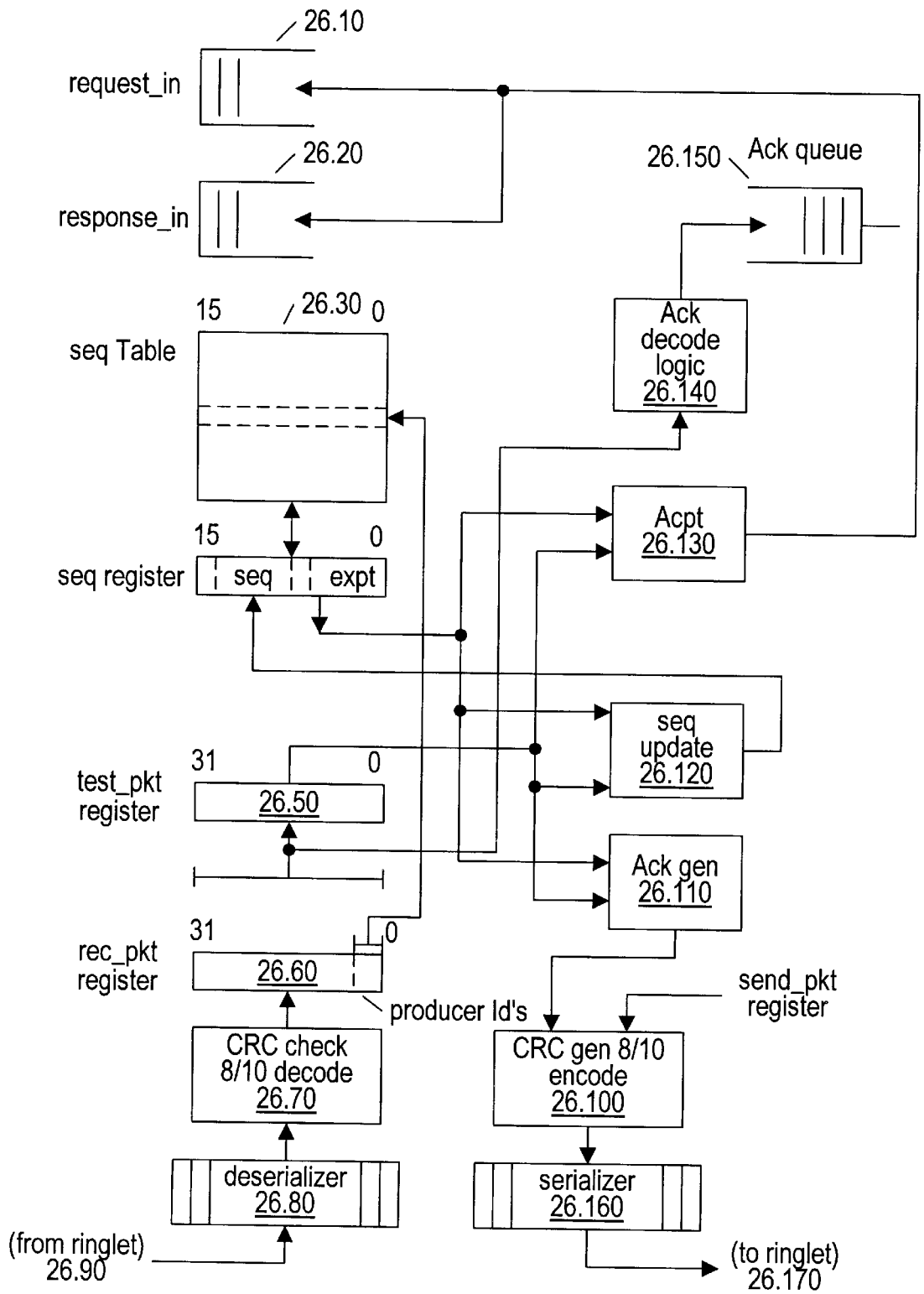
FIG. 26 is a block diagram illustrating the operation of the invention from the point of view of a receive interface.

What follows is a summary of the flow charts for the receive node, FIGS. 28–38. Reference is made also to FIG. 26, Receive Node Logic.

To understand the extensions for this disclosure, one must first form an understanding of the underlying logic. In FIG. 26, the fundamental blocks of the receive node in the absence of the SSO ordering extensions would include all blocks with the following deletions and changes:

Delete seqTable, 26–30.
Delete seq register, 26–40.
Delete seq update, 26–120.

Other blocks remain fundamental to the operation of a receive node with no SSO support.

The receive node and send node have some common components with common names. These include:

|  | send node | receive node |
|---|---|---|
| deserializer | 7.240 | 26.80 |
| 8/10 decode/CRC check | 7.230 | 26.70 |
| rec_pkt register | 7.220 | 26.60 |
| ack decode logic | 7.140 | 26.140 |
| ack queue | 7.130 | 26.150 |

Non-SSO Packet Flow

As alluded to above, the present system may be used in either non-SSO or fully SSO environments.

A description of basic (non-SSO) packet flow, and an overview of the figures added for SSO support, follows.

Basic Packet Flow, non-SSO Packets

The role of the SSO ordering logic can be understood from comparison with the basic packet flow for non-SSO packets. Starting with FIG. 9, the blocks 9.10, 9.20, and 9.30 inhibit the normal packet handling if the CRC error handling control sequence of CRC_init_err, CRC_err, and CRC_ack_chk are active. If all packets are non-SSO, then the block 9.50, which identifies the packet as non-SSO, sends packet control to FIG. 10.

FIG. 11 describes the basic non-SSO error detection logic, comparing the head of the send_pkt queue (see FIGS. 8 and 39) with the head of the ack queue to see if the acknowledge matches the packet. (Comparisons are done in blocks 11.10 through 11.40.) If the packet has an error, the block 11.50 sets the state "err_ret" to signal this as an error packet. Otherwise, the block 11.60 forwards the "busy" and "done" states from the packet's acknowledge (at the head of the ack queue, 9.130). In both cases, the packet is written into the non_order_reg.

In FIG. 9.10, describing resend logic for non-ordered packets, the non_order_reg is tested for validity. If valid, the packet is tested for "done" status in block 9.20, and "done" status is sent to the transaction layer in 9.50. If the packet is either "busy" or has "err_ret" state set, then the 4:1_mux is set for resend$ and the packet is forwarded to the send_pkt register, in block 9.60. Finally, in this block the sequence count for non-SSO packets is incremented and assigned to this retried packet.

In FIG. 24, the send_pkt register is tested for validity in 24.10 and then forwarded to CRC generation in block 24.30. The pLabel field is defined by the fact that this is a non-SSO packet and by the assigned "seq" field in the same block 24.30. Also, the packet is again enqueued into the send_pkt queue to await an acknowledge packet.

While the flow charts begin with the arrival of packets, the packet is assumed to have been selected by some priority process. In a non-SSO system, this priority may be similar to that of the system of the invention, but all references to "busy" and "retry_pkt queue" would be removed. The selection of either a request or response packet from respective queues in a non-SSO system would be similar to that described in FIG. 22 and 23.

Logic Addition for SSO Support

The remaining ack logic, described in the flow charts 9–15, describes extensions for handling SSO ordered blocks.

(Note that the blocks 12.20, 13.20, 14.20, and 15.20 also identify non-SSO send commands in the send_pkt queue (see FIG. 39) and branch to the non-SSO packet handling block 11.10. However, these blocks cover the handling of non-SSO packets within a system which has the capability of supporting a mixed programming environment of both SSO and non-SSO commands. That is, these blocks are not a part of a basic non-SSO only environment.)

Similarly, the handling of non-SSO packets in the resend logic block also is described in a single page, FIG. 9. The resend logic described in FIGS. 16–18 is added for SSO support. The retry handling logic, FIG. 20, is also unique to SSO handling logic.

The MUX logic described in FIG. 21 to start the busy loop (set in 21.90) is unique to implementations with SSO support. Other logic, selecting request or response packets, would be similar for both SSO and non-SSO implementations. The MUX logic to initiate a request or response packet described in FIG. 22 and 23 would be similar for both SSO and non-SSO implementations.

Finally, the CRC generate logic in FIG. 24 tests the "no_xmit" state bit in 24.40 to determine whether a packet is to be transferred to the serializing logic. Such a gating is unique for SSO support. The logic supporting modulo 64 comparisons is also uniquely required for SSO support.

FIG. 26 Block Diagram Overview

FIG. 26, like FIGS. 8 and 39, is a potential block diagram of a receive node (send node for FIG. 7), used to illustrate how the concepts of the SSO mechanism may be implemented. It is recognized that this is but one of many possible instantiations of a receive (send) node embodying the concepts of this mechanism.

Packet flow in FIG. 26 is fundamentally as follows:

Packets enter the receive node through the deserializer, 26.80, from the ringlet, 26.90. The CRC check and 8/10 decode logic, 26.70, strips any non-packet symbols and loads packets into the 32 bit rec_pkt register, 26.60.

The start of packet is detected and initial packet decode is done in this register. Packets utilized by the receive node include:
send packets (request and response) addressed to this node;
send packets (req and response) addressed to other nodes;
acknowledge packets addressed to other nodes.

Send packets addressed to this node are marked for enqueing into the request_in queue (request packets) or response_in queue (response packets), respectively. (Note: the use of queues Acknowledges to this node are decoded and written to the ack queue, 26.150.

Receive node packets are written into the test_pkt node. When the start of the packet is in the test_pkt register, the 32 bits with the producerId are in the rec_pkt register. This field indexes the seqTable array for receive node state, including sequence the sequence and accept fields.

The next cycle, the seqTable[producerId] contents are read into the seq register, 26.40, and the pLabel and producerId fields will be in the test_pkt register, 26.50. The corresponding fields are compared in the following blocks for all packets (send packets and acknowledges) in the receive node, although the timing of packet handling depends on the type of packet:
acpt logic, 26.130, basically determines whether request and response packets addressed to this node are accepted. Both the seqTable and CRC error checking are considered.
seq update logic, 26.120, determines whether and how the seqTable array state is updated at the end of the packet.
ack gen logic, 26.110, determines what kind (inhibited on CRC error detection) of acknowledgment is generated, ack done, busy, or error.

The remainder of the packet is processed (in the case of send packets), with any send packet data enqueued into the request_in (26.10) or response_in (26.20) queues, provided that queue space is available. At the conclusion of the packet, the CRC check completes the operation for the send node.

Figure 27A:
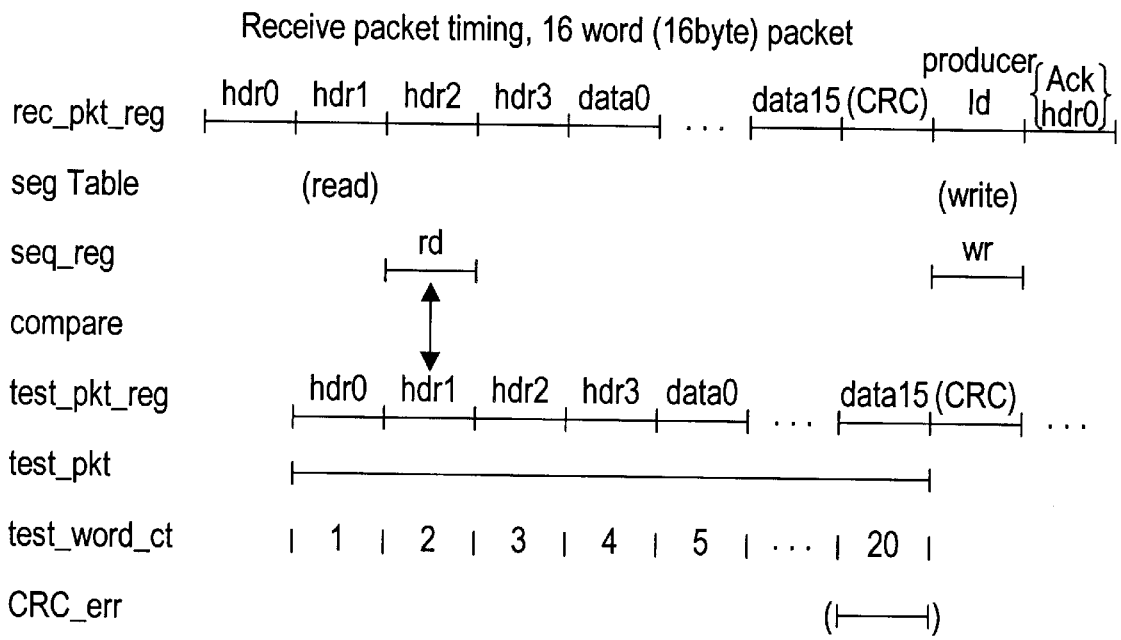
FIG. 27A is a timing diagram illustrating receive packet timing.
Figure 27B:
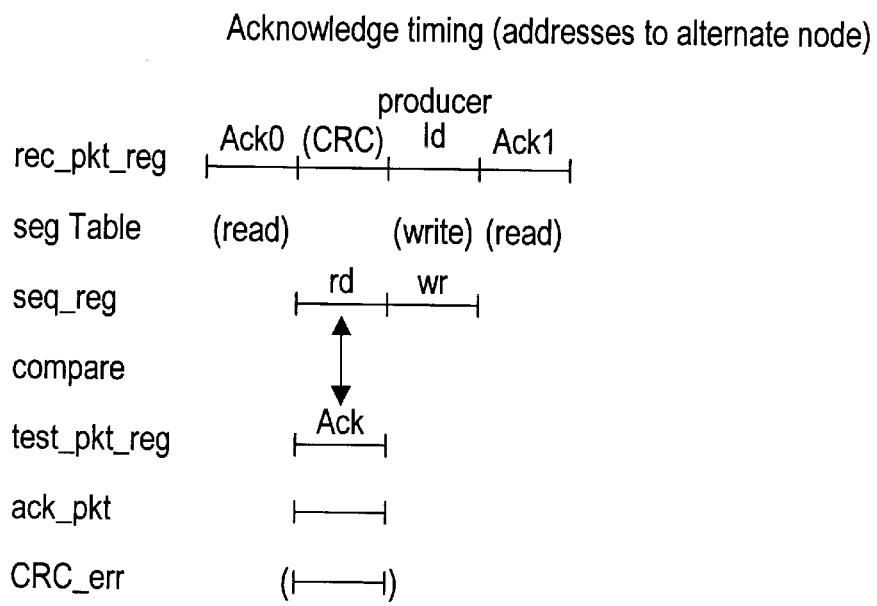
FIG. 27B is a timing diagram illustrating acknowledge timing.
Figure 28:
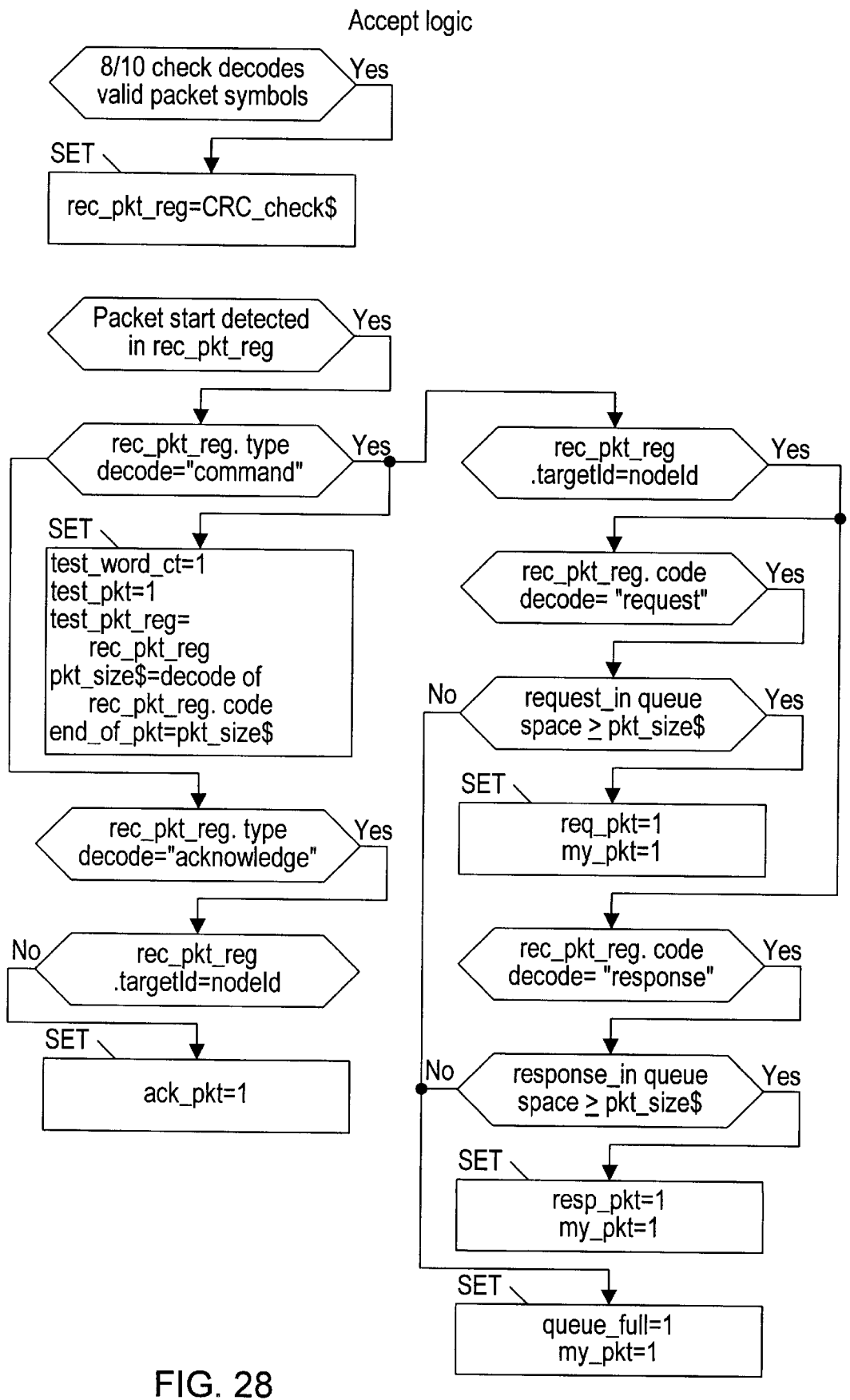
FIGS. 28–38 are logic diagrams illustrating logic subsystems of the system of the invention, and their operation, with respect to receive nodes.

FIG. 27A and 27B show receive packet and acknowledge timing diagrams, respectively. The receive node logic is shown in FIGS. 28 et seq., and is described as follows:

FIG. 28: Detect the start of a send packet (or "command") or an acknowledge packet from header fields in the rec_pkt_reg 26.60 (see FIG. 26). For send packets, either requests or responses, addressed to this node, test whether queue space exists in the corresponding input queues, request_in queue 26.10 and response_in queue 26.20, and set control bits accordingly.

Figure 29:
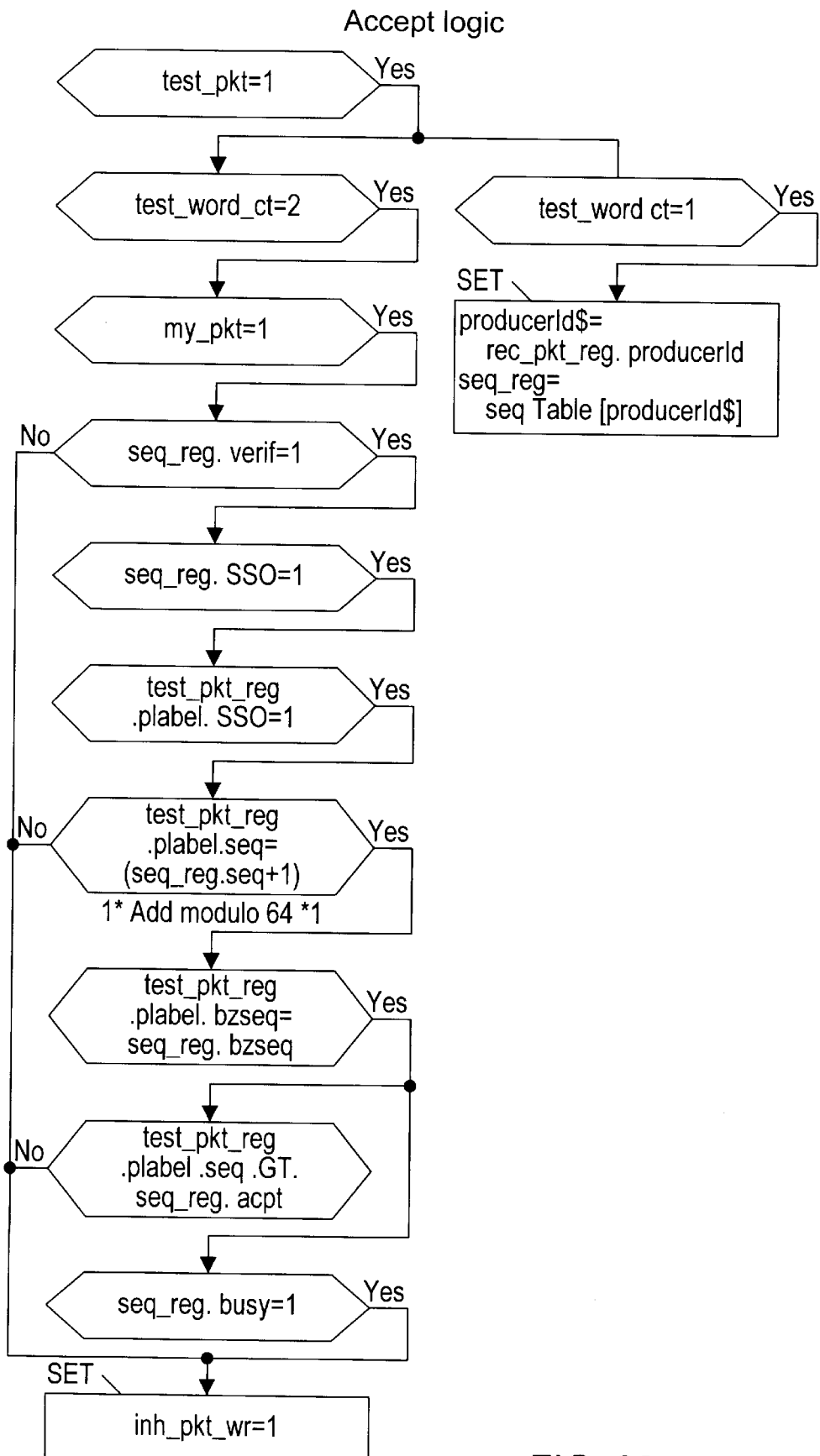

FIG. 29: Read the seq Table array 26.30 into the seq_reg 26.40. Test for conditions to inhibit validating a packet in the request_in 26.10 or response_in 26.20 queues.

FIG. 30: If control bits indicate queue space is available, tentatively enqueued the remainder of a packet addressed to this node in to the corresponding queue, request_in 26.10 or response_in 26.20. Conditions for incrementing control fields or resetting control bits are given.

Figure 31:
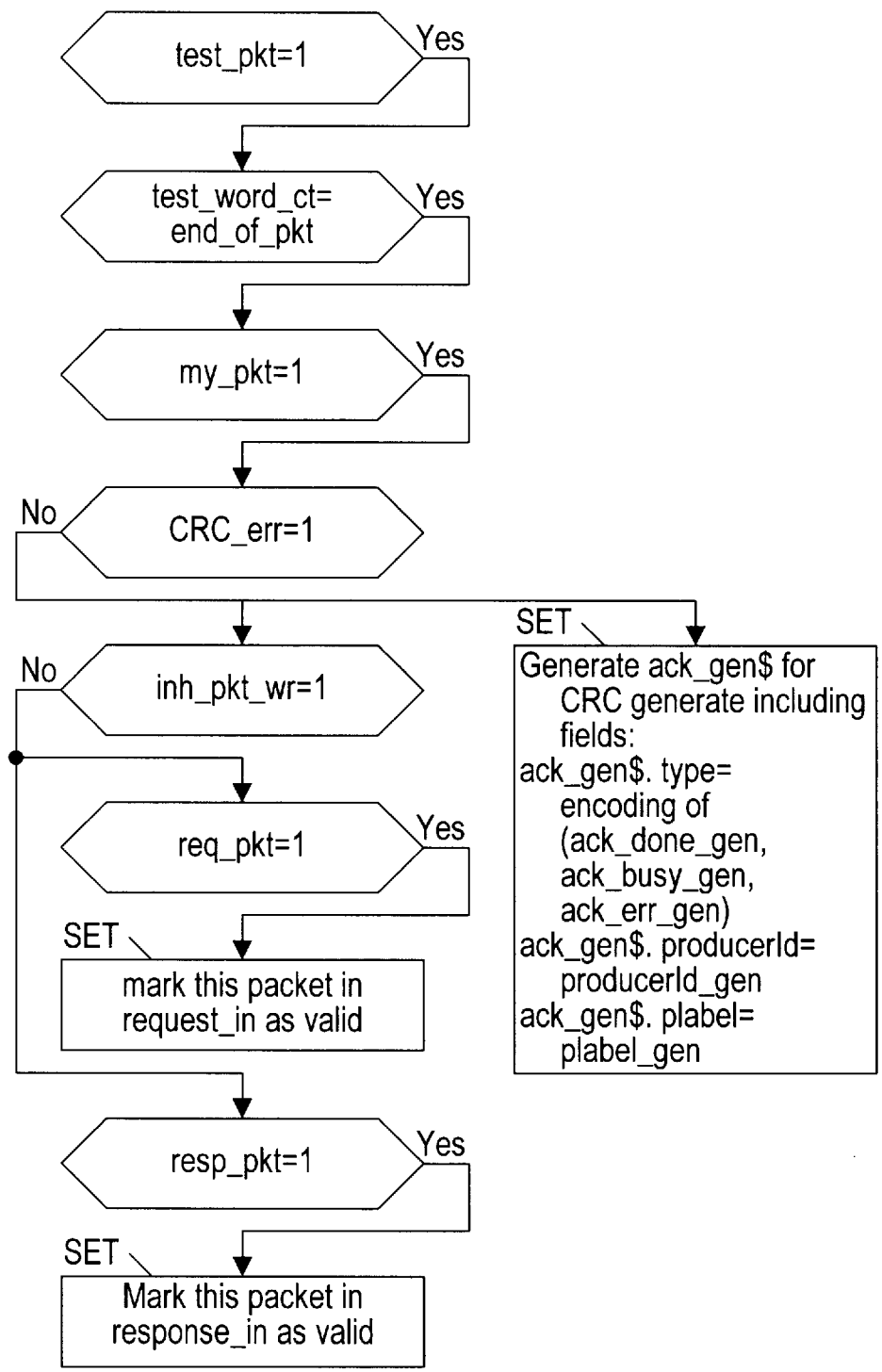

FIG. 31: At the end of a send packet addressed to this node, depending on the CRC check, generate an acknowledge packet to the send node and validate the packet in the request_in 26.10 or response_in 26.20 queue.

Figure 32:
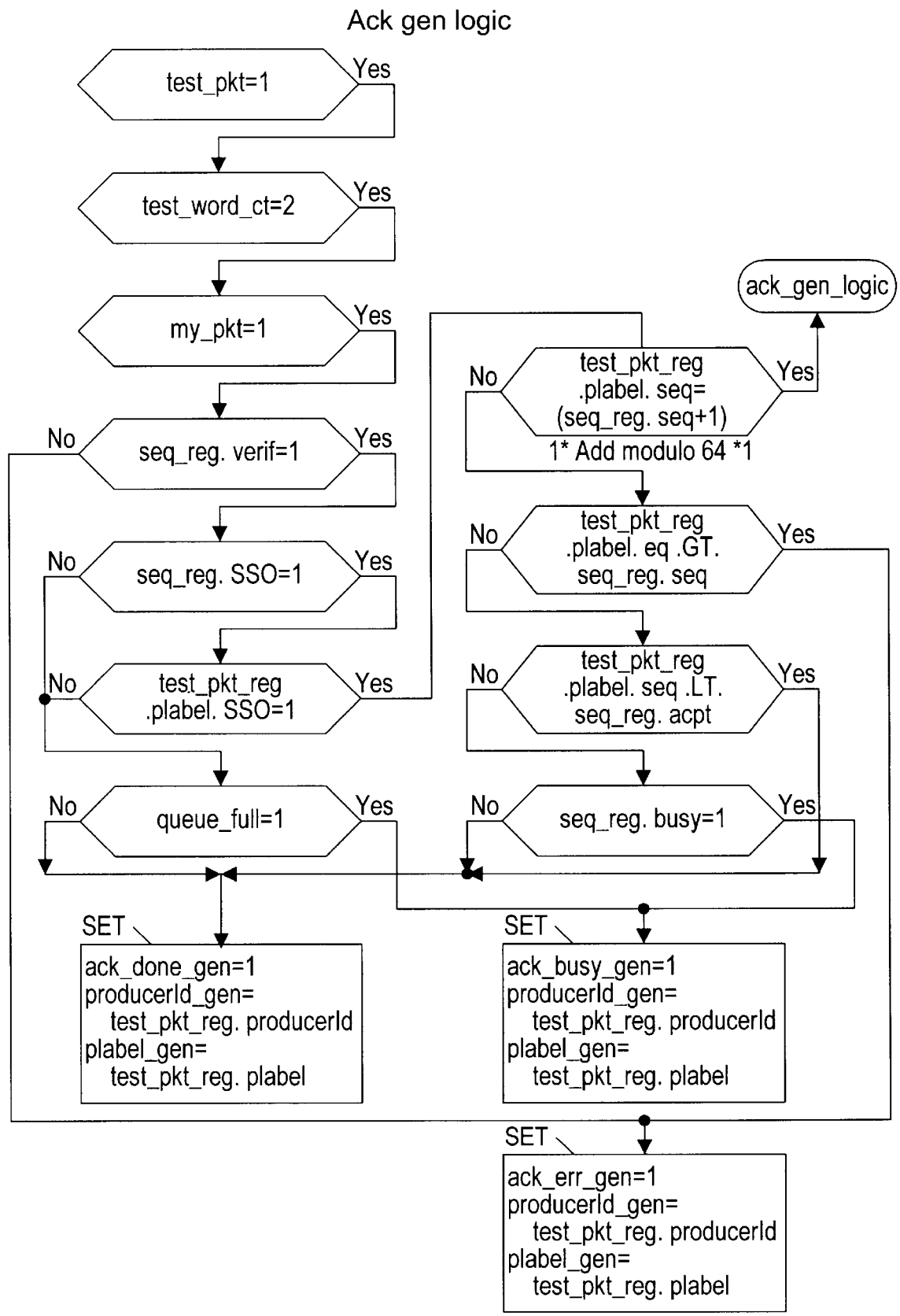

FIG. 32: Generate tentative acknowledge conditions (done, busy or error) for use in acknowledge generation on FIG. 31, depending on CRC error checking.

Figure 33:
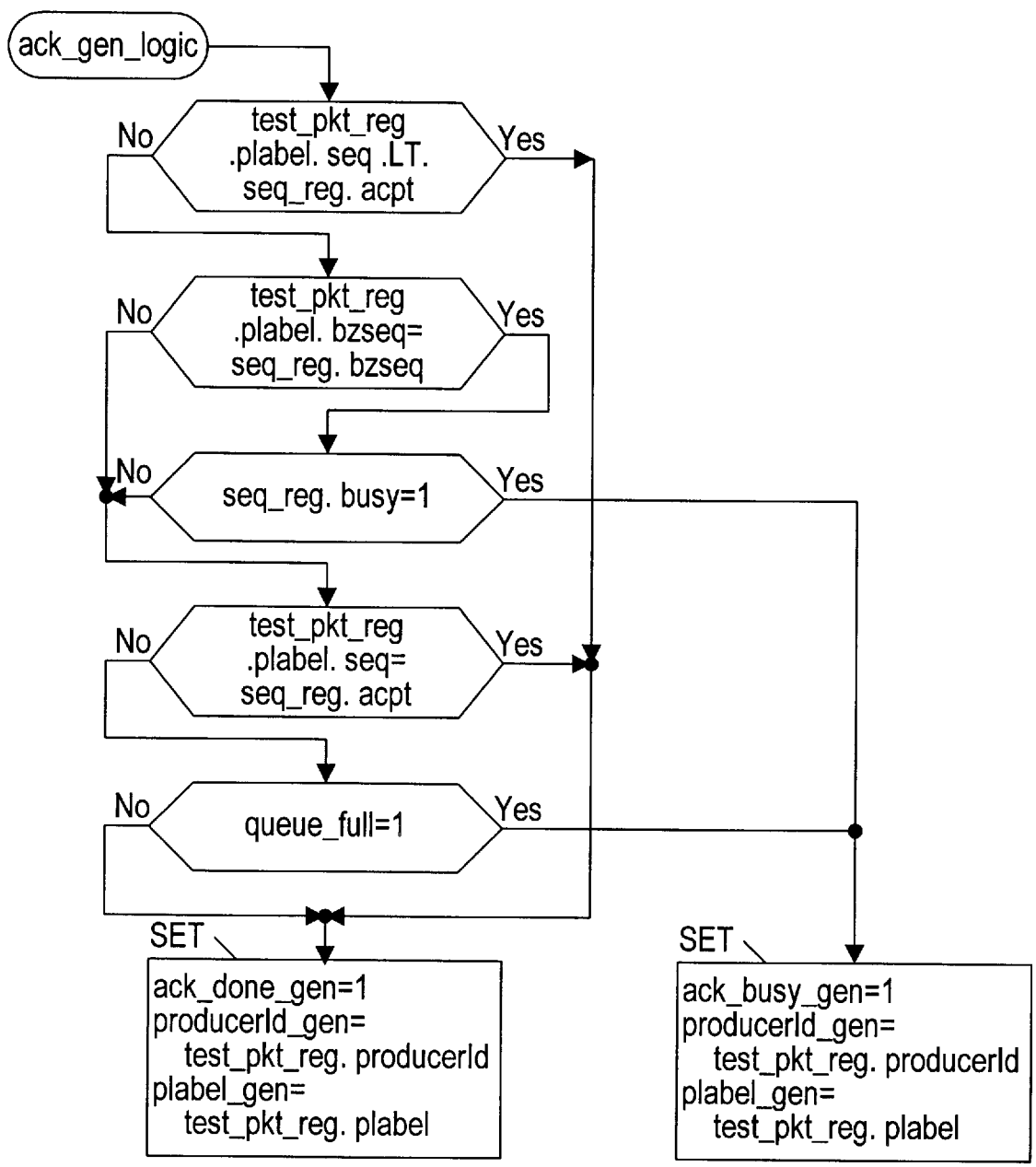

FIG. 33: Continuation of tentative acknowledge generation (done, busy, or error) for SSO packets with valid sequence.

Figure 34:
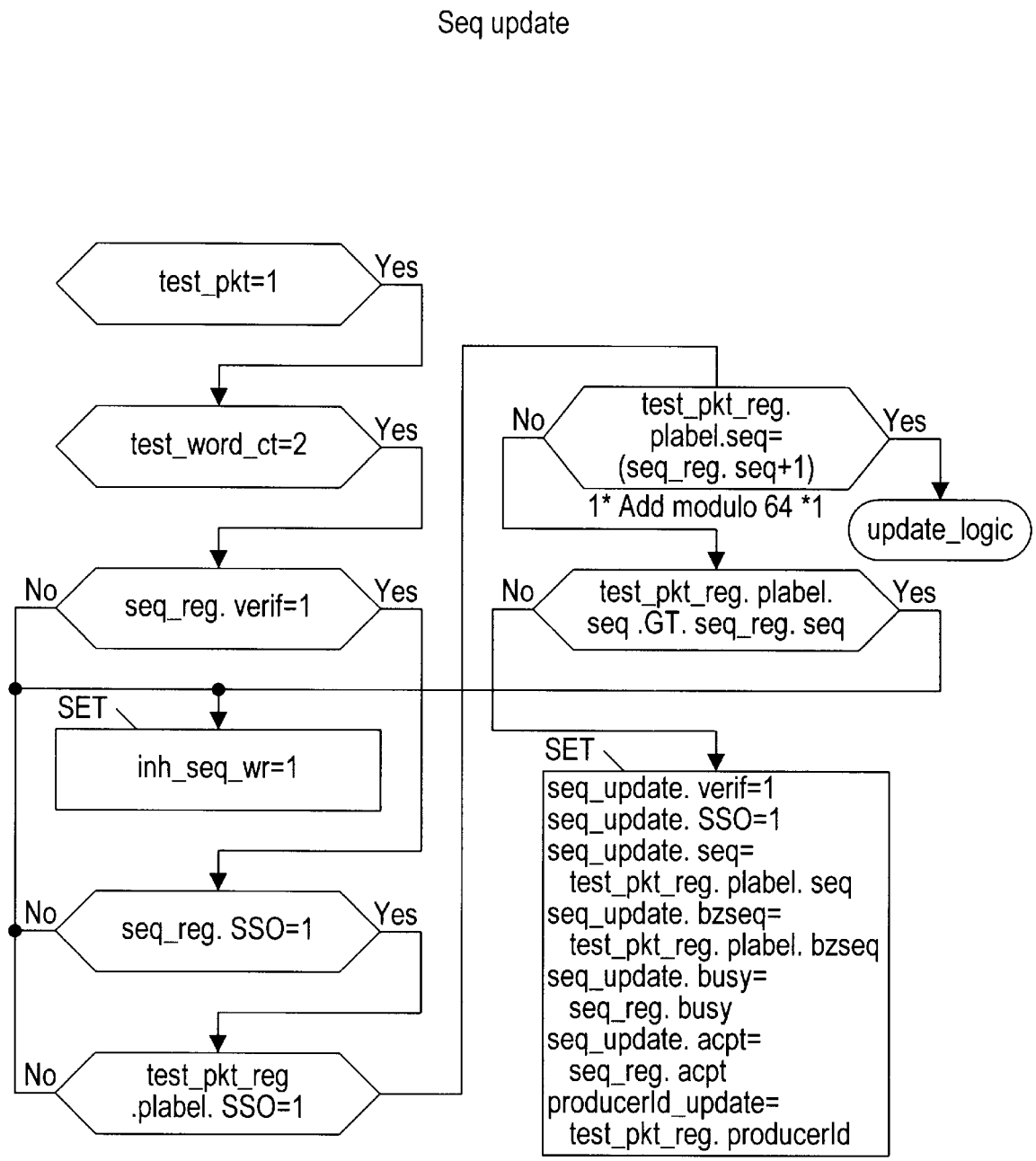

FIG. 34: Test for conditions to tentatively set update conditions for the seq Table array at the conclusion of the packet, or to inhibit update. Update will depend on valid CRC check.

Figure 35:
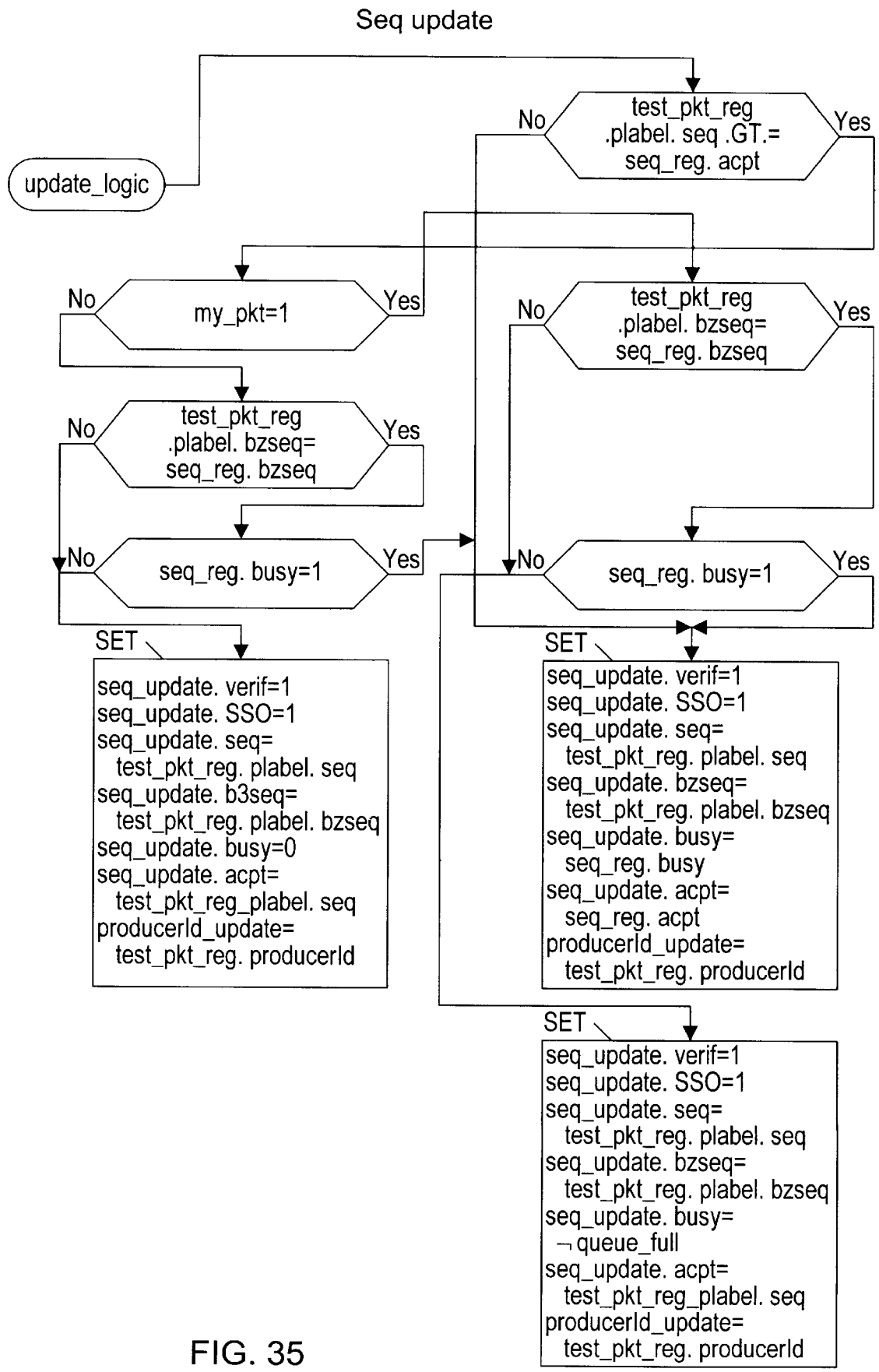

FIG. 35: Continuation of tentative sequence update generation in the case where the packet is SSO ordered with valid sequence.

Figure 36:
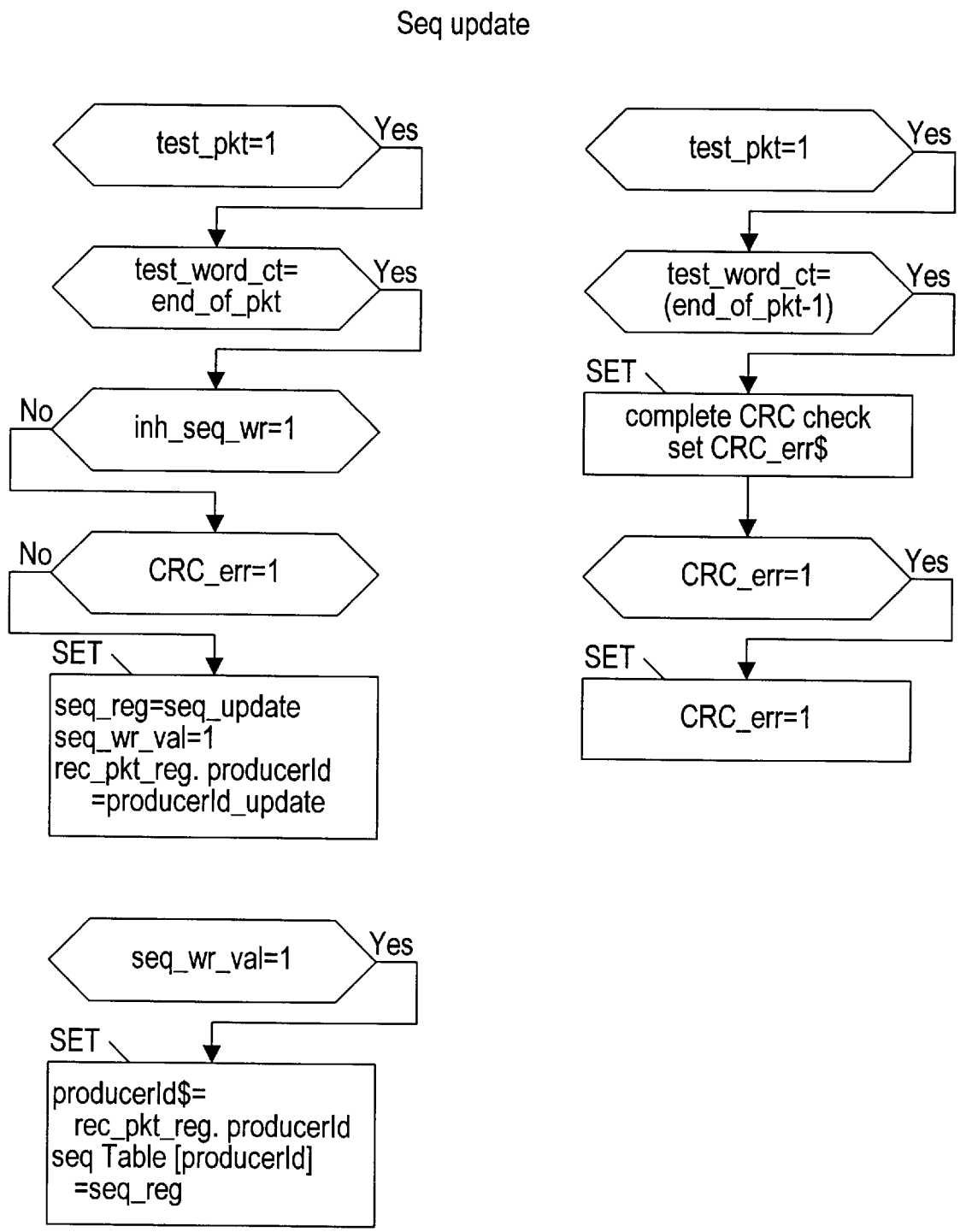

FIG. 36: At the conclusion of the send packet, test for valid CRC in 26.70. If the CRC is valid, and the seq Table write is not inhibited, update the seq Table.

Figure 37:
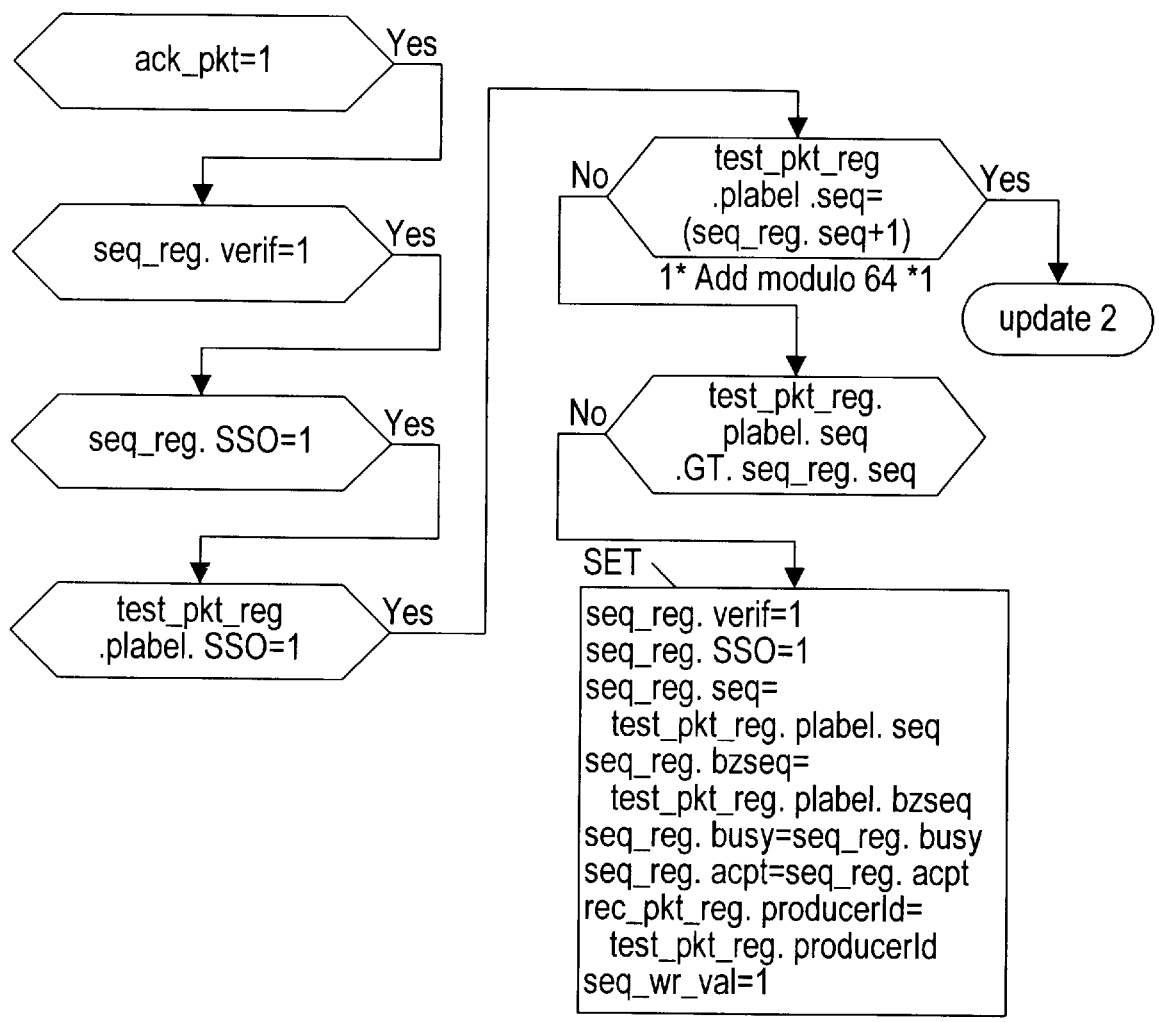

FIG. 37: Generate seqTable update fields for acknowledge packets addressed to other nodes.

Figure 38:
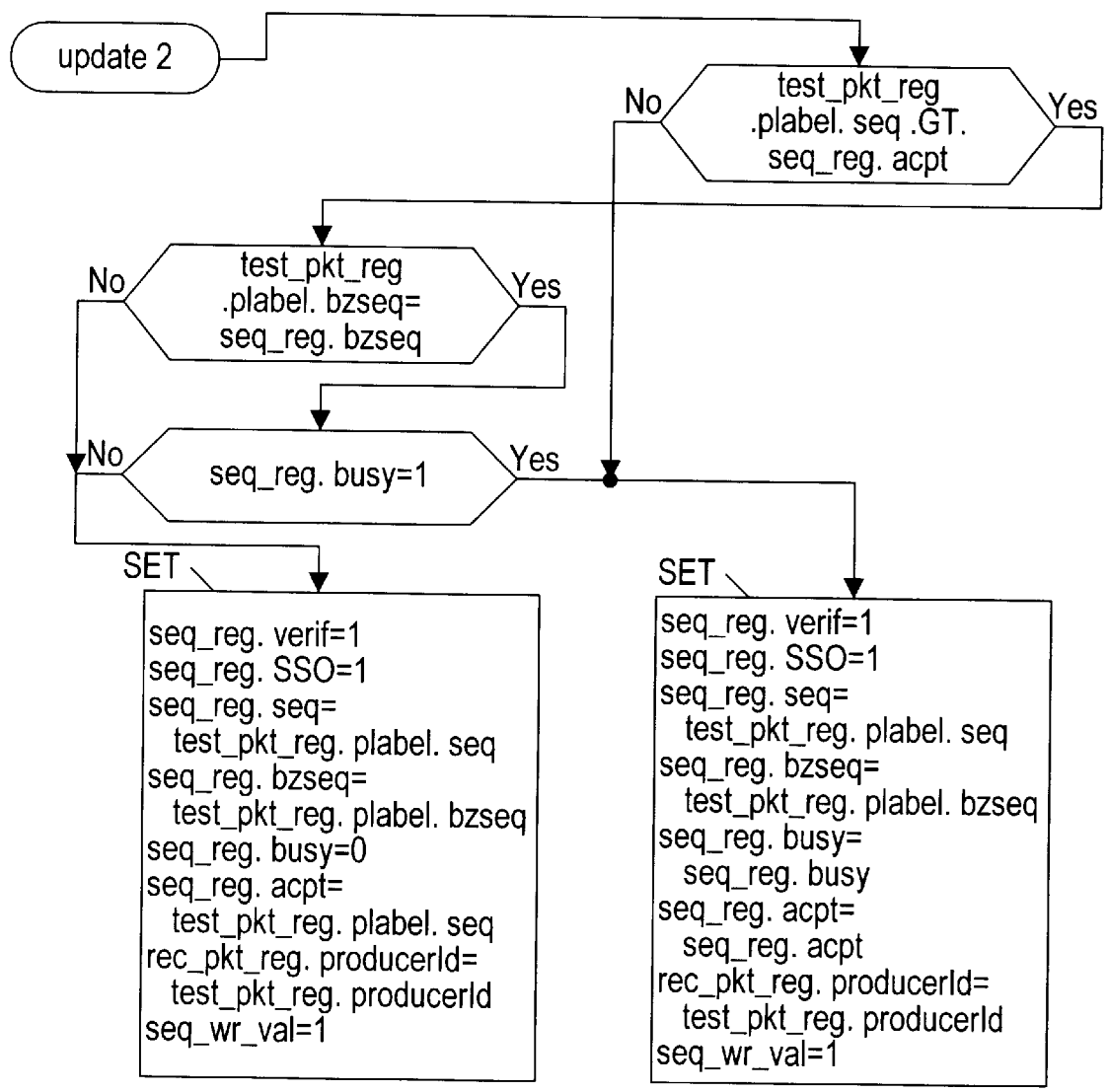

FIG. 38: Continuation of seq Table update field generation for acknowledge packets addressed to other nodes, for the case where packets are SSO ordered with valid sequence.

The example of FIGS. 39 et seq. demonstrate and exemplary operation of the system of the invention, with the state and actions described in those Figures, which conform to the logic in the foregoing figures. FIGS. 39 et seq. show, step by step, the state of the producer node for each transfer of packets among the registers and queues, and by inspection of those diagrams, it will be seen that the system does accommodate SSO, nonidempotent commands in the case of errors in connection with a busy retry loop and an ill-behaved node.

In reading the logic/flow diagrams in the figures, various states are referred to. These are defined below.

| State | Interpretation |
| --- | --- |
| i | in_proc |
| b | busy (variations: ack_busy, busy loop retry) |
| r | retry in CRC loop |
| b1 | first packet in busy retry loop |
| r1 | first packet in CRC retry loop |
| x | either ack or busy |
| d | ack_done |
| BRC | busy resend loop |
| CRC | CRC err resend loop |
| SRL | send_pkt recirculating loop |

Discussion of the Preferred Embodiment of the Invention in Light of Proposed 1394.2 Standard The following presents an overview and summary of a proposed mechanism to support fully pipelined packet initiation in a ringlet topology based on IEEE P1394.2, where the pipelined packets may include send packets and response packets from address spaces requiring strong sequential ordering (SSO) and support for non-idempotent commands. This mechanism can be extended over arbitrary P1394.2 switch topologies by ensuring that every communication link in the topology, in turn, maintains SSO ordering.

The proposed mechanism supports SSO and non-idempotent commands in a fully pipelined mode of operation for non-busy, non-error packet transmission, while tolerating both CRC errors and busy receiver conditions through an efficient hardware retry mechanism. It supports a variety of resend policies for mixing new packets with retried busy packets. It enables a "correctable error" kind of error handling policy, since CRC error packets may be retried to any programmable limit. This capability, in turn, enables a "preventative maintenance" function for nodes reporting successful retry operations of CRC error packets.

Also note that the use of SSO, non-idempotent capability within a bridge significantly simplifies the design of bridges between IEEE P1394.2 and other protocols that have larger (>64 B) packet formats. For example, a write command for a 2 KB block from an IEEE 1394–1995 node, which expects a single response packet from the receiving node at its conclusion, can be implemented as a series of move commands (no response) and a concluding write, with the guarantee that the operation of the IEEE 1394–1995 packet will be preserved over the bridge.

The cost of SSO ordering is 2 bytes of state per node supported on the ringlet, plus state machines, a separate register for non-SSO packets, muxes, and a 6 bit comparator. The flow description is now based on simple FIFO queues and registers, rather than more complicated array structures. Since the maximum configuration for a ringlet is 63 nodes, this bounds the required state to support SSO to ~128 B max (plus pointers and state machines). "Profiles" of smaller supported configurations can further reduce the cost by cutting the supported ringlet node count.

Brief Overview of IEEE P1394.2

IEEE P1394.2, or Serial Express, is a proposed extension of IEEE 1394–1995, or Serial Bus, to Gigabit+ transmission levels. Basically, the protocol supports the fundamental command set of IEEE 1394–1995 while rearchitecting the transfer protocol to emphasize low latency and high throughput with 16B and 64 B packets.

IEEE P1394.2 is based on an insertion buffer architecture with a ringlet topology. What this means is that a each node includes two unidirectional wires, one for packets and idles (for synchronization and flow control) coming in, and one for packets and idles going out. A bypass buffer shunts packets and idles coming in over to the outgoing wire, possibly with delays. A single new send or response packet (defined below) may be inserted by the node into the ringlet if its bypass buffer is not full; this is the "insertion buffer" architecture. Any packet that enters the bypass buffer while the node is inserting the new packet is delayed until the new packet is sent. The small packet sizes (<=64 B) make this architecture both possible and efficient.

The packet format includes a 16 bit field for packet routing usage plus a 48 bit extended address. Each node supports full duplex operation over a single cable with separate send and receive paths. When several nodes (up to 63) are interconnected, initialization software breaks redundant loops and configures those nodes as a single ringlet. Multiple ringlets (with as few as 2 connections) can be interconnected through switches, up to a maximum topology of 16K nodes.

The IEEE P1394.2 protocol supports four modes of operation, based on two address modes (directed and multicast) and two service types (asynchronous and isochronous). The SSO ordering is of particular interest for asynchronous, directed service, which includes (read, write, move, and lock) operations, but the proposed mechanism is not limited to only this mode of service.

SSO Ordering: Issues

In the absence of SSO ordering support, packets from any node to any destination have no constraints with respect to one another. With both CRC errors and busy receivers to contend with, this means that any two packets may arrive at the destination node in a different order from that sent, if at all.

This uncertainty is typical of networked environments and is dealt with using a variety of software-based protocols. One reliable mechanism, for example, that can be used with IEEE 1394–1995 to serialize an interrupt generating write request with a prior data packet, is to send a write command (which requires a response from the destination) for a large, say 2KB packet, and then send the write command to generate the interrupt after the response for the data has come back.

Such mechanisms, when extended into a domain with much smaller (<=64 B) packets, a domain that emphasizes low latency transfers, can become both complicated and inefficient. The software overhead for establishing ordering and data transfer completion both detracts from available compute cycles and adds directly to user process—to—user process latency.

The SSO Extension with P1394.2

The proposed SSO extension depends on these fundamental assumptions for the operation of a ringlet:

Each command in (asynchronous, directed) mode is executed by the originating (sender) node generating a send packet and, depending on the command, the ultimate destination node (possibly) generating a response packet. The "send" packet is removed by a single receiving node on the sender's local ringlet and replaced with an "acknowledge" packet from that local receiving node back to the sending node. The local receiving node may be either the final destination for the send packet or an agent that forwards the packet, perhaps through a switch, to its destination. Depending on the type of command, the ultimate destination node may send a "response" packet, which is also captured by some node on its local ringlet and replaced by an "acknowledge" packet back to the "response" generator.

In the discussion below, the term "producer node" is sometimes used to indicate the node that initiates the packet, whether that node is a sender node initiating a send packet, a receiver node initiating a response packet, or a bridge or switch node forwarding a send or response packet.

The target for both send and receive packets is identified by a global, 16 bit "targetId" field. In the absence of errors, some unique node on the ringlet, perhaps a bridge or switch node, will recognize the targetId address and strip the packet. A "sourceId" field uniquely identifies the global address of the sending node.

Other fields, which are included within the packet for returning local ringlet acknowledgment, are fundamental to the proposed SSO ordering enhancement. These include the (6 bit) "producerId" field, which identifies the nodeId that originated this packet on its local ringlet, and the (8 bit) "pLabel" field, which is assigned by the "producerId" node to uniquely identify this packet. Both the producerId and pLabel fields have meaning only within a local ringlet and will be reassigned, for example, if the packet is forwarded through a switch. Similarly, the "producerId" and "pLabel" fields are also reassigned by the destination node when it sends a response packet.

Other fields mentioned below include the "type" field (which distinguishes types of commands and acknowledgments); the "code" field (command identification); the global "tlabel" field, which is returned in a response packet to uniquely identify that response to the sourceId node; and the crc32 field, a 32 bit CRC code that covers both the header and data for the packet.

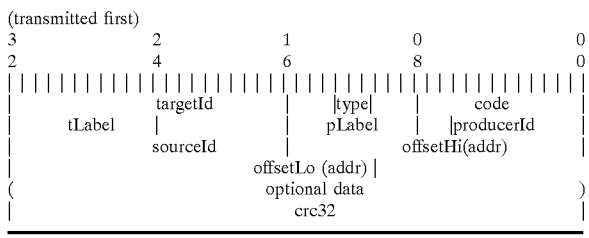

The acknowledgment packet generated by the receiver node echoes some of the fields from the send or response packet back to the "producer node", so that it can uniquely recognize the packet being acknowledged:

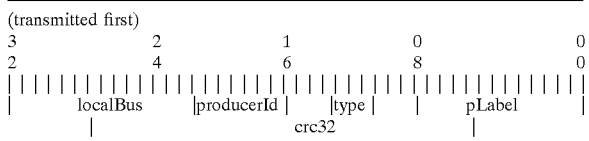

To create the acknowledge address, the "targetId" address field of the original packet is replaced by a "localBus" identifier (all 1's, typically), plus the 6 bit producerId field from the original packet. The pLabel field uniquely identifies the original packet to the "producer node". The "type" field encodes the type of acknowledgment. The crc32 field for the acknowledge packet may be replaced by some other error detection code without loss of generality for the SSO mechanism described here.

Fundamental to the proposal is the assumption that local ringlet transmission is unidirectional and bypasses no nodes. That is, when a node sends either a send packet or a response packet, then every node on the subring will see either that packet or the acknowledgment for that packet flow through the node's bypass buffer.

This assumption underlies the basic operation of the P1394.2 ringlet (although in a proposed P1394.2 option, a "short cut" routing feature would not support SSO ordering). As a result of this, for every send response packet that is transmitted, each node on the ringlet can observe both the producerId and the pLabel fields for either the send/response packet or its acknowledgment.

The P1394.2 protocol supports split response transactions, where a response is required. Packets for (asynchronous, directed) service are subject to two conditions that may inhibit packet delivery:

the packet—or its acknowledgment—may suffer a CRC error or other detectable error;

the packet may be rejected by a "busy" receiver at the destination node.

In the case of a CRC error, the only reliable detection is at the originating node, which will detect the error if the expected acknowledgment has not been seen within two ringlet revolutions. (A bit is circulated by a "scrubber" node that is complemented at every ringlet revolution to assist in local node timeout detection.) The exact method of timeout detection employed is not fundamental to the operation of the SSO ordering support mechanism described here.

In the case of a "busy" receiver, the receiver node substitutes an ack_busy acknowledgment packet for the send or response packet in (asynchronous, directed) service.

System Overview: Known Good Information at a Node

The claim that the pLabel and producerId fields can be used to implement an SSO ordering mechanism in a ringlet topology depends on certain information being unambiguously known to both the producer node and the receiver node. Here is a summary of this information.

The basic concept here is that each packet may have two uses in the ringlet: to transmit commands or data in the SSO program space, and to transfer ringlet sequence state information. Only the sender knows the sequence number of transmitted packets, and only the receiver knows the last valid, accepted packet. Pictorially:

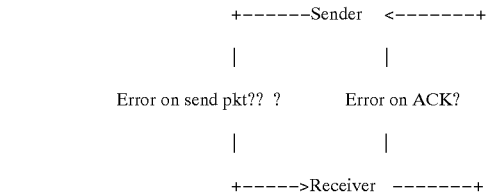

Producer Nodes:

Send/response packet fields to control SSO operation in ringlet nodes: The pLabel field for send and response packets from each producerId is used to convey three subfields (details later):

pLabel.sso (1 bit)

pLabel.bzseq (1 bit) /* Unused for non-SSO space */ pLabel.seq (6 bits)

The "pLabel.sso" bit defines, dynamically, whether the address space for this packet is SSO ordered (sso=1) or not (sso=0). The "bzseq", or busy sequence bit has meaning only in SSO ordering space and is used to help a receiver node determine whether it must issue a busy retry acknowledgment to a send/response packet. The 6 bit "seq" field is a wrapping, modulo 64 "counter" used by all local ringlet nodes for identifying valid packet sequences from this producerId.

The maintenance of SSO ordering between each producerId node and the other nodes on the ringlet depends on the producerId "metering" its send and receive packets and setting their pLabel fields to ensure that each other node can maintain proper state information. By comparing that state information with incoming pLabel fields from the producerId, packets can be properly dispositioned to maintain SSO ordering.

("Metering" requires that any producer node may have no more than 32 packets "outstanding" in its local ringlet, based on the 6 bit "seq" field. "Outstanding" means counting from the current packet to send back to either the earliest prior packet from this node that generated a "busy" acknowledgment, or the earliest prior packet for which no acknowledgment has been received, whichever is greater. There is no architected limit to the number of packets that may be outstanding beyond the local ringlet, for example awaiting responses at destination nodes.)

Under normal operation in SSO space, the pLabel.seq field is incremented by 1, modulo 64, with each new send/response packet or with each retried busy packet. If a CRC error is detected, the SSO state for all local ringlet nodes must first be resynched by resending some packets (below).

The term "CRC error" used below may be generally understood to include not only CRC errors, but any non-corrected error condition for a packet (send, response, or acknowledge) that can be detected by the sending node.

CRC error loop reset: Once a CRC error is detected at the producer node, the SSO state values maintained for this producerId at every node in the ringlet are in question. Each ringlet node's SSO state information for this producerID must be reset, without any change in either the SSO programming space for this producerId or for any other producer node.

Two important features of the mechanism are used to accomplish this:

1. Each receiver node on the ringlet maintains an array of SSO state, indexed by the local producerId for each sending node on the local ringlet. The SSO state contains control bits plus two sequencing fields. One of these fields is used to determine whether a current ringlet packet addressed to this receiver has a valid SSO sequence number, and the other field is used to determine, along with the state of the node's receive buffer, whether the packet may be accepted or rejected by the node and what type of acknowledgment will be returned (done, busy, or error).

2. Each producerId that detects a CRC error has the ability to retry a sequence of SSO ordered packets, beginning with the last good SSO ordered packet prior to the error packet, and extending through the last packet sent from this node prior to the detection of the error. The known good SSO ordered packet is retried (if necessary) to begin the CRC error loop, in order to establish a valid sequence base count in the ringlet. Then the remaining packets are resent, up through the last packet before the CRC error. If any error is detected in this retry sequence, the loop is repeated until either it succeeds without error, or the error retry loop concludes without success; in such cases, higher level protocols may deal with the error. Once this sequence completes without error, all nodes in the ringlet will have their SSO state restored to consistent, known good values.

Receiver Nodes:

A receiver node can detect a valid packet sequence from any producerId if its SSO state information is correct. This state is initialized by the producerId on reset and then re-initialized if a CRC error is detected by the producerID.

A receiving node may or may not detect a CRC error send packet or acknowledge. Even if it does, since the packet's contents are unreliable, no node state information can be updated. It is the sending node's responsibility to detect a timeout and resend any CRC error packet.

However, the receiving node can detect an out-of-sequence transmission of a valid ordered packet following a CRC error packet from some producerID. Each such out-of-sequence packet must be detected and rejected at the receiver while being acknowledged as ACK_error. The node sending this packet marks the packet and retries it in its error loop.

A packet may be rejected in asynchronous operation if the receiving node is busy or, with SSO ordering support, if the packet is a retransmission of a packet that had been previously accepted. In SSO ordered mode, once a first packet from a given producerId has been rejected as busy, then all subsequent ordered packets from this producerID must also be rejected as busy until the first busy packet is retried.

The state of the receiver for SSO must then support the acceptance of new packets into a non-busy receiver buffer and the rejection of previously accepted packets that are resent for error recovery and any new packet sent following a "busy" rejection. Since the acknowledge packet returned to the producer is subject to error, the receiver state must be able to reproduce the ack_done and ack_busy packets if any packet is retried.

To accomplish this, each receiver node requires a state array, called seqTable, indexed by the producerId, with the following six fields:

seqTable.verif [producerId] (1 bit)
seqTable.sso [producerId] (1 bit)
seqTable.seq [producerId] (6 bits)
seqTable.bzseq [producerId] (1 bit)
seqTable.busy [producerId] (1 bit)
seqTable.acpt [producerId] (6 bits)

In SSO operation, the seqTable fields are used as follows. The "verif" field indicates both that this seqTable has been initialized and that the producerId is a verified source. The "sso" field defines the (static) capability of this producerId node to support SSO ordering. (By comparison, the pLabel.sso bit is a dynamic bit set according to the address space ordering for the producer node.) The "seq" field is compared with the pLabel "seq" field for packet sequencing by the receiver node. The "bzseq" bit is compared with the corresponding pLabel "bzseq" bit for SSO packets to identify the retransmission of first busy packets. The "busy" bit is set on the first busy acknowledgment of an SSO packet to the producerId and (possibly) reset when this busy packet is retried, depending on the receiver buffer. Finally, the "acpt" field is used in both the acceptance and rejection of SSO packets and in determining whether to acknowledge as "done" or "busy". These determinations require comparison with the incoming packet's "seq" field.

The receiver node can detect a valid new, SSO ordered packet from a given producerID if:

pLabel.seq=seqTable.seq[producerId]+1

If the comparison is valid, the seq field is updated:

seqTable.seq [producerId]=pLabel.seq

For other comparisons, see below.

The seqTable.seq[producerId] field is reset to the current pLabel.seq value when this node detects that this producerId is initializing a CRC error retry loop. This is indicated by comparing the seq fields for a packet from—or acknowledge to—this producerId:

if {pLabel.seq<=seqTable.seq[producerId]} then seqTable. seq[producerId]=pLabel.seq Only the seqTable.seq value is modified, not the seqTable.acpt[ ] field, during the initialization of the CRC error loop. The packet will be rejected, but using the same accept/reject logic normally used (below). It is important that the seqTable state information be used to correctly acknowledge all retried packets as "done" (meaning previously accepted) or "busy"; the logic is described below.

If the "seq" comparison is valid, then packets are accepted or rejected according to this comparison:

```
accept: { {pLabel.bzseq ~= seqTable.bzseq[producerId]}
           & {receiver_not_busy}
        | {pLabel.bzseq = seqTable.bzseq[producerId]
           & {seqTable.busy[producerId] = 0}
           & {receiver_not_busy}
           & {pLabel.seq > seqTable.acpt[producerId]} }
reject: { {receiver_busy}
        | {pLabel.bzseq = seqTable.bzseq[producerId]}
           & {seqTable.busy[producerId] = 1}
        | {pLabel.bzseq = seqTable.bzseq[producerId]}
           & {pLabel.seq <= seqTable.acpt[producerId]} }
= ~accept
```

Less formally, packets are eligible for acceptance if a busy retry loop is being started and the receiver buffer is not busy, or if a busy retry loop is not being started and the "busy" state is reset and the receiver buffer is not busy and the sequence comparison shows that the producer node is not in an error retry loop. Packets are rejected if not accepted.

If the "seq" comparison is valid, then packets are acknowledged "done" or "busy" according to this comparison:

```
ack_don: { {pLabel.bzseq ~= seqTable.bzseq[producerId]}
            & {receiver_not_busy}
         | {seqTable.busy[producerId] = 0}
            & {receiver_not_busy}
         | {pLabel.seq < seqTable.acpt[producerId]} }
ack_bzy: { {pLabel.bzseq = seqTable.bzseq[producerId]}
            & {seqTable.busy[producerId] = 1}
            & {pLabel.seq >= seqTable.acpt[producerId]}
         | {pLabel.seq >= seqTable.acpt[producerId]}
            & {receiver_busy}
= ~ack_don
```

Less formally, packets are sent ack_don if a busy retry loop is being started and the receiver is not busy, or if the "busy" state is reset and the receiver is not busy, or if the sequence comparison shows that in an error retry loop, the packet being retried had been sent before the first "busy" packet. Packets are acknowledged as ack_bzy if they are not acknowledged as ack_don (again with the assumption of valid sequence comparison).

The first time that a receiver node rejects a packet as busy from a given producerId, it must change its "busy" state by setting (seqTable.busy[producerId]=1). This has the affect of freezing the seqTable.acpt[ ] field at the "busy" packet's sequence number. This field remains frozen until the first busy packet is retried.

Conditions for setting "busy" and "acpt" fields depend on whether a busy retry loop is being executed by the producer node. If the "seq" comparison is valid, then the first packet in a busy retry loop can be detected from pLabel.bzseq~=seqTable.bzseq[producerId]

(Note that the "bzseq" field is not changed while executing an error retry loop. Since this is true, it will always be true that
{pLabel.seq>seqTable.acpt[producerId]} in the packets of a busy retry loop.)

If a first retry packet is detected, then seqTable entries are set a follows:

```
{ seqTable.bzseq[producerId] = pLabel.bzseq
  seqTable.busy[producerId] = receiver_busy
  seqTable.acpt[producerId] = pLabel.seq }
```

Note that the first retry packet will be rejected by the comparison criteria above and acknowledged as either "done" or "busy". If a packet is not a first retry packet, this is detected from pLabel.bzseq=seqTable.bzseq[producerId]

Then seqTable entries depend on packet acceptance:

```
if { {seqTable.busy[producerId] = 0}
     & {pLabel.seq > seqTable.acpt[producerId]} }then
     {seqTable.busy[producerId] = receiver_busy
      seqTable.acpt [producerId] = pLabel.seq
     {
 else /* previous busy packet or error retry loop*/
     {no update
     }
```

Finally, each node can detect a packet with a sequence error from the producerId if:

pLabel.seq>seqTable.seq[producerId]+1

This can happen if this packet has valid CRC but some prior packet did not. (The count comparisons are not full 6 bit arithmetic comparisons; see details below.) No seqTable entries are updated for packets with sequence errors.

Ringlet SSO State Initialization:

The producer node must ensure that the state information at each node on its ringlet is initialized before sending actual SSO send/response packets.

A "trusted producer" policy may be supported with the proposed seqTable state bits and write send packets to initialize the seqTable. Three steps are needed:

1. The seqTable[ ] array is powered on or reset with seqTable.verif[ ]=0 for all producerId's.
2. Through an (unspecified) process in a non-SSO address space, the local node verifies a proposed producerId and then writes its own seqTable.verif[producerId]=1. The "verif" bit may only be written by the local node.
3. With seqTable.verif[producerId] activated, the producerId sends a write (or move) command addressed to this node's seqTable. The packet is identified as an initialization packet through its target address (seqTable).

The values written into the seqTable are taken from the initialization packet's data as follows:

```
if {seqTable.verif[producerId] == 1} then
    {seqTable.sso[producerId] = 1
     seqTable.seq[producerId] = [current "seq"
from this producerId]
     seqTable.bzseq[producerId] = [current "bzseq"
                                   from this producerId]
     seqTable.busy[producerId] = 0
     seqTable.acpt[producerId] = [current "seq"
                                   from this producerId]
    }
```

Each node in the ringlet must be verified and initialized separately.

A policy like the above can be utilized to dynamically add (or subtract) nodes from an existing ring as well as initialize a newly powered-on ring.

A policy like the above can enable selective "trusted node" exchanges. For example, node A can exchange with node B, node C with node B, but A and B can be prevented from SSO exchanges.

Application Space

The proposed mechanism can operate in a generalized 1394.2 network topology which includes:

nodes that are SSO-ordering capable and those that are not (static capability); and nodes that support multiple address spaces that may be either SSO ordered or not SSO ordered (dynamic capability).

Note that dynamic capability is important since within IEEE P1394.2 there are modes (isochronous) that may not be SSO ordered, and bridging to non-SSO ordered spaces (such as IEEE 1394–1995) must be supported. Generally, it is presumed (not required) that the software interface to the IEEE P1394.2 node is a set of address spaces with potentially varying programming models. At least one of these models is presumed to be an SSO model supporting non-idempotent commands.

The application of the SSO ordering mechanism is described here as it applies to the IEEE P1394.2 (asynchronous, directed) service. This does not mean that it cannot apply to other modes as well. This mechanism supports an arbitrary stream of commands from multiple address spaces, meaning that SSO commands may be interspersed with commands from other programming models.

If SSO ordering is to be maintained, end-to-end, from an SSO address space (or SSO domain) to a destination node, then it is clear that the destination node for SSO domain commands must be SSO-ordering capable, and that all intermediate nodes in switches or bridges must be SSO-ordering capable.

IEEE P1394.2 Changes required for support

The proposed SSO support mechanism can be implemented with the current 0.6 version of the spec without modification as an undocumented optional feature. When patents covering this mechanism are filed, however, it is planned that this mechanism will be added to the IEEE P1394.2 documentation as (at least) an optional feature.

While there is no required change, one encoding addition is suggested for clarity and another encoding addition is needed for support of cost-effective bridging to IEEE 1394–1995 nodes.

The encoding addition for clarity is the addition of an "ACK_error" acknowledgment to the "type" field, replacing a reserved code:

Type field:0 Normal, non-SSO

1 Extended, non-SSO

2 [reserved]

3 [reserved]

4 ACK_done

5 ACK_busy

6 ACK_more /* Multicast mode retry req'd */ *7ACK_error*/* Sequence error in SSO mode */

The encoding addition for bridging is specifying bits to delineate the starting, middle, and ending 64 B packets whose destination is reached through an interconnect that supports longer packet types. For example, 2 KB packets over Ethernet or 1394 can be broken up into three types of packets:

Start packet: possibly a partial block, aligned at its end on a 64 B boundary.

Middle packet: always 64 B, always aligned.

End packet: possibly a partial block, aligned at its start on a 64 B boundary.

A large packet entering a P1394.2 ringlet through a bridge may be broken up into smaller packets (for example, a large write packet broken into multiple 64 B moves plus a 64 B write, for example). But reassembling a large packet from even SSO ordered 64 B packets, for example to bridge to a 1394 destination node, requires that the component parts of the large packet be easily identified. The need is particularly strong because of the typically low inefficiency of protocols designed for large packets when dealing with small 64 B packets. A start/middle/end encoding, when combined with the SSO ordering capability, allow a bridge to very efficiently reassemble packets for delivery.

Retry Overview

Two types of retry conditions must be dealt with for SSO ordered address spaces supporting non-idempotent commands: "busy" conditions at the receiving node and CRC error conditions detected in the local ringlet. In the latter case, it is assumed that "CRC error" means the corruption of the packet (either the send packet, the response packet, or the ACK to either) so that neither source nor destination fields represent reliable data. The term "CRC error" should not be construed to mean restriction to only CRC error codes, but more generally should include any error detecting mechanism. For efficient operation of ordered domains, is assumed that "busy" retry conditions are relatively infrequent but still much more frequent than CRC error conditions. However, in no case is the validity of the proposed scheme dependent on the frequency of occurrence of either "busy" or CRC error cases.

For "busy" retries in ordered domains, in the absence of errors, it is only necessary to retry packets to those specific domains which respond "busy". The proposed scheme treats "busy" conditions in alternate destination nodes as independent; if node A transfers a sequence of packets to both nodes B and C, and only B responds "busy", then only the packets to node B are retried.

CRC error packets (either send/response packets or ACKs) are ultimately detected at the sending node. In SSO ordered domains, this detection might be either as a "sequence error" (an ACK_err response is detected before a time out) or as a ringlet time out (two revolutions with no acknowledgment). In SSO ordered domains, receiver nodes have the responsibility of sending an ACK_error to reject each send/response packet following a CRC error occurrence if a sequence error is detected from some node, but otherwise must maintain no error state information. When the sending node does detect that a CRC error has occurred in either its packet or an ACK, then it must retry all outstanding SSO ordered domain packets from the point of the last valid, completed packet up through the last outstanding packet sent before the error is detected and packet transmission is halted. The policy for retrying CRC errors in non-SSO domains is unspecified here.

Busy Retry Example

The proposed mechanism for SSO ordering support is illustrated with an example before detailed descriptions are given, in order to better visualize how the mechanism would work.

Case 1: Busy retry from node A to node C:

Packet sequencing from standpoint of the send packet:

| Node A send values: | | | | | | | | |
|---|---|---|---|---|---|---|---|---|
| Destination: | B | C | B | C | | B | C | |
| pLabel.seq: | 20 | 21 | 22 | 23 | * | 24 | 25 | |
| | | | | | * | | | |
| pLabel.bzseq | 1 | 1 | 1 | 1 | * | 0 | 0 | |
| | | | | | * | | | |
| Busy retry: | | 21 | | 23 | * | | | |
| | | | | | | | | 24 | 25 | |
| | | +--------- | |  ------>------ | | ^ | ^ | |
| | | | | +-------->------------------+ | | | |
| Node A receive values: | | | | | |<----bzy loop----| | | | |
| | | | | | ^ | | | |
| Busy detect: | | ...21 bzy | | ...23 bzy--^ | | | | |
| Node B values: | | | | | * | | | |

| Packet completion: | | | | | * | | |
|---|---|---|---|---|---|---|---|
| | Done | | Done | | * | | |
| Accept/reject: | | | | | * | | |
| | Acpt | | Acpt | | * | | |
| | | | | | * | | |
| seqTable.seq[producerId]: | | | | | * | | |
| | 19 | 20 | 21 | 22 | * | 23 | 24 |
| seqTable.bzseq[producerId]: | | | | | * | | |
| | 1 | 1 | 1 | 1 | * | 1 | 0 |
| seqTable.busy[producerId]: | | | | | * | | |
| | 0 | 0 | 0 | 0 | * | 0 | 0 |
| seqTable.acpt[producerId]: | | | | | * | | |
| | 19 | 20 | 21 | 22 | * | 23 | 24 |
| Node C values: | | | | | * | | |

| Packet completion: | | | | | * | | |
|---|---|---|---|---|---|---|---|
| | | Bzy | | Bzy | * | Done | Done |
| Accept/reject: | | Rej | | Rej | * | Acpt | Acpt |
| | | | | | * | | |
| seqTable.seq[producerId]: | | | | | * | | |
| | 19 | 20 | 21 | 22 | * | 23 | 24 |
| seqTable.bzseq[producerId]: | | | | | * | | |
| | 1 | 1 | 1 | 1 | * | 1 | 0 |
| seqTable.busy[producerId]: | | | | | * | | |
| | 0 | 0 | 1 | 1 | * | 1 | 0 |
| seqTable.acpt[producerId]: | | | | | * | | |
| | 19 | 20 | 21 | 21 | * | 21 | 24 |

Some Observations about this Example:

Packets are generated through the send port, but the busy acknowledgment is detected asynchronously in the receive port. The busy retry loop requires that all outstanding prior transactions be acknowledged prior to retransmitting the first retried busy packet (24). Also, the decision on when to retry busy packets may depend on other implementation considerations, such as the arrival rate of new transactions. In this example, packet 23 is the last packet sent before the busy loop resends packets 21 and 23 as renumbered (pLabel.seq) packets 24 and 25.

Only packets marked busy (in this case, only those to node C, beginning with packet 21) are retried; there is no need to retry completed packets.

New sequence numbers are assigned by node A to the retried packets.

Once a first "busy" packet is acknowledged at node C (packet 21), then every packet with the same or higher sequence number addressed to node C (packet 23 in this example) must be rejected with "ack_busy" until the first "busy" packet is retried (indicated by a change in "bzseq"). In an error retry loop, it is possible that a packet prior to 21 is retransmitted. In this case, the packet would be rejected and acknowledged as "ack_done" to prevent its being (incorrectly) retried. Every other node that acknowledges a first "busy" must behave the same way (not shown in this example).

SSO ordering is maintained, pairwise, from the sending node to each of its potential receiving nodes. However, if node A send SSO ordered packets to node B, and A also sends SSO ordered packets to node C, it does not follow that the relative ordering packet arrival between nodes B and C must be maintained for pairwise SSO correctness.

The beginning of a busy retry loop by this producerId node is signalled to all ringlet nodes by complementing the pLabel.bzseq field (from 1 to 0). This swap can be detected at each ringlet node by comparing its seqTable.bzseq[producerId] value with the incoming pLabel.bzseq; if they disagree, then the seqTable value is rewritten:

seqTable.bzseq[producerId]=pLabel.bzseq.

Also, if the retried busy packet is accepted in the receive buffer, then the "busy" bit is reset:

seqTable.busy[producerId]=0.

For all other (non-receiver) nodes, seqTable.busy [producerId] is set =0.

CRC Error Retry Examples

Two examples of CRC error retry without busy acknowledgments are followed with an example of a CRC error occurring around a busy retry loop.

Case 1: CRC error on send packet to node C, detected at node C.
Packet sequencing from standpoint of the send packet:
Packet sequencing from standpoint of the send packet:

```
Node A send values:

Destination:          B    |   C    |   B    |   C    |  *  B    |   C    |   B    |   C
pLabel.seq:          20        21       22       23    *  20       21       22       23
                                                       *
pLabel.bzseq:         1         1        1        1    *   1        1        1        1

CRC err retry:       20
                      |                                   20
                      |
                      +----------------------->--------^
Node A receive values:                                 |<-------------loop------------->|
                                                    ^
Busy detect:                           . . . 21 error--^
Node B values:                                         *

Packet completion:                                     *
                    Done        *   Done               *   Done              Done
Accept/reject:      Acpt            Acpt               *   Rej               Rej
                                                       *
seqTable.seq[producerId]:                              *
                     19        20       21       22    *   23       20       21       22
seqTable.bzseq[producerId]:                            *
                      1         1        1        1    *    1        1        1        1
seqTable.busy[producerId]:                             *
                      0         0        0        0    *    0        0        0        0
seqTable.acpt[producerId]:      *                      *
                     19        20       21       22    *   23       20       21       22

Node C values:                                         *

Packet completion:                                     *
                              (CRC)            Err     *            Done              Done
Accept/reject:                (err)            Rej     *            Acpt              Acpt
                                                       *
seqTable.seq[producerId]:                              *
                     19        20       20       20    *   20       20       21       22
seqTable.bzseq[producerId]:                            *
                      1         1        1        1    *    1        1        1        1
seqTable.busy[producerId]:                             *
                      0         0        0        0    *    0        0        0        0
seqTable.acpt[producerId]:                             *
                     19        20       20       20    *   20       20       21       22
```

Some Notes on this Example:
 The detection of a CRC error occurs within the receive node, asynchronously from the send node. In this example, packets 22 and 23 are transmitted before the CRC error for 21 is detected.
 Because of the many locations that a CRC error can occur, different nodes may detect—or fail to detect the error in different ways. In this example, the CRC error occurs after node B, so it never sees any sequence error. Node C, on the other hand, fails to detect packet 21 and then detects that subsequent packets/acks 22 and 23 have sequence errors, since its last recorded sequence value is 20.
 Once a CRC error is detected at the sender, its CRC error loop must first retransmit the last good packet before the error (packet 20), repeatedly if necessary, to reestablish the sequence count (to 20) within the seqTable.seq[producerId] field of each local ringlet node. Based on comparison with the receiver node's seqTable.acpt[producerId] field, this packet will always be rejected, regardless of the target. Along with the sequence number for the known good packet, the producerId also sends out the current bzseq value in pLabel to set to a known good state every seqTable.bzseq[producerId].
 While the seqTable.bzseq[producerId] value is reset, each node's seqTable.busy[ ] and seqTable.acpt [ ] fields must be preserved. They represent the state necessary to accept or reject packets in the CRC error retry loop with the correct ack done or busy response for this destination. In this example, node B rejects send/response packet 22, while node C accepts as new both packets 21 and 23.
 The sender must resend all packets that had been transmitted up to the point that it halted new packets, in this case through packet 23. Wit no errors, nodes B and C track the sequence numbers.

Case 2: CRC error on acknowledge packet from node C, detected at node A.
Packet sequencing from standpoint of the send packet:

| Node A send values: | | | | | | | | | | | | | | | |
|---|---|---|---|---|---|---|---|---|---|---|---|---|---|---|---|
| Destination: | B | \| | C | \| | B | \| | B | \| | C | \| | B | \| | B | \| | B |
| pLabel.seq: | 21 | | 22 | | 23 | * | 21 | | 22 | | 23 | * | 24 | | 25 |
| | | | | | | * | | | | | | * | | | |
| pLabel.bzseq: | 0 | | 0 | | 0 | * | 0 | | 0 | | 0 | * | 1 | | 1 |
| | | | | | | * | | | | | | * | | | |
| CRC err retry: | 21 | | | | | * | 21 | | | | | * | 24 | | |
| | \| | | | | | | ^ | | | | | | ^ | | |
| | +---------------->---------+\| | | | | | | | | | | | | | |
| Busy retry | +---------------->--------------->---------------------+ | | | | | | | | | | | | | |
| Node A receive values: | | | | | | | \|<---------error loop----->\| | | | | | | | |
| | | | | | | | ^ | | | | | | \|<--bzyloop--->\| | |
| CRC error detect | | | . . . 22 err^ | | | | | | | | ^ | | | |
| | | | | | | | | | | | | ^ | | | |
| Busy detect: | | | . . . 21 bzy-----23bzy------------------>^ | | | | | | | | | |
| Node B values: | | | | * | | | | | | | * | | | |
| Packet completion: | | | | * | | | | | | | * | | | |
| | Bzy | | Bzy | * | Bzy | | | Bzy | * | Done | | Done | | | |
| Accept/reject: | Rej | | Rej | * | Rej | | | Rej | * | Acpt | | Acpt | | | |
| | | | | * | | | | | * | | | | | |
| eqTable.seq[producerId]: | | | | * | | | | | * | | | | | |
| | 20 | | 21 | | 22 | * | 23 | | 21 | | 22 | * | 23 | | 24 |
| seqTable.bzseq[producerId]: | | | | * | | | | | * | | | | | |
| | 0 | | 0 | | 0 | * | 0 | | 0 | | 0 | * | 0 | | 1 |
| seqTable.busy[producerId]: | | | | * | | | | | * | | | | | |
| | 0 | | 1 | | 1 | * | 1 | | 1 | | 1 | * | 1 | | 0 |
| seqTable.acpt[producerId]: | | | | * | | | | | * | | | | | |
| | 20 | | 21 | | 21 | * | 21 | | 21 | | 21 | * | 21 | | 24 |
| Node C values: | | | | * | | | | | * | | | | | |
| Packet completion: | | | | * | | | | | * | | | | | |
| | | | (CRC) | * | | | | Done | * | | | | | |
| Accept/reject: | | | --- | * | | | | Acpt | * | | | | | |
| | | | | * | | | | | * | | | | | |
| seqTable.seq[producerId]: | | | | * | | | | | * | | | | | |
| | 20 | | 21 | | 21 | * | 21 | | 21 | | 22 | * | 23 | | 24 |
| seqTable.bzseq[producerId]: | | | | * | | | | | * | | | | | |
| | 0 | | 0 | | 0 | * | 0 | | 0 | | 0 | * | 0 | | 1 |
| seqTable.busy[producerId]: | | | | * | | | | | * | | | | | |
| seqTable.acpt[producerId]: | | | | * | | | | | * | | | | | |
| | 20 | | 21 | | 21 | * | 21 | | 21 | | 22 | * | 23 | | 24 |

This example illustrates the inability of the sender node to detect whether a packet has been accepted at its destination. Since node C in this example has seen no error, both packets 21 and 23 have valid pLabel.seq fields and are given ack_done responses.

Case 3: CRC error on send packet to node C, detected at node C before beginning busy retry loop for node B.

Packet Sequencing from Standpoint of the Send Packet:

| Node A send values: | | | | | | | | | | | | | | | |
|---|---|---|---|---|---|---|---|---|---|---|---|---|---|---|---|
| Destination: | B | \| | C | \| | B | \| | B | \| | C | \| | B | \| | B | \| | B |
| pLabel.seq: | 21 | | 22 | | 23 | * | 21 | | 22 | | 23 | * | 24 | | 25 |
| | | | | | | * | | | | | | * | | | |
| pLabel.bzseq: | 0 | | 0 | | 0 | * | 0 | | 0 | | 0 | * | 1 | | 1 |
| | | | | | | * | | | | | | * | | | |
| CRC err retry: | 21 | | | | | * | 21 | | | | | * | 24 | | |
| | \| | | | | | | ^ | | | | | | ^ | | |
| | +---------------->---------+\| | | | | | | | | | | | | | |
| Busy retry | +---------------->--------------->---------------------+ | | | | | | | | | | | | | |
| Node A receive values: | | | | | | | \|<---------error loop----->\| | | | | | | | |
| | | | | | | | ^ | | | | | | \|<--bzyloop--->\| | |
| CRC error detect | | | . . . 22 err^ | | | | | | | | ^ | | | |
| | | | | | | | | | | | | ^ | | | |
| Busy detect: | | | . . . 21 bzy-----23bzy------------------>^ | | | | | | | | | |
| Node B values: | | | | * | | | | | | | * | | | |
| Packet completion: | | | | * | | | | | | | * | | | |
| | Bzy | | | | Bzy | * | Bzy | | | | Bzy | * | Done | | Done |
| Accept/reject: | Rej | | | | Rej | * | Rej | | | | Rej | * | Acpt | | Acpt |

-continued

| | | | * | | | | * | | |
|---|---|---|---|---|---|---|---|---|---|
| seqTable.seq[producerId]: | | | * | | | | * | | |
| | 20 | 21 | 22 | * | 23 | 21 | 22 | * | 23 | 24 |
| seqTable.bzseq[producerId]: | | | * | | | | * | | |
| | 0 | 0 | 0 | * | 0 | 0 | 0 | * | 0 | 1 |
| seqTable.busy[producerId]: | | | * | | | | * | | |
| | 0 | 1 | 1 | * | 1 | 1 | 1 | * | 1 | 0 |
| seqTable.acpt[producerId]: | | | * | | | | * | | |
| | 20 | 21 | 21 | * | 21 | 21 | 21 | * | 21 | 24 |
| Node C values: | | | * | | | | * | | |
| Packet completion: | | | * | | | | * | | |
| | | (CRC) | | * | | Done | | * | | |
| Accept/reject: | | --- | | * | | Acpt | | * | | |
| | | | | * | | | | * | | |
| seqTable.seq[producerId]: | | | * | | | | * | | |
| | 20 | 21 | 21 | * | 21 | 21 | 22 | * | 23 | 24 |
| seqTable.bzseq[producerId]: | | | * | | | | * | | |
| | 0 | 0 | 0 | * | 0 | 0 | 0 | * | 0 | 1 |
| seqTable.busy[producerId]: | | | * | | | | * | | |
| seqTable.acpt[producerId]: | | | * | | | | * | | |
| | 20 | 21 | 21 | * | 21 | 21 | 22 | * | 23 | 24 |

This example is based on the following sequence of events:

Node B is sent 2 send/response packets, 21 and 23, which it rejects as busy.

Node C is sent a packet 22 which it never sees because of a CRC error at its node; no error is detected at node B.

Node A begins its busy retry for node B packets by first waiting for the completion of outstanding Acks. Now node A detects the CRC error. It begins a CRC error loop, which must include all packets from 21 (last good packet before the error) through 23 (last packet sent before the error is detected).

In this example, when the CRC error retry loop is entered, retried packets to node B in the error loop are rejected based on the pLabel.seq value and node B's seqTable.busy[ ] and seqTable.acpt[ ] fields. Since the seqTable.busy[ ] bit is set, packets are rejected; since seqTable.busy[ ] is set but both packets had originally been marked "busy" (based on comparison of the pLabel.seq value with the seqTable.acpt[ ] field), both retried packets 21 and 23 are acknowledged as "busy".

The seqTable.bzseq[producerId] field from node A makes a transition when the busy loop is finally started and packet 21 is retransmitted as packet 24. Node B detects this transaction and now evaluates whether packet 24 can be accepted, based on whether its receive buffer is full. In the assumed example, both retried packets 24 and 25 are accepted.

The basic concept for initiating a busy retry loop in the potential presence of errors is to wait in starting the loop until acknowledgments for all packets prior to the first retried busy packet are received and verified as good. This is necessary since changing the state of the pLabel.bzseq bit causes all node packets to reset their seqTable.busy[ ] and seqTable.acpt[ ] fields. These fields had maintained error retry state for generating packet accept/reject and acknowledgments prior to the busy retry loop. These fields are reset only when node A verifies that no error conditions remain outstanding.

Producer nodes: Request Queue State

In a preferred embodiment,, each producer node may have up to the following three types of outgoing queues in addition to a register, and two types of incoming queues or structures (see FIG. 39)

Outgoing:
1. a new request queue of unissued requests, presumably in the transaction layer (above the link layer);
2. a response-pending queue of unissued response packets to other nodes, again in the transaction layer;
3. a "send_pkt" queue of send and response packets in process, which are issued to the ringlet, in the link layer;
4. a "retry_pkt" queue of busy packets to retry [N.B. this applies only to a busy retry embodiment];
5. a "retry_pkt" register, to both fill the retry_pkt queue and to recycle packets for error retry to the send_pkt queue.

Incoming:
1. a queue of incoming acknowledgments to this node in the link layer;
2. a structure for requests which are awaiting responses, in the transaction layer.

For outgoing send and response packets in the transaction layer, the queues may be in some cases multiple queues, where there is no ordering dependency between the queues. An example is the multiple ports of a switch.

For response packets to this node in SSO ordering mode, responses from a given destination node will always come in order, while no ordering is guaranteed for responses between different nodes. Consequently, the send packet structure awaiting responses is shown as a structure rather than a queue.

Response Packet usage in SSO Ordering Spaces

IEEE P1394.2 specifies two types of operations to write data to a destination node: a responseless move transaction and a write transaction with a response. The SSO ordering structure guarantees ordered delivery of data; what then is the difference between move and write transactions?

Write send packets provide a positive indication, generated by the destination node, that the write data actually reached this node. That is, it positively indicates completion of the operation. Move send packets have no positive indication of completion.

There are two questions that arise from this distinction:
1. What can the positive indication of completion be used for?

2. What architectural extensions can be combined with move transactions to ensure that ordering is maintained in an imperfect link topology, specifically covering invalid addresses and "stuck at" receiver nodes that refuse to accept new packets? The positive indication of completion for the write transaction will be visible to the transaction layer. Whether it can be visible at some system level above this depends on a transaction level architecture that is beyond the scope of this discussion. The point of SSO ordering is that no structure is necessary to ensure ordering.

Here are two possible uses for write transactions within the transaction layer; this list is hardly exhaustive. First, write transactions can be used as the basis for a reliability architecture. If a send packet failed to receive a response in a specified period of time, a node timeout could be reported. In this usage, there is no a priori requirement for response completion prior to starting the next send packet.

In the second use for write transactions is to use them as a basis for high availability architectures. In this application, the response to the write signals the completion of a "write commit" to stable storage. The problem with this is what to do with the response. Does one use it to gate transmitting the next send packet? If so, this dramatically slows down the packet delivery rate. Does the system architecture support a mechanism to use the response as a completion barrier indicator? Most (including UPA) do not.

Send Packet Queue Structure

Since the address spaces to P1394.2 may, in general, be both ordered and non-ordered, the node must maintain a structure of data for each command to identify and support both addressing models. This proposed structure consists of three fields:

| Send_pkt SSO structure, one per send or response packet | | |
|---|---|---|
| send_pkt.val | (1) | /* Entry valid */ |
| send_pkt.sso | (1) | /* From command address space */ |
| send_pkt.done | (1) | /* ACK_done recvd, response may be reqd */ |
| send_pkt.busy | (1) | /* ACK_busy received, awaiting retry */ |
| send_pkt.init_er | (1) | /* Initial (first) packet in error retry loop */ |
| send_pkt.no_xmit | (1) | /* No transmit to ringlet during error loop */ |
| send_pkt.err_ret | (1) | /* Error retry state in error retry loop */ |
| send_pkt.seq | (6) | /* Seq number for this send/response pkt */ |
| send_pkt.packet | (N) | /*N bit send/receive packet */ |

Other control bits may be used for implementation purposes beyond SSO ordering as described here.

Conceptually, send_pkt[ ] may be viewed as a FIFO queue, with newly sent packets entering at the top and concluded packets coming out the bottom as acknowledgment packets in a corresponding FIFO are received. Any send packets acknowledged as "ack_done" may in turn may be awaiting a response.

In addition to the send_pkt FIFO queue, other queues, registers, muxes, state machines, and control logic are described in the supporting flow diagrams.

Producer Node Pointers for CRC Error Loop

Certain producer node variables are needed for CRC error loop and busy retry loop handling. Global variables for CRC error loop operation include these, where the prefix "or_" indicated "ordered".

| or_last_ct | (6) | /* Sequence count for latest SSO ordered pkt sent to the local ringlet */ |
|---|---|---|
| no_last_ct | (6) | /* Sequence count for latest non-SSO ordered pkt sent to the local ringlet */ |
| or_rcvd_ct | (6) | /* Sequence count for latest SSO ordered pkt received from the local ringlet */ |

When a packet is sent to the local ringlet, its pLabel field is set to correspond with send_pkt fields, which are carried in the packet path into the send_pkt register. In general:

pLabel.sso=send_pkt_reg.sso pLabel.bzseq=bzseq /* Global producer node state bit */ pLabel.seq=send_pkt_reg.seq

What value is assigned to pLabel.seq depends on the operation (e.g., new packet, busy retry packet, or CRC retry); see details below.

Receiver Pointer Comparison: supporting a Wrapped Modulo 64 Count

From the "Proposal overview" section above, it was noted that three comparisons can be important to the receiver operation:

1. The receiver node can detect a valid new, SSO ordered packet from a given producerId if:

pLabel.seq=seqTable.seq[producerId]+1, and pLabel.seq>seqTable.acpt[producerId]

2. The seqTable.seq[producerId] field is reset to the current pLabel.seq value when this node detects that this producerId is executing a CRC error loop. This is indicated by comparing the seq fields for a packet—or acknowledge—from this node:

if {pLabel.seq<=seqTable.seq[producerId]} then

{seqTable.seq[producerId]=pLabel.seq

3. Finally, each node can detect a packet with a sequence error from the producerId if:

pLabel.seq>seqTable.seq[producerId]+1

Supporting both "greater than" and "less than or equal" comparisons with a modulo 64 counter can be achieved if the producerId ensures that the comparison will never exceed a difference at the receiver node of 31 and the count is defined as below:

"A<=B" if:
  high order bit equal and A<=B with lower order bits
  high order bit unequal and A>B with remaining bits
"A>B" if:
  high order bit equal and A>B with lower order bits
  high order bit unequal and A<=B with remaining bits Special Issues This section provides additional explanation and emphasis on some subtle details with possible implementations of the invention.

The first of these problems dealt with reliably resetting appropriate seqTable[producerId] fields following a CRC error. Once a CRC error has occurred, the fields in the seqTable.seq[producerID] for every node in the ringlet may contain values which are not in synch with other nodes within the ringlet.

At the same time, since the seqTable[ ] values are only updated when a valid, correctly sequenced packet is identified at the receiver node, then the values must be considered as correct insofar as this node is concerned. They may, however, be out of synch with respect to both the sending node and other ringlet nodes.

So the task of the producerId node is to reliably get all nodes back into synch. The problem is in achieving this reset: what if the first packet in the error loop itself has a CRC error?

A simple solution to this problem is for the producerId node performing the error handling loop to begin its error loop by transmitting—in non-pipelined mode—the last known good, completed packet. The producerID node would retry this packet until it received a valid acknowledgment. Once this is received, then every node on the ring must have its seqTable.seq[ ] field for this producerID set to the same value. The same argument holds for resetting the seqTable.bzseq[ ] field. But the seqTable.busy[ ] field reflects the state of the acknowledgment to the last valid, completed packet delivered from this producerId to this receiving node. In considering how to handle the next valid packet (any retried packet will be rejected), this field has validity. This field, consequently, must not be reset in the reset interval. Similarly, the seqTable.acpt[ ] field is also left unmodified.

Note that by retrying a known good, completed packet (which would be acknowledged as valid and rejected by the target node in the ringlet) the producerID node is transmitting a packet for only its the packet sequence number, rather than its data content.

The same approach of resending a known packet until a valid ACK is returned, can be used for ringlet initialization to initialize the above mentioned fields. But other fields, such as seqTable.busy[ ] and seqTable.acpt[ ], must be reset by other means, such as using a non-SSO space to write into the seqTable.acpt[ ] field the value (pLabel.seq).

The second problem with the original proposal dealt with the question of ambiguity in the producerID node determining whether packets in its error loop had been completed or not. That is, if any (send/receive) and acknowledge pair is found to have a CRC error, then the producerID node cannot determine whether the CRC error occurred before the packet reached its ringlet destination, or after. So it cannot reliably mark a retried packet as "completed".

The solution to this problem was to add the (6 bit) seqTable.acpt[ ] field to each receiver node's seqTable array to record the last valid sequence number detected at this node prior to having its seqTable.seq[ ] reset by a packet with a lower value pLabel.seq from this producerId, or the sequence number of the first packet rejected for busy retry (indicated by the seqTable.busy[ ] field. Note that tracking the seqTable.acpt[ ] field means that:

1. The last accepted packet at this node must have a sequence number<=seqTable.acpt[ ], so any new, unseen packet must have a sequence value>seqTable.acpt[ ], provided that seqTable.busy[ ] is reset.
2. The seqTable.acpt, in the absence of errors or busy packets, tracks the current pLabel.seq value. This fact is crucial in creating a modulo 64 rolling count definition.

Notes regarding the Example of FIGS. 39–60

FIGS. 39–60 show the state of the system of the invention at successive stages of processing packets wherein a busy condition has arisen with respect to a consumer node, a CRC (or other) error condition has also arisen, and the "busy" node is not well-behaved—i.e., it has been persistently busy for longer than some predetermined length of time or number of packets sent or received, or it is erroneously transmitting ack_busy responses.

In the example of FIGS. 39–60, it will be noted that the or_last_ct is the count number of the last ordered packet sent, and that or_rcvd_ct refers to the count of the last ordered packet received. The or_rcvd_ct value is frozen if a busy retry is required (which is detected in the resend logic).

For this example, it is assumed that there are previous busy packets, e.g. 54 and 59, which are in the retry_pkt queue. Note that:

$$(\text{or\_last\_ct} - \text{or\_rcvd\_ct}) = (23 - 59) \bmod 64$$
$$= 28$$

and 28 is less than or equal to the threshold for the difference (or_last_ct - or_rcvd$_{ct}$).

What is claimed is:

1. A system for maintaining a sequence of packets transmitted by at least one producer node to at least one consumer node in a computer network, including:
   a first send subsystem of said producer node configured to maintain sequence and packet state information for at least one said packet sent by said producer node; and
   a first receive subsystem of said producer node configured to maintain sequence and packet state information for an acknowledgment sent by said consumer node to said producer node, and to detect a condition wherein a sent packet has not resulted in an acknowledgment
   a second receive subsystem of said producer node configured to detect busy acknowledgments from said consumer node;
   a second send subsystem of said consumer node configured to maintain sequence and packet state information for said acknowledgment; and
   a second receive subsystem of said consumer node configured to maintain sequence and packet state information for said packet sent by said producer node, and to maintain overall sequence state information and packet accept state information for all packets received by said consumer node from said producer node, and further configured to reject packets when at least one said busy acknowledgment is detected.

2. The system of claim 1, wherein said first receive subsystem is configured to detect said condition by determining that acknowledgments received at said first receive subsystem are in an order different from an order of transmitted packets that resulted in said acknowledgments.

3. The system of claim 1, wherein said first receive subsystem is configured to detect said condition by determining, during a predetermined time period following transmission of a first packet to said consumer node, that an acknowledgment to said first packet has not been received at said first receive subsystem.

4. The system of claim 1, wherein said system includes an ordering subsystem configured to maintain strong sequential ordering of said packets.

5. The system of claim 1, wherein said system includes an ordering subsystem configured to maintain relaxed memory ordering of said packets.

6. The system of claim 1, wherein said system is configured to process at least a first packet comprising a nonidempotent request while maintaining an unaltered state of a node to which said first packet is addressed, upon receiving said first packet more than once.

7. The system of claim 1, including a retry subsystem configured to retry at least one packet including a nonidempotent request while maintaining an unaltered state of said consumer node upon receiving a second instance of said retried packet.

8. The system of claim 1, wherein said network is a ringlet network.

9. The system of claim 1, wherein said network includes at least one ordered node configured to maintain strong sequential ordering and at least one unordered node configured in a manner other than to maintain strong sequential ordering.

10. The system of claim 1, wherein said network includes at least a first node configured to support nonidempotent commands and a second node configured not to support nonidempotent commands.

11. The system of claim 1, wherein said network includes at least one dynamic node configurable, at different times, both in a manner to maintain both strong sequential ordering and in a manner other than to maintain strong sequential ordering.

12. The system of claim 1, further including:
an error detection subsystem; and
a reset subsystem configured, upon detection of an error by said error detection subsystem upon sending of a current packet, to reset said sequence of each said consumer node to a common network value.

13. The system of claim 12, wherein said reset subsystem is configured to cause said producer node to resend a previously sent packet at least once, and repeatedly as required, until a valid acknowledge packet is received by said producer node.

14. The system of claim 13, wherein said previously sent packet is a packet for which said producer node has received an acknowledge done packet.

15. The system of claim 13, wherein said reset subsystem is configured to remove a data field from said previously sent packet before resending.

16. The system of claim 13, wherein said reset subsystem includes:
a sequence validity state subsystem configured to maintain a sequence validity state value at each said consumer node, and to reset each said sequence validity state value to a common value upon receipt at each said consumer node of said previously sent packet.

17. The system of claim 14, further including a first retry subsystem configured to send retry packets between said previously sent packet and said current packet, inclusive.

18. The system of claim 17, wherein said retry subsystem includes:
an acceptance validity state subsystem configured to maintain an acceptance validity state value at each said consumer node;
an acceptance validity comparison subsystem configured to generate a comparison of an acceptance validity field of said retry packets with said acceptance validity state value at each said consumer node; and
a retry packet reject subsystem configured to reject each said retry packet whose said comparison meets a predetermined criterion.

19. The system of claim 17, further including a retry packet validity check subsystem configured to determine validity of retry packet acknowledgments received at said producer node in response to sending said retry packets.

20. The system of claim 19, further including a second retry subsystem configured to send said retry packets when said retry packet validity check subsystem determines that a retry packet acknowledgment has an invalid status.

21. The system of claim 1, including a plurality of send and consumer nodes, wherein each said consumer node includes one said receive subsystem configured to read state information of a plurality of said packets and said acknowledgments, respectively, even when said packets and acknowledgments are addressed to nodes other than the consumer node reading said state information, to maintain common sequencing information among all nodes that support strong sequence ordering.

22. The system of claim 1, including a plurality of said producer nodes and a plurality of said consumer nodes, wherein:
at least a subset of said producer and consumer nodes are configured as strong sequential ordering (SSO) nodes to send and receive, respectively, SSO packets, and to receive and send, respectively, SSO acknowledgments of said SSO packets; and
each said producer and consumer node of said subset is configured to read said SSO packets and/or said SSO acknowledgments.

23. The system of claim 1, configured to maintain an unaltered order of request packets as transmitted by producer nodes on said network, and to maintain unaltered an order of response packets generated in response to said request packets by consumer nodes on said network.

24. A system for maintaining a sequence of packets transmitted by at least one producer node to at least one consumer node in a computer network, including:
a sequence check subsystem in said consumer node configured to determine whether at least one packet in the sequence is in a valid position in the sequence; and
a busy acknowledgment detection subsystem in said producer node configured to determine whether a received acknowledgment indicates a busy condition in said consumer node; wherein said producer node further includes a valid acknowledgment subsystem configured to detect arrival of valid acknowledgment packets sent by said consumer node in response to packets sent by said producer nodes, and wherein
said sequence check subsystem is further configured to determine that said at least one packet is a packet not previously received at said consumer node.

25. The system of claim 24, wherein said sequence check subsystem includes:
a sequence field of a current packet having a current value indicating a position of said packet in said sequence;
an apparatus configured to store a previous value of a sequence field of a packet preceding said current packet; and
a compare subsystem configured to compare said current value with said previous value, and to generate an error indicator if said comparison yields a predetermined condition.

26. The subsystem of claim 25, wherein said predetermined condition includes a comparison result indicating that said current value is not exactly one greater than said previous value.

27. A system for maintaining a sequence of packets transmitted by at least one producer node to at least one consumer node in a computer network, including:
a pipelining subsystem configured to pipeline packets from said producer node in the absence of acknowledgment to said producer node of previously transmitted, unprocessed packets;
a counter subsystem configured to determine a sequence count difference between a first said unprocessed packet and a current packet;
a cutoff subsystem configured to terminate said pipelining of said packets when said sequence count difference reaches a predetermined threshold;

a busy detection subsystem configured to detect a busy condition at said consumer node; and a packet suspension subsystem configured to suspend pipelining of said packets when said busy condition is detected.

28. The system of claim 27, wherein said computer network comprises a first ringlet network.

29. The system of claim 27, including a plurality of said producer nodes and consumer nodes, and configured to maintain said sequence in strong sequential ordering between all connected pairs of nodes in said network.

30. The system of claim 29, including a nonidempotent subsystem configured to support nonidempotent commands.

31. The system of claim 30, wherein said nonidempotent subsystem is configured to maintain unaltered state information of each target node to which a nonidempotent packet is sent and successfully processed, upon reception by said target node of a second instance of said nonidempotent packet.

* * * * *